(12) United States Patent
Sekine et al.

(10) Patent No.: US 8,102,138 B2
(45) Date of Patent: Jan. 24, 2012

(54) ELECTRIC POWER STEERING APPARATUS AND METHOD OF ASSEMBLING THE SAME

(75) Inventors: Takaaki Sekine, Fujisawa (JP); Atsushi Ooshima, Fujisawa (JP); Tetsuya Kodama, Fujisawa (JP); Seiichi Kobayashi, Fujisawa (JP); Yasuhiro Shimizu, Fujisawa (JP); Naoki Hyoudou, Fujisawa (JP); Shigeru Endo, Fujisawa (JP); Atsushi Horikoshi, Fujisawa (JP); Keiji Kashimoto, Maebashi (JP); Tamotsu Oumi, Maebashi (JP); Hideaki Kawada, Maebashi (JP); Shigeo Shinohara, Maebashi (JP); Takeshi Senba, Maebashi (JP); Mitsuo Shimoda, Maebashi (JP)

(73) Assignee: NSK Ltd., Tokyo (JP)

( * ) Notice: Subject to any disclaimer, the term of this patent is extended or adjusted under 35 U.S.C. 154(b) by 426 days.

(21) Appl. No.: 12/296,657

(22) PCT Filed: Apr. 11, 2007

(86) PCT No.: PCT/JP2007/058007
§ 371 (c)(1),
(2), (4) Date: Oct. 9, 2008

(87) PCT Pub. No.: WO2007/119757
PCT Pub. Date: Oct. 25, 2007

(65) Prior Publication Data
US 2009/0295325 A1 Dec. 3, 2009

(30) Foreign Application Priority Data

Apr. 11, 2006 (JP) ................................ 2006-109135
Apr. 11, 2006 (JP) ................................ 2006-109136
Jul. 31, 2006 (JP) ................................ 2006-208954
Feb. 5, 2007 (JP) ................................ 2007-025775
Mar. 29, 2007 (JP) ................................ 2007-086894
Mar. 30, 2007 (JP) ................................ 2007-092116
Apr. 6, 2007 (JP) ................................ 2007-100743

(51) Int. Cl.
*G05D 15/00* (2006.01)

(52) U.S. Cl. ........ 318/646; 318/560; 318/638; 318/430; 318/431; 318/432; 180/443; 180/444

(58) Field of Classification Search .................. 318/646, 318/638, 560, 430–434; 180/443, 444
See application file for complete search history.

(56) References Cited

U.S. PATENT DOCUMENTS 5,810,111 A * 9/1998 Takeuchi et al. .............. 180/443
(Continued)

FOREIGN PATENT DOCUMENTS

EP 0 753 448 A1 1/1997
(Continued)

OTHER PUBLICATIONS

PCT/IB/338 (one (1) page); PCT/IB/373 (one (1) page); PCT/ISA/237 (five (5) pages); totaling (seven (7) pages), 2007.

(Continued)

*Primary Examiner* — Walter Benson
*Assistant Examiner* — David Luo
(74) *Attorney, Agent, or Firm* — Crowell & Moring LLP

(57) ABSTRACT

A motor control apparatus includes a steering column having inserted therein a steering shaft to which steering torque is transmitted, a reduction gear box coupled to the steering shaft, and an electric motor that transmits a steering assisting force to the steering shaft via a reduction mechanism in the reduction gear box. The electric motor and its control unit including a control board mounted with a control circuit, are provided side by side in the reduction gear box. A connection terminal of the electric motor is electrically connected to the control unit directly. This minimizes a connection distance between the control unit and the electric motor.

46 Claims, 38 Drawing Sheets

U.S. PATENT DOCUMENTS

| | | | |
|---|---|---|---|
| 6,851,509 B2 * | 2/2005 | Hayakawa et al. | 180/444 |
| 7,191,679 B2 * | 3/2007 | Tomaru et al. | 74/493 |
| 7,242,161 B2 * | 7/2007 | Okamoto et al. | 318/432 |
| 2003/0116376 A1 | 6/2003 | Uryu et al. | |
| 2004/0028531 A1 | 2/2004 | Morikawa et al. | |
| 2004/0060766 A1 | 4/2004 | Hayakawa et al. | |
| 2005/0167183 A1 * | 8/2005 | Tominaga et al. | 180/444 |

FOREIGN PATENT DOCUMENTS

| | | |
|---|---|---|
| JP | 11-115775 A | 4/1999 |
| JP | 2002-308122 A | 10/2002 |
| JP | 2003-95117 A | 4/2003 |
| JP | 2003-182606 A | 7/2003 |
| JP | 2003-246272 A | 9/2003 |
| JP | 2003-267233 A | 9/2003 |
| JP | 2004-182079 A | 7/2004 |
| JP | 2005-329866 A | 12/2005 |
| JP | 2005-329867 A | 12/2005 |
| JP | 2005-329868 A | 12/2005 |
| JP | 2005-329869 A | 12/2005 |
| JP | 2006-36077 A | 2/2006 |

OTHER PUBLICATIONS

International Search Report dated Jul. 10, 2007 (two (2) pages).
Supplementary European Search Report dated Jul. 1, 2011 (ten (10) pages).
Japanese Office Action dated Aug. 23, 2011 (3 pages) and English language translation thereof (3 pages).

* cited by examiner

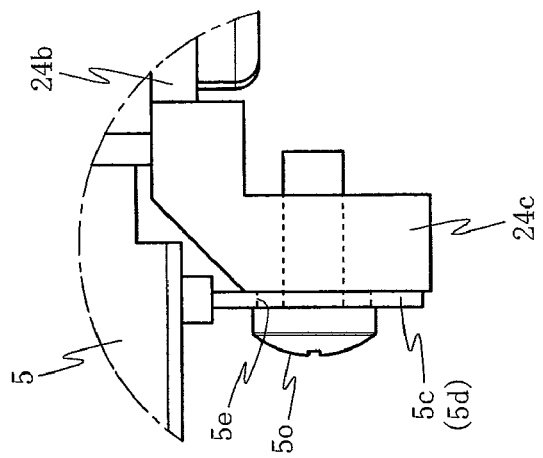
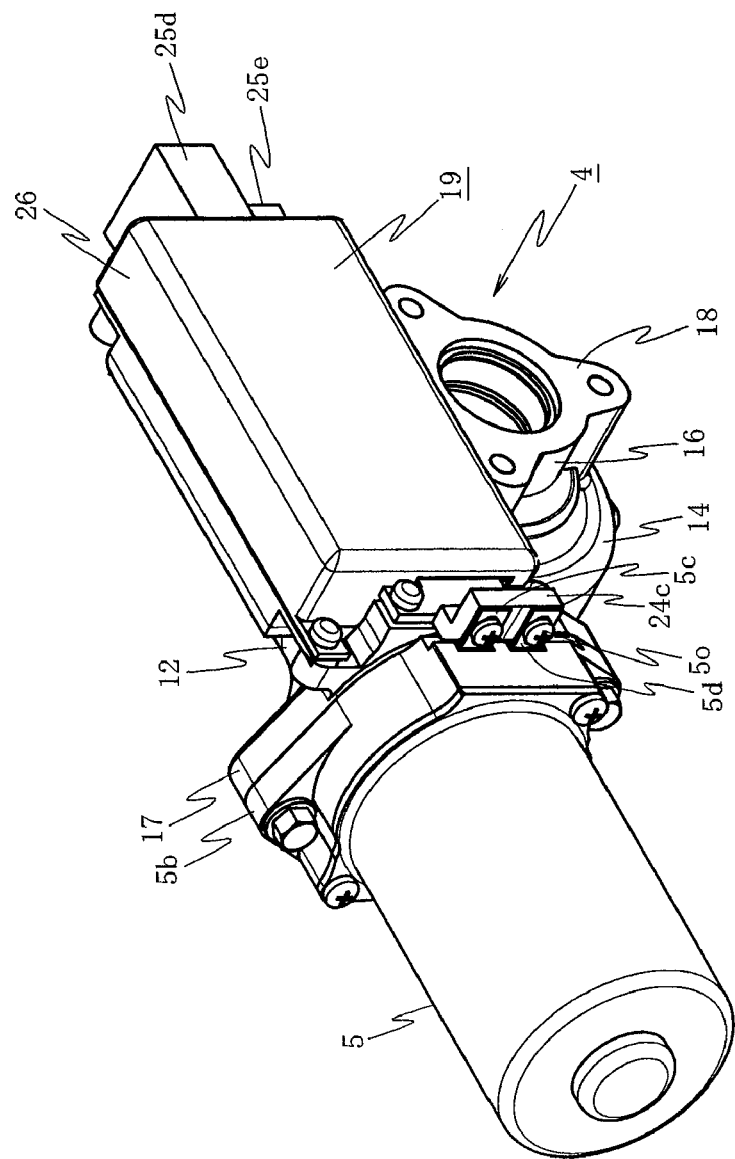

F I G. 2 5 A
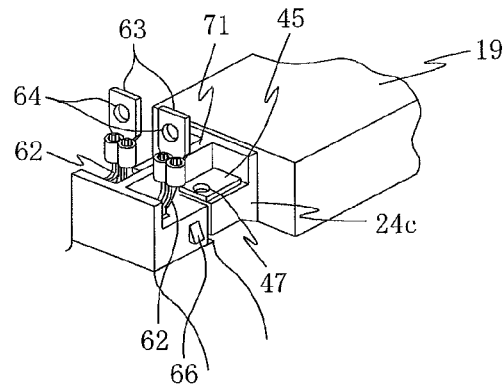
F I G. 2 5 B
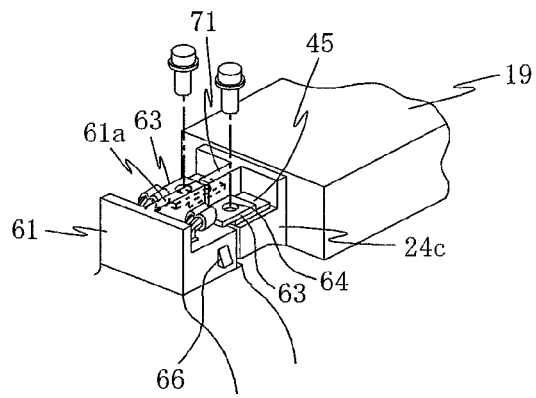
F I G. 2 5 C
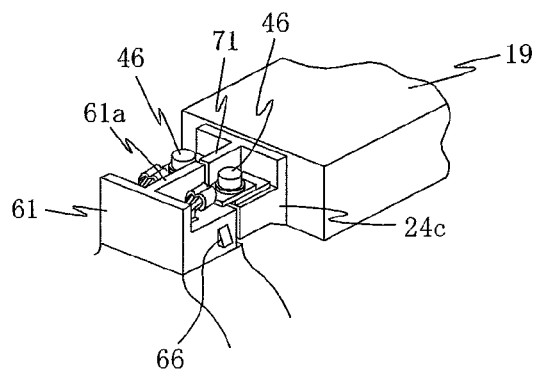
F I G. 2 5 D
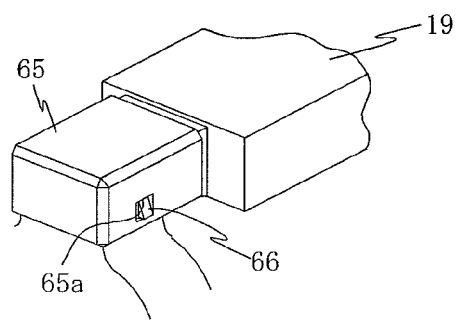

FIG. 26
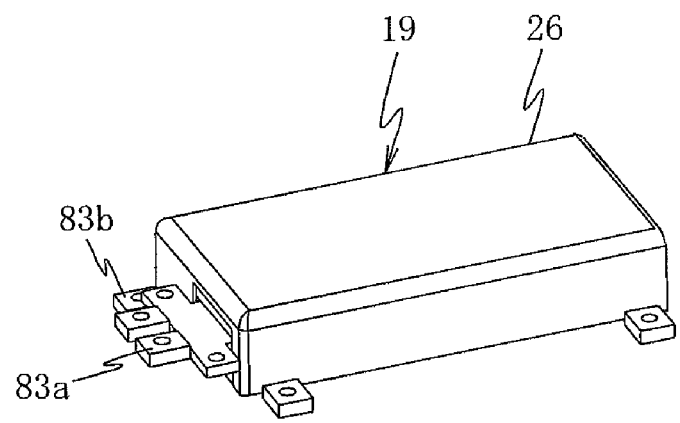
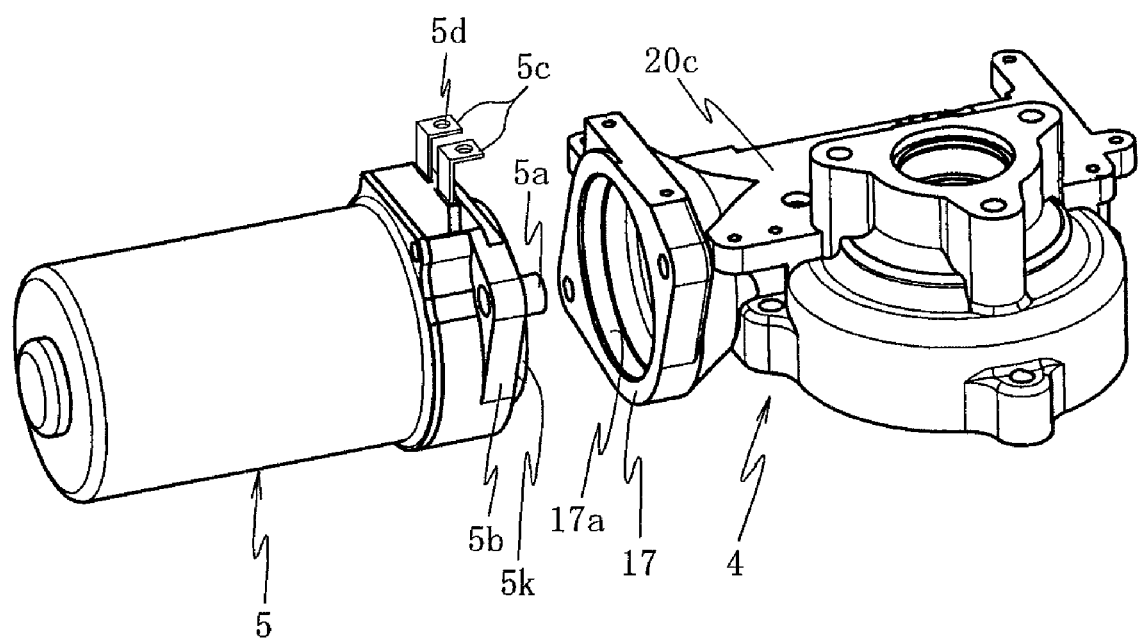

ELECTRIC POWER STEERING APPARATUS AND METHOD OF ASSEMBLING THE SAME

TECHNICAL FIELD

The present invention relates to an electric power steering apparatus including a steering column having inserted therein a steering shaft to which steering torque is transmitted and an electric motor that transmits a steering assisting force to the steering shaft via a reduction mechanism in a reduction gear box, and to a method of assembling the same.

BACKGROUND ART

As an electric power steering apparatus in the past, for example, there has been proposed an electric power steering apparatus in which a motor is housed in a part of a rack case or a steering gear box in which a rack shaft is slidably housed or mounted, a housing in which a control board for controlling to drive the motor is housed is formed in the rack case or the steering gear box, and, when the control board inserted from an opening of the housing is brought into contact with an attachment boss formed in a bottom portion opposed to the opening, a board connection terminal provided in the control board comes into contact with a motor side connection terminal protrudingly provided in the housing from the motor and is electrically connected thereto (see, for example, JP2005-329866A (hereinafter referred to as Patent Document 1), JP2005-329867A (hereinafter referred to as Patent Document 2), JP2005-329868A (hereinafter referred to as Patent Document 3), and JP2005-329869A (hereinafter referred to as Patent Document 4)). Patent Document 1 discloses the structure in which a female terminal is formed by a conductive spring piece or a male terminal is formed by a relatively long conductive plate piece in the board side connection terminal, a male terminal is formed by a relatively long conductive plate piece or a female terminal is formed by a conductive spring piece in the motor side connection terminal, and, when the control board is brought into contact with the attachment boss, the male terminal of the motor side connection terminal or the board side connection terminal is inserted into the female terminal of the board side connection terminal or the motor side connection terminal, the conductive spring piece of the female terminal is brought into press contact with the conducive plate piece of the male terminal by a spring force thereof, and contact of the female terminal and the male terminal is maintained.

In recent years, there is an increasing demand for improvement of mileage of vehicles and integrated control for the vehicles. Electric power steering apparatuses start to be adopted not only in small cars but also in large cars that require a large steering assisting thrust. In order to increase output of an electric motor that generates a steering assisting force, it is necessary to increase a motor current. However, according to the increase in the motor current, a wiring loss of a motor harness that connects a control unit, which controls to drive the electric motor, and the electric motor increases according to the increase in the motor current and efficiency falls.

Therefore, in the past, there is known an electric power steering apparatus in which a housing, to which a metal board is fixed in a closely attached state, is arranged on the opposite side of an electric motor, heat radiation fins are provided on an outer side of the housing and an inner side and an outer side of a cover attached to the electric motor, a power board, a large current board, and a control board are built in inner sides of the housing and the cover in a laminated structure, and a motor terminal projecting from the large current board to the outside of the cover is inserted into the electric motor and electrically connected to the electric motor (see, for example, JP2003-267233A (hereinafter referred to as Patent Document 5)).

DISCLOSURE OF THE INVENTION

However, in the example in the past disclosed in Patent Documents 1 to 4, the electric power steering apparatus of a so-called rack type that houses the motor in a part of the rack case or the steering gear box has the structure in which the motor side connection terminal is brought into contact with the board side connection terminal provided in the control board and is electrically connected thereto. It is possible to minimize wiring length between the motor and the control board and prevent electric noise from mixing by directly connecting the motor and the control board rather than inserting an electric connection line between the motor and the control board. It is also possible to reduce wiring resistance and reduce an electric loss. However, there are unsolved problems in that it is necessary to input a torque detection value of a torque sensor that detects torque transmitted to a steering shaft to the control board that controls the motor, since the torque sensor is usually set on a steering wheel side apart from the rack case or the steering gear box, it is necessary to provide a long connection cable between the torque sensor and the control board, electric noise mixes in the connection cable, and an electric loss increases because electric resistance increases.

Moreover, in the example in the past described in Patent Document 1, the electric motor has the structure of a direct motor. Therefore, it is unnecessary to perform phasing for coupling the electric motor to the reduction mechanism. However, in an electric power steering apparatus of a column type, the electric motor and the reduction mechanism are spline-fit or serration-fit. Therefore, it is necessary to perform phasing while rotating the electric motor in coupling the electric motor to the reduction mechanism. In this case, there is an unsolved problem in that the structure of Patent Document 1 cannot cope with the phasing.

Moreover, in the example in the past disclosed in Patent Document 1, unless positions of one male terminal and the other female terminal of the motor side connection terminal and the board side connection terminal are highly accurately set, during connection, residual stress occurs in the male terminal and the female terminal that are in contact with each other in the press-contact state. Therefore, there is a problem in terms of extension of durable life of the board side connection terminal and the motor side connection terminal. On the other hand, when positions of the male terminal and the female terminal are highly accurately set to prevent the residual stress from occurring during connection, there is a problem in terms of manufacturing cost.

Furthermore, in the example in the past described in Patent Document 5, the power board, the large current board, and the control board, which configure a control device that controls the electric motor, are laminated and built in the housing and the cover, the cover is directly attached to the electric motor, and the electric motor that generates heat in the control device is also a heat generation source. Therefore, generated heat in the control device cannot be efficiently transmitted to a gear box of a reduction gear having a large heat capacity and a large surface area via the electric motor. As measures against this problem, heat radiation properties are improved by providing heat radiation fins. However, there is an unsolved problem in that an increase in size of the control device is inevitable because the heat radiation fins are provided.

Therefore, the present invention has been devised in view of the unsolved problems of the examples in the past and it is a first object of the present invention to provide an electric power steering apparatus in which it is possible to minimize a connection distance between a control unit and an electric motor and surely prevent electric noise from mixing between the control unit and the electric motor as well as to minimize electric resistance and minimize an electric loss by directly connecting the control unit and connection terminals of the electric motor and a torque sensor.

It is a second object of the present invention to provide an electric power steering apparatus in which it is possible to electrically connect a control unit and an electric motor easily and it is possible to minimize a connection distance between the control unit and the electric motor to minimize wiring resistance and surely prevent electric noise from mixing.

Moreover, it is a third object of the present invention to provide an electric power steering apparatus in which it is possible to easily perform phasing for an output shaft of an electric motor and a worm shaft of a worm gear mechanism.

Furthermore, it is a fourth object of the present invention to provide an electric power steering apparatus in which it is possible to simultaneously attain extension of durable life of a board side connection terminal and a motor side connection terminal and a reduction in manufacturing cost and it is possible to minimize a connection distance between the board side connection terminal and the motor side connection terminal to minimize wiring resistance and surely prevent electric noise from mixing.

Furthermore, it is a fifth object of the present invention to provide an electric power steering apparatus and a method of assembling the same in which it is possible efficiently transmit heat generated in a control unit to a reduction gear box while not providing a motor harness between an electric motor and the control unit and realize a reduction in size and weight.

In order to attain the first object, an electric power steering apparatus according to claim 1 is an electric power steering apparatus including a steering column having inserted therein a steering shaft to which steering torque is transmitted, a reduction gear box coupled to the steering column, and an electric motor that transmits a steering assisting force to the steering shaft via a reduction mechanism in the reduction gear box.

The electric power steering apparatus is characterized in that the electric motor and a control unit including a control board mounted with a control circuit that controls to drive the electric motor are provided side by side in the reduction gear box and a connection terminal of the electric motor is electrically connected to the control unit directly.

In this invention according to claim 1, the control unit is provided in the reduction gear box. Therefore, it is possible to electrically connect the connection terminal of the electric motor to the control unit directly, minimize electric connection length between the control unit and the electric motor to reduce mixing of electric noise, and minimize wiring resistance to reduce an electric loss. Further, it is unnecessary to provide a motor harness between the electric motor and the control unit. Therefore, noise radiated from motor harnesses is reduced and it is possible to reduce the influence on radio noise.

An electric power steering apparatus according to claim 2 is an electric power steering apparatus including a steering column having inserted therein a steering shaft to which steering torque is transmitted, a reduction gear box coupled to the steering column, and an electric motor that transmits a steering assisting force to the steering shaft via a reduction mechanism in the reduction gear box. The electric power steering apparatus is characterized in that the electric motor and a control unit including a control board mounted with a control circuit that controls to drive the electric motor are provided side by side in the reduction gear box, a connection terminal of the electric motor is electrically connected to the control unit directly, and a connection terminal of a torque sensor installed in the reduction gear box is electrically connected to the control unit directly.

In this invention according to claim 2, the control unit is provided in the reduction gear box. Therefore, it is possible to electrically connect the connection terminal of the electric motor and the connection terminal of the torque sensor to the control unit directly, minimize electric connection length between the control unit, the electric motor and the torque sensor to reduce mixing of electric noise, and minimize wiring resistance to reduce an electric loss.

Moreover, an electric power steering apparatus according to claim 3 is characterized in that, in the invention according to claim 1 or 2, the reduction gear box is made of a high heat conductive material.

In this invention according to claim 3, the reduction gear box is made of the high heat conductive material. Therefore, it is possible to increase a heat capacity and improve a heat radiation effect.

Furthermore, an electric power steering apparatus according claim 4 is characterized in that, in the invention according to claim 3, the reduction gear box is formed by die-casting any one of aluminum, an aluminum alloy, magnesium, and a magnesium alloy.

In this invention according to claim 4, it is possible to easily manufacture the reduction gear box while keeping high heat conductivity.

Furthermore, an electric power steering apparatus according to claim 5 is characterized in that, in the invention according to any one of claim 1 to 4, the control unit includes a heat radiation board on a contact surface with the reduction gear box.

In this invention according to claim 5, it is possible to radiate heat generated in the control unit to the reduction gear box having large heat mass via the heat radiation board.

An electric power steering apparatus according to claim 6 is characterized in that, in the invention according to any one of claims 1 to 5, the reduction gear box includes at least a worm housing unit that houses a worm coupled to an output shaft of the electric motor, a worm-wheel housing unit that houses a worm wheel coupled to the steering shaft, and a torque-sensor housing unit that is coupled to the worm-wheel housing unit to house the torque sensor and coupled to the steering column, and a control-unit mounting section for mounting the control unit is formed in an outer peripheral portion of the worm housing unit, the worm-wheel housing unit, and the torque-sensor housing unit.

In this invention according to claim 6, the control-unit mounting section is formed in the outer peripheral portion of the worm housing unit, the worm-wheel housing unit, and the torque-sensor housing unit. Therefore, it is possible to set the control unit close to the electric motor and the torque sensor and electrically connect the control unit to the electric motor and the torque sensor easily.

Moreover, an electric power steering apparatus according to claim 7 is characterized in that, in the invention according to claim 6, a distal end of the torque-sensor housing unit is formed as a contraction stopper for the steering column at the time of collapse, and a contraction stopper side end surface position of the control unit mounted on the control-unit mounting section is set further on a worm-wheel housing unit side than the contraction stopper.

In this invention according to claim 7, the distal end of the torque-sensor housing unit is formed as the contraction stopper for the steering column at the time of collapse and the contraction-stopper-side end face position of the control unit mounted on the control-unit mounting section is set further on the worm-wheel housing unit side than the contraction stopper. Therefore, it is possible to surely prevent interference between a moving member such as the steering column and the control unit at the time of collapse.

Furthermore, an electric power steering apparatus according to claim 8 is characterized in that, in the invention according to any one of claims 1 to 7, a motor-side connection section is formed in a position near and opposed to the control unit of the electric motor to project in a direction crossing at least an axial direction, and a unit-side connection section that is in surface contact with the motor-side connection section is formed in a position near and opposed to the electric motor of the control unit.

In this invention according to claim 8, the motor-side connection section projecting and formed in the position near and opposed to the control unit of the electric motor and the unit-side connection section that is in surface contact with the motor-side connection section is formed in the position near and opposed to the electric motor of the control unit. Therefore, it is possible to connect the electric motor and the control unit using the motor side connection end section and the unit-side connection section that are near and in surface contact with each other. It is possible to minimize electric connection length between the electric motor and the control unit, minimize wiring resistance, and surely prevent electric noise from mixing. It is unnecessary to provide connection terminals having large rigidity and it is possible to further improve assemblability.

Furthermore, an electric power steering apparatus according to claim 9 is characterized in that, in the invention according to claim 8, the motor-side connection section and the unit-side connection section is formed by one of a connection terminal and a terminal block.

In this invention according to claim 9, the motor-side connection section and the unit-side connection section are formed by one of the connection terminal and the terminal block. Therefore, it is possible to easily connect the motor-side connection section and the unit-side connection section by combining the connection terminal and the terminal block.

An electric power steering apparatus according to claim 10 is characterized in that, in the invention according to claim 8 or 9, the motor-side connection section is formed integrally with a bus bar that distributes power to a brush or a coil in the inside of the electric motor.

In this invention according to claim 10, the motor-side connection section is formed integrally with the bus bar that distributes power to the brush or the coil in the inside of the electric motor. Therefore, it is possible to minimize an energization path.

An electric power steering apparatus according to claim 11 is characterized in that, in the invention according to any one of claims 8 to 10, the motor-side connection section and the unit-side connection section are fixed by a locking tool such as a screw, a bolt, or a rivet in a state in which the connection sections are set in surface contact with each other.

In this invention according to claim 11, the motor-side connection section and the unit-side connection section are fixed by the locking tool. Therefore, it is possible to strengthen electric connection of the connection sections.

Furthermore, an electric power steering apparatus according to claim 12 is characterized in that, in the invention according to any one of claims 8 to 10, the motor-side connection section and the unit-side connection section are fixed by welding means such as fusing, spot welding, or TIG welding.

In this invention according to claim 12, the motor-side connection section and the unit-side connection section are fixed by the welding means. Therefore, it is possible to electrically connect the connection sections more firmly.

Furthermore, an electric power steering according to claim 13 is characterized in that, in the invention according to any one of claims 8 to 10, the motor-side connection section and the unit-side connection section are formed by a male terminal and a female terminal that are detachably attachable from a circumferential direction of the electric motor.

In this invention according to claim 13, the motor-side connection section and the unit-side connection section are formed by the male terminal and the female terminal detachably attachable from the circumferential direction of the electric motor. Therefore, in mounting the electric motor on the reduction gear box, even if the electric motor itself is rotated, it is possible to easily perform mounting of the electric motor without damaging the male terminal and the female terminal.

An electric power steering apparatus according to claim 14 is characterized in that, in the invention according to any one of claims 8 to 13, a contact surface of the motor-side connection section and the unit-side connection section is arranged to be a plane identical with an attaching surface to the reduction gear box of the electric motor.

In this invention according to claim 14, the contact surface of the motor-side connection section and the unit-side connection section is arranged to be the plane identical with the attaching surface to the reduction gear box of the electric motor. Therefore, in mounting the electric motor to the reduction gear box, even if the electric motor itself is rotated, the motor-side connection section and the unit-side connection section do not interfere with each other and it is possible to easily perform mounting of the electric motor.

Moreover, an electric power steering apparatus according to claim 15 is characterized in that, in the invention according to any one of claims 8 to 14, the motor-side connection section is formed in an L shape in a side view by a plate section along an axial direction of the electric motor and a projecting plate section extending in a radial direction from a distal end of the plate section.

In this invention according to claim 15, since the motor-side connection section is formed in an L shape by the plate section along the axial direction and the projecting plate section, it is possible to secure elasticity in a bending portion between the plate section along the axial direction and the projecting plate section. Therefore, it is possible to ease residual stress that occurs when the terminal and the terminal block are connected and extend durable life of the motor-side connection section.

Moreover, an electric power steering apparatus according to claim 16 is characterized in that, in the invention according to any one of claims 8 to 12, one of the motor-side connection section and the unit-side connection section is formed by a terminal plate of a reverse L shape with a radial direction plate section extending in the radial direction from an outer peripheral surface of the electric motor and an axial direction plate section extending in parallel to the axial direction from a distal end of the radial direction plate section, and the other of the motor-side connection section and the unit-side connection section is formed by a terminal block having an axial direction contact surface that is in contact with a surface of the axial direction plate section opposed to the outer peripheral surface of the electric motor.

In this invention according to claim 16, one of the motor-side connection section and the unit-side connection section is formed by the terminal plate of a reverse L shape and the other is formed by the terminal block having the axial direction contact surface that is in contact with the surface of the axial direction plate section opposed to the outer peripheral surface of the electric motor. Therefore, it is possible to reduce the height of the motor-side connection section and the unit-side connection section.

Furthermore, an electric power steering apparatus according to claim 17 is characterized in that, in the invention according to any one of claims 8 to 12, one of the motor-side connection section and the unit-side connection section is formed by plural flexible cables led out from an outer peripheral portion thereof and terminal plate sections attached to distal ends of the respective flexible cables, and the other of the motor-side connection section and the unit-side connection section is formed by a terminal block, a contact surface of which with the terminal plate sections is formed in the axial direction of the electric motor.

In this invention according to claim 17, one of the motor-side connection section and the unit-side connection section is formed by the flexible cables and the terminal plate sections. Therefore, even when there is an error in setting positions of the motor-side connection section and the unit-side connection section, it is possible to electrically connect the connection sections surely.

Furthermore, an electric power steering apparatus according to claim 18 is characterized in that, in the invention according to any one of claims 8 to 12, one of the motor-side connection section and the unit-side connection section is formed by a cable guide unit having installed therein plural radial direction plate sections extending in the radial direction of the electric motor, plural flexible cables fastened and fixed to the respective radial direction plate sections of the cable guide unit by a fastening tool, and terminal plate sections attached to distal ends of the flexible cables, and the other of the motor-side connection section and the unit-side connection section is formed by a terminal block, a contact surface of which with the terminal plate sections is formed in the axial direction of the electric motor.

In this invention according to claim 18, one of the motor-side connection section and the unit-side connection section is formed by the cable guide unit having installed therein plural radial direction plate sections extending in the radial direction of the electric motor, the plural flexible cables fastened and fixed to the respective radial direction plate sections of the cable guide unit by the fastening tool, and the terminal plate sections attached to the distal ends of the flexible cables. Therefore, even if there is an error in setting positions of the motor-side connection section and the unit-side connection section, it is possible to electrically connect the connection sections surely.

An electric power steering apparatus according to claim 19 is characterized in that, in the invention according to claim 18, an insulating partition wall that insulates the plural flexible cables is formed in the cable guide unit.

In this invention according to claim 19, the flexible cables are insulated by the insulating partition wall provided in the cable guide unit. Therefore, even if flexible cables having conductors disposed on outer peripheries thereof are used, it is possible to surely prevent the flexible cables from short-circuiting.

Moreover, an electric power steering apparatus according to claim 20 is characterized in that, in the invention according to any one of claims 17 to 19, an insulating partition wall that insulates the terminal plate sections adjacent thereto is formed on a contact surface, with which the terminal plate sections are brought into contact, in the terminal block.

In this invention according to claim 20, the insulating partition wall is formed in the terminal block as well. Therefore, it is possible to insulate the terminal plate sections from one another and surely prevent the terminal plate sections from short-circuiting.

Furthermore, an electric power steering apparatus according to claim 21 is characterized in that, in the invention according to any one of claims 16 to 20, the electric power steering apparatus has a protective cover that covers the motor-side connection section and the unit-side connection section in a state in which the connection sections are connected, and a height position of the protective cover is selected to be equal to or lower than a height position of the control unit.

In this invention according to claim 21, the motor-side connection section and the unit-side connection section are covered by the protective cover in a state in which the connection sections are connected. Therefore, it is possible to secure electric connection of the motor-side connection section and the unit-side connection section. Further, the height position of the protective cover is selected to be equal to or lower than the height position of the control unit. Therefore, the protective cover does not project further than the control unit and it is possible to easily perform assembly work and surely prevent the protective cover from coming into contact with a moving member at the time of collapse.

Furthermore, an electric power steering apparatus according to claim 22 is characterized in that, in the invention according to any one of claims 8 to 21, the control unit has a synthetic resin frame and, in a position of the synthetic resin frame opposed to one of the connection terminal and the terminal block of the electric motor, the other of the connection terminal and the terminal block is formed via an attaching plate section fixed to the reduction gear box.

In this invention according to claim 22, in the position of the synthetic resin frame opposed to one of the connection terminal and the terminal block of the electric motor, the other of the connection terminal and the terminal block is formed via the attaching plate section fixed to the reduction gear box. Therefore, it is possible to prevent the connection terminal or the terminal block from generating vibration different from that of the reduction gear box because of vibration of a vehicle and suppress stress concentration from occurring in the connection terminal or the terminal block.

An electric power steering apparatus according to claim 23 is an electric power steering apparatus including a steering column having inserted therein a steering shaft to which steering torque is transmitted, a reduction gear box coupled to the steering column, and an electric motor that transmits a steering assisting force to the steering shaft via a reduction mechanism in the reduction gear box. The electric power steering apparatus is characterized in that the reduction gear box has installed therein a worm gear mechanism having a worm shaft coupled to an output shaft of the electric motor and a worm wheel meshing with a worm formed in the worm shaft and coupled to the steering shaft, a motor side connection terminal of the electric motor and a control unit side connection terminal of the control unit are formed to overlap in an axial direction near a motor attaching flange formed in the reduction gear box and to be capable of coming into surface contact with each other, and the motor side connection terminal and the control unit side connection terminal are brought into surface contact with each other to overlap in the axial direction after coupling of the output shaft of the electric motor and the worm shaft is started.

In this invention according to claim 23, the motor side connection terminal and the control unit side connection terminal do not overlap in the axial direction until the coupling of the output shaft of the electric motor and the worm shaft is started. Therefore, even if the electric motor itself is rotated in a circumferential direction, the motor side connection terminal and the control unit side connection terminal do not interfere with each other and it is possible to easily perform the coupling of the output shaft of the electric motor and the worm shaft.

Moreover, an electric power steering apparatus according to claim 24 is characterized in that, in the invention according to claim 23, when a distance from a housing-side end face of a motor flange formed in the electric motor to a distal end of the motor side connection terminal is represented as L4, a distance from a motor-side end face of the motor attaching flange formed in the reduction gear box to a motor-side end face of the worm shaft is represented as L5, a distance from the motor-side end face of the motor attaching flange to a distal end of the control unit side connection terminal is represented as L6, and a distance from the housing-side end face of the motor flange to a distal end surface of the output shaft of the electric motor is represented as L7, (L4+L5+L6)<L7.

In this invention according to claim 24, a sum of the distance L4 from the housing-side end face of the motor flange formed in the electric motor to the distal end of the motor side connection terminal, the distance L5 from the motor-side end face of the motor attaching flange formed in the reduction gear box to the motor-side end face of the worm shaft of the worm gear mechanism, and the distance L6 from the motor-side end face of the motor attaching flange to the distal end of the control unit side connection terminal is set smaller than the distance L7 from the housing-side end face of the motor flange to the distal end surface of the output shaft of the electric motor. Therefore, the motor side connection terminal does not overlap the control unit side connection terminal before the output shaft of the electric motor fits in the worm shaft of the worm gear mechanism. Therefore, it is possible to easily perform phasing of the output shaft of the electric motor and the worm shaft of the worm gear mechanism.

Furthermore, an electric power steering apparatus according to claim 25 is characterized in that, in the invention according to claim 24, fitting length of the output shaft of the electric motor and the worm shaft of the worm gear mechanism is set smaller than inro fitting length of a motor body of the electric motor and the reduction gear box.

In this invention according to claim 25, since the fitting length of the output shaft of the electric motor and the worm shaft of the worm gear mechanism is set smaller than the inro fitting length of the motor body of the electric motor and the gear housing, even when the mass of the electric motor is large (axial direction length of the motor body is large), attachment length of the electric motor projecting from the gear housing is not so large. Therefore, in addition to the effect of the invention according to claim 24, it is possible to attach an electric motor having large mass to the gear housing.

Furthermore, an electric power steering apparatus according to claim 26 is an electric power steering apparatus including a steering column having inserted therein a steering shaft to which steering torque is transmitted, a reduction gear box coupled to the steering column, and an electric motor that transmits a steering assisting force to the steering shaft via a reduction mechanism in the reduction gear box. The electric power steering apparatus is characterized in that the electric motor and a control unit including a control board mounted with a control circuit that controls to drive the electric motor are provided side by side in the reduction gear box, a motor side connection terminal is formed in a position near the control unit of the electric motor, a control unit side connection terminal is formed in a position near the electric motor of the control unit, and at least one of the motor side connection terminal and the control unit side connection terminal is formed in at least one of the electric motor and the control unit with a predetermined dimensional tolerance, whereby the motor side connection terminal and the control unit side connection terminal are opposed to each other with a gap provided between the terminals, one of the control unit side connection terminal and the motor side connection terminal is formed in a flexible structure in which the connection terminal is elastically deformed in a direction toward the other of the control unit side connection terminal and the motor side connection terminal to absorb the gap and come into contact with the other connection terminal, and the other of the control unit side connection terminal and the motor side connection terminal is formed in a rigid structure in which the connection terminal cannot be deformed toward one of the control unit side connection terminal and the motor side connection terminal.

In this invention according to claim 26, since at least one of the motor side connection terminal and the board side connection terminal is formed in the flexible structure, the other is formed in the rigid structure, and one of the connection terminals is elastically deformed to electrically connect both the connection terminals, it is unnecessary to arrange the motor side connection terminal and the board side connection terminal in highly accurate positions and it is also unnecessary to form both the motor side connection terminal and the board side connection terminal in the flexible structure. Therefore, it is possible to realize a reduction in manufacturing cost.

An electric power steering apparatus according to claim 27 is characterized in that, in the invention according to claim 26, a long hole is formed at a distal end portion of one of the control unit side connection terminal and the motor side connection terminal formed in the flexible structure, a screw hole is formed in the other of the control unit side connection terminal and the motor side connection terminal formed in the rigid structure, the screw hole and the long hole of one and the other of the control unit side connection terminal and the motor side connection terminal are associated with each other, and a fixing screw is screwed into the screw hole through the long hole to electrically connect both the control unit side connection terminal and the motor side connection terminal.

In this invention according to claim 27, the long hole through which the fixing screw passes is formed in one of the board side connection terminal and the motor side connection terminal electrically connected by the fixing screw. Since the long hole is formed, it is possible to absorb fluctuation during manufacturing of the board side connection terminal and the motor side connection terminal. Therefore, it is possible to realize a further reduction in manufacturing cost.

Moreover, an electric power steering apparatus according to claim 28 is characterized in that, in the invention according to claim 26 or 27, one of the control unit side connection terminal and the motor side connection terminal formed in the flexible structure is a member formed in an L shape in a side view including a first elastic section extending toward the other of the control unit side connection terminal and the motor side connection terminal and a second elastic section extending from a distal end of the first elastic section in a direction along a connection surface of the other of the control unit side connection terminal and the motor side connection terminal.

In this invention according to claim 28, even if a gap is present between the motor side connection terminal and the board side connection terminal, one of the board side connection terminal and the motor side connection terminal formed in an L shape is elastically deformed in a direction toward the other of the board side connection terminal and the motor side connection terminal and electrically connected to the other while absorbing the gap. Therefore, it is possible to ease residual stress during connection of the motor side connection terminal and the board side connection terminal and realize extension of durable life of the motor side connection terminal and the board side connection terminal.

Furthermore, an electric power steering apparatus according to claim 29 is characterized in that, in the invention according to claim 28, the motor side connection terminal is formed near a motor side flange of the electric motor coupled to a gear box side flange provided in the reduction gear box, the control unit side connection terminal is formed in the control unit fixed to the reduction gear box and is arranged near the reduction gear box side flange, and the first elastic section forming one of the control unit side connection terminal and the motor side connection terminal is set to length not projecting further forward than a flange surface of the reduction gear box side flange or a flange surface of the motor side flange.

In this invention according to claim 29, the motor side connection terminal and the board side connection terminal do not project forward from the flange surfaces thereof. Therefore, in assembling the control unit and the electric motor during manufacturing, it is possible to prevent interference of the control unit and the electric motor, breakage due to damage, and deterioration in functions.

Furthermore, an electric power steering apparatus according to claim 30 is an electric power steering apparatus including a steering column having inserted therein a steering shaft to which steering torque is transmitted, an electric motor that transmits a steering assisting force to the steering column via a reduction mechanism in a reduction gear box, and a control unit that controls to drive the electric motor based on the steering torque detected by the torque sensor. The electric power steering apparatus is characterized in that the electric motor and the electric motor control unit are assembled to the reduction gear box, the electric motor includes a brushless motor having an electric contact for external connection connected to a motor coil, the control unit has an electric contact connected to the electric contact of the electric motor, the electric contact of the electric motor and the electric contact of the control unit are arranged in sections where the electric contacts are directly connected in a state in which the electric motor and the control unit are assembled to the reduction gear box, and the control unit is assembled to the reduction gear box to directly transmit heat, which is generated when the electric motor is controlled to be energized, to the reduction gear box.

In this invention according to claim 30, the electric motor and the control unit are assembled to the reduction gear box having a large heat capacity and a large surface area. Therefore, it is possible to efficiently transmit generated heat of the control unit to the reduction gear box, reduce a size of heat radiation fins of the control unit as much as possible or omit the heat radiation fins, and realize a reduction in size and weight of the electric power steering apparatus.

The motor coil and an output stage of the control unit can be connected without the intervention of a wire harness. Therefore, it is possible to omit a wire harness for motor energization and provide a highly efficient electric power steering apparatus that is small and light, manufactured at low cost, and having a reduced wiring loss.

Moreover, since the electric motor is the brushless motor, there is no loss due to contact resistance of a brush. In conjunction with the omission of the wire harness for motor energization, it is possible to apply the electric power steering apparatus to a large car that needs a large steering assisting thrust that cannot be obtained only by a method of reducing one of the wiring loss and the loss due to contact resistance.

While a large steering assisting thrust is unnecessary, when the electric power steering apparatus is applied to a small car, since a loss is small, it is possible to further reduce sizes of the electric motor and the control unit than those in the present situation.

An electric power steering apparatus according to claim 31 is characterized in that, in the invention according to claim 30, the electric motor includes a rotor rotation angle detector that detects a rotation angle of a rotor disposed on an output shaft side and has an electric contact for external connection, the control unit includes an electric contact connected to the electric contact of the rotor rotation angle detector, and the electric contact of the rotor rotation angle detector and the electric contact of the control unit are arranged in sections where the electric contacts are directly connected in a state in which the electric motor and the control unit are assembled to the reduction gear box.

In this invention according to claim 31, since the electric contact connected to the rotor rotation angle detector and the electric contact for receiving a signal of the rotor rotation angle detector in the control unit can be directly connected, the rotor rotation angle detector and the control unit can be connected without the intervention of a wire harness. Therefore, it is possible to omit a wire harness for transmitting a rotor rotation angle signal to the control unit and provide a smaller, lighter, and low-cost electric power steering apparatus.

Moreover, an electric power steering apparatus according to claim 32 is characterized in that, in the invention according to claim 31, the electric motor includes a coupling section that fits in a motor mounting surface of the reduction gear box and is bolted, the rotor rotation angle detector is installed in the coupling section, the electric contact of the electric motor is formed to project in at least one of a vertical direction and a horizontal direction with respect to the reduction-gear-box-side end face, and the electric contact of the rotor rotation angle detector is formed to project in at least one of the vertical direction and the horizontal direction with respect to the reduction-gear-box-side end face.

In this invention according to claim 32, the electric contact connected to the motor coil of the electric motor projects in at least one of the vertical direction and the horizontal direction from an end face of the coupling section, it is easy to directly connect the control unit assembled to the reduction gear box to the electric connection terminal, and wiring leading from the output stage of the control unit to the motor coil can be set extremely short. Therefore, it is possible to reduce a wiring loss and provide a highly efficient electric power steering apparatus.

Since the electric contact of the rotor rotation angle detector is formed to project in at least one of the vertical direction and the horizontal direction with respect to the reduction-gear-box-side end face of the motor flange, direct contact with the electric contact of the control unit assembled to the reduction gear box is easy and it is possible to transmit a rotator rotation angel signal necessary for commutation of the brushless motor to the control unit without using a wire harness. Therefore, it is possible to provide a low-cost electric power steering apparatus.

Furthermore, an electric power steering apparatus according to claim 33 is characterized in that, in the invention according to any one of claims 30 to 32, the torque sensor includes an electric contact for external connection connected to a torque detection element or a signal processing circuit thereof, the control unit has an electric contact connected to the electric contact of the torque sensor, and the electric contact of the torque sensor and the electric contact of the control unit are arranged in sections where the electric contacts are directly connected to each other in a state in which the torque sensor and the control unit are assembled to the reduction gear box.

In this invention according to claim 33, the electric contact connected to the torque sensor and the electric contact connected to the electric contact of the torque sensor in the control unit can be directly connected. Therefore, it is possible to connect the torque sensor and the control unit without the intervention of a wire harness, omit a wire harness for transmitting the steering torque to the control unit, and provide a smaller, lighter, and low-cost electric power steering.

Furthermore, an electric power steering apparatus according to claim 34 is characterized in that, in the invention according to claim 33, the electric contact connected to the torque sensor is formed to project in the vertical direction with respect to a mounting surface of the control unit in a state in which the control unit is assembled to the reduction gear box.

In this invention according to claim 34, the electric contact of the torque sensor projects in the vertical direction from the control unit mounting surface of the reduction gear box in a state in which the electric contract is assembled to the reduction gear box. Therefore, it is easy to directly connect the control unit assembled to the reduction gear box to the electric connection terminal and it is possible to transmit steering torque indispensable for control of the electric power steering apparatus to the control unit without using a wire harness and reduce a size of the electric power steering apparatus.

An electric power steering apparatus according to claim 35 is characterized in that, in the invention according to any one of claims 30 to 34, the reduction mechanism includes a worm reduction gear and the control unit mounting surface of the reduction gear box is formed as a plane in the vertical direction with respect to a worm wheel axial direction.

In this invention according to claim 35, the control unit mounting surface is the plane in the vertical direction with respect to the axial direction of the worm wheel. Therefore, it is possible to arrange the control unit to extend across a steering torque sensor built in the steering wheel side of a worm sheet and the electric motor arranged at an end of the worm shaft, it is easy to directly connect the torque sensor and the end of the control unit, and it is possible to transmit steering torque indispensable to control of the electric power steering apparatus to the control unit without using a wire harness and reduce a size of the electric power steering apparatus.

Moreover, an electric power steering apparatus according to claim 36 is characterized in that, in the invention according to any one of claims 30 to 32, a width direction shape of the control unit is formed line symmetrical to an axis of the electric motor.

In this invention according to claim 36, since the width direction shape of the control unit is line symmetrical to the axis of the electric motor, even when an attaching direction of the electric motor is changed according to whether a car is a right-hand drive car or a left-hand drive car, there is no difference in the attaching height. Therefore, it is unnecessary to change the electric motor and the control unit and it is possible to provide a low-cost electric power steering apparatus.

Furthermore, an electric power steering apparatus according to claim 37 is characterized in that, in the invention according to any one of claims 30 to 34, the electric contact to the electric motor of the control unit is formed by a screwing terminal that comes into contact with the electric contact of the electric motor with a screw axial force and is electrically connected.

In this invention according to claim 37, the control unit uses, as the electric contact connected to the electric contact of the electric motor, the screwing terminal that comes into contact with the motor side electric contact with a screw axial force and is electrically connected. Therefore, the electric connection is firmly and surely performed and it is possible to reduce a wiring loss and control fluctuation in contact resistance.

Furthermore, an electric power steering apparatus according to claim 38 is characterized in that, in the invention according to any one of claims 30 to 34, the electric contact to the electric motor of the control unit is formed by a spring contact terminal that comes into contact with the electric contact of the electric motor with a spring pressure and is electrically connected, and an insertion opening of the spring contact terminal is opened toward the motor mounting surface of the reduction gear box in a state in which the control unit is assembled to the reduction gear box.

In this invention according to claim 38, the control unit uses, as the electric contact connected to the electric contact of the electric motor, the spring contact terminal that comes into contact with the electric contact of the electric motor with a spring pressure and is electrically connected. The insertion opening of the spring contact terminal is opened toward the motor mounting surface in the reduction gear box in a state in which the control unit is assembled to the reduction gear box. Therefore, in attaching the electric motor to the motor mounting surface, it is possible to perform electric connection simply by inserting the electric contact of the electric motor, reduce a wiring loss, and reduce man-hours. Moreover, since the electric contacts are not mechanically fixed to each other, it is possible to permit a stress caused by an assembly error, accuracy of respective components, a coefficient of linear expansion difference, and the like to escape.

An electric power steering apparatus according to claim 39 is characterized in that, in the invention according to any one of claims 30 to 34, the electric contact to the electric motor of the control unit is electrically connected to the electric contact of the electric motor by welding or soldering.

In this invention according to claim 39, the electric contacts of the control unit and the electric motor are connected by welding or soldering. Therefore, firm and sure electric connection is obtained and it is possible to reduce a wiring loss and control fluctuation in contact resistance.

Moreover, an electric power steering apparatus according to claim 40 is characterized in that, in the invention according to claim 31 or 32, the electric contact to the rotor rotation angle detector of the control unit is formed by a spring contact terminal that comes into contact with the electric contact of the rotor angle detector with a spring pressure and is electrically connected.

In this invention according to claim 40, the control unit uses, as the electric contact connected to the electric contact of the rotor rotation angle detector of the electric motor, the spring contact terminal that comes into contact with the electric contact of the rotor rotation angle detector with a spring pressure and is electrically connected. The insertion opening of the spring contact terminal is opened toward the motor mounting surface in the reduction gear box in a state in which the control unit is assembled to the reduction gear box. Therefore, in assembling the electric motor to the motor mounting surface, electric connection is obtained by simply inserting the electric contact of the rotor rotation angle detector into the spring contact terminal and it is possible to reduce connection man-hours.

Furthermore, an electric power steering apparatus according to claim 41 is characterized in that, in the invention according to claim 31 or 32, the electric contact to the rotor rotation angle detector of the control unit is electrically connected to the electric contact of the rotor rotation angle detector by welding or soldering.

In this invention according to claim 41, the electric contacts of the control unit and the rotor rotation angle detector are electrically connected firmly and surely by welding or soldering. Therefore, it is possible to prevent a connection failure of the contacts and improve reliability of the contacts.

Furthermore, an electric power steering apparatus according to claim 42 is characterized in that, in the invention according to claim 33 or 34, the electric contact to the torque sensor of the control unit is formed by a spring contact terminal that comes into contact with the electric contact of the torque sensor with a spring pressure and is electrically connected.

In this invention according to claim 42, the control unit uses, as the electric contact connected to the electric contact of the torque sensor, the spring contact terminal that comes into contact with the electric contact of the torque sensor with a spring pressure and is electrically connected. The insertion opening of the spring contact terminal is opened toward the control unit mounting surface in the reduction gear box in a state in which the control unit is assembled to the reduction gear box. Therefore, in assembling the control unit to the reduction gear unit, electric connection is performed simply by inserting the electric contact of the torque sensor into the spring contact terminal and it is possible to reduce connection man-hours.

An electric power steering apparatus according to claim 43 is characterized in that, in the invention according to claim 33 or 34, the electric contact to the torque sensor of the control unit is electrically connected to the electric contact of the torque sensor by welding or soldering.

In this invention according to claim 43, the electric connection terminals of the control unit and the torque sensor are electrically connected firmly and surely by welding or soldering. Therefore, it is possible to prevent a contact failure of the contacts and improve reliability.

Moreover, an electric power steering apparatus according to claim 44 is characterized in that, in the invention according to any one of claims 30 to 43, a sealing mechanism for performing water proof and dust proof is provided in the electric contact to the electric motor of the control unit.

In this invention according to claim 44, the sealing mechanism for water proof and dust proof is provided in a junction of the electric points of the control unit and the electric motor. Therefore, it is possible to apply the invention not only to an electric power steering apparatus of a column assist type set in a cabin but also to electric power steering apparatuses arranged in an engine room such as electric power steering apparatuses of a pinion assist type and a rack assist type.

Furthermore, an electric power steering apparatus according to claim 45 is characterized in that, in the invention according to any one of claims 30 to 44, a sealing mechanism for performing water proof and dust proof is provided in the electric contact to the rotor rotation angle detector of the control unit.

In this invention according to claim 45, the sealing mechanism for water proof and dust proof is provided in a junction of the electric contacts of the control unit and the rotor rotation angle detector. Therefore, it is possible to apply the invention not only to an electric power steering apparatus of a column assist type set in a cabin but also to electric power steering apparatuses arranged in an engine room such as electric power steering apparatuses of a pinion assist type and a rack assist type.

Furthermore, an electric power steering apparatus according to claim 46 is characterized in that, in the invention according to any one of claims 30 to 45, a sealing mechanism for performing water proof and dust proof is provided in the electric contacts to the torque sensor of the control unit.

In this invention according to claim 46, the sealing mechanism for water proof and dust proof is provided in a junction of the electric contacts of the control unit and the torque detecting means. Therefore, it is possible to apply the invention not only to an electric power steering apparatus of a column assist type set in a cabin but also to electric power steering apparatuses arranged in an engine room such as electric power steering apparatuses of a pinion assist type and a rack assist type.

An electric power steering apparatus according to claim 47 is characterized in that, in the invention according to any one of claims 30 to 46, the reduction mechanism includes a worm reduction gear and a control unit mounting surface on which the control unit is mounted is formed in a section where the worm shaft is installed in the reduction gear box.

In this invention according to claim 47, the reduction mechanism includes the worm reduction gear and the control unit mounting surface on which the control unit is mounted is formed in the section where the worm shaft is installed in the reduction gear box. Therefore, it is possible to perform layout without projecting the control unit by assembling the control unit in a direction in which a longitudinal direction thereof coincides with an axial direction of the worm shaft. A sufficient contact surface corresponding to a bearing surface of the control unit is obtained and adhesion with the control unit is improved. Therefore, it is possible to efficiently transmit heat of the control unit to the reduction gear box, omit the heat radiation fins provided in the control unit, and reduce a size of the electric power steering apparatus.

Moreover, an electric power steering apparatus according to claim 48 is characterized in that, in the invention according to claim 32, the reduction mechanism includes a worm reduction gear, the worm gear shaft and the output shaft of the electric motor is spline-connected, and coupling length thereof is set larger than projection length of the electric contact of the electric motor and the electric contact of the rotor rotation angle detector from the attachment flange end face.

In this invention according to claim 48, joints of the worm shaft and the output shaft of the electric motor are splines and fitting length thereof is longer than the projection length of the electric contact of the electric motor and the electric contact of the rotor rotation angle detector from the attachment flange end face. Therefore, it is possible to rotate the electric motor in a state in which the splines are shallowly fit and perform positioning of the electric contacts of the rotor rotation angle detector and the electric motor and the electric contact of the control unit. It is possible to omit a wire harness for transmitting a rotor rotation angle signal and the wire harness for motor energization while using the spline connection as a shaft joint.

Furthermore, an electric power steering apparatus assembling method according to claim 49 is an electric power steering apparatus assembling method for assembling, to a reduction gear box, a steering column having inserted therein a steering shaft to which steering torque is transmitted, a torque sensor that detects the steering torque, an electric motor that transmits a steering assisting force to the steering shaft via a reduction mechanism in the reduction gear box, and a control unit that controls to drive the electric motor on the basis of the steering torque detected by the torque sensor. The torque sensor includes a torque detection element. The electric power steering apparatus assembling method is characterized by installing a signal processing circuit that processes a steering torque detection signal detected by the torque detection element in the control unit, installing the torque sensor in the reduction gear box, subsequently assembling the control unit to the reduction gear box, in which the torque sensor is installed, to electrically connect the torque detection element and the control unit, and subsequently assembling the electric motor to the reduction gear box to electrically connect the control unit and the electric motor.

In this invention according to claim 49, the torque sensor includes only the torque detection element, the signal processing circuit thereof is installed in the control unit, the control unit and the torque detection element are electrically connected in a state in which the control unit is assembled to the reduction gear box in which the torque detection element is installed, and, thereafter, the electric motor is assembled to the reduction gear box. Therefore, it is possible to perform calibration of the signal processing circuit at a stage when the control unit is assembled to the reduction gear box in which the torque detection element is installed. Therefore, it is possible to perform calibration of the signal processing circuit without providing the signal processing circuit separately from the control unit while omitting a wire harness and without being affected by the electric motor and reduce the number of components without deteriorating accuracy of the torque sensor.

Furthermore, an electric power steering apparatus assembling method according to claim 50 is an electric power steering apparatus assembling method for assembling a steering column having inserted therein a steering shaft to which steering torque is transmitted, a torque sensor that detects the steering torque, an electric motor that transmits a steering assisting force to the steering shaft via a reduction mechanism in a reduction gear box, and a control unit that controls to drive the electric motor on the basis of the steering torque detected by the torque sensor to the reduction gear box. The torque sensor includes a torque detection element and a signal processing circuit that processes a steering torque detection signal of the torque detection element. The electric power steering apparatus assembling method is characterized by assembling the torque detection element and the signal processing circuit to the reduction gear box, subsequently assembling the electric motor to the reduction gear box, and subsequently assembling the control unit to the reduction gear box to electrically connect the control unit and the torque detection element and electrically connect the control unit and the electric motor.

In this invention according to claim 50, the torque sensor includes the torque detection element and the signal processing circuit and the signal processing circuit thereof is arranged separately from the control unit. Therefore, it is possible to perform calibration of the signal processing circuit in the torque sensor in a state of the single reduction gear box. The electric motor is assembled to the reduction gear box in which the calibration of the signal processing circuit is finished. Thereafter, in a state in which the control unit is assembled to the reduction gear box, the control unit and the torque detection element are electrically connected and the control unit and the electric motor are electrically connected. Therefore, it is easy to assemble the electric power steering apparatus and it is possible to simplify an assembly process without deteriorating accuracy of the torque sensor.

According to the present invention, the electric motor and the control unit are provided side by side in the reduction gear box, the motor-side connection section is formed to project in the position near and opposed to the control unit of the electric motor, and the unit-side connection section that is in surface contact with the motor-side connection section is formed in the position near and opposed to the electric motor of the control unit. Therefore, there is an effect that it is possible to connect the electric motor and the control unit using the motor side connection end section and the unit-side connection section that are near and in surface contact with each other, it is possible to minimize electric connection length between the electric motor and the control unit, minimize wiring resistance, and surely prevent electric noise from mixing, it is unnecessary to provide connection terminals having large rigidity, and it is possible to further improve assemblability.

It is unnecessary to provide a motor harness between the electric motor and the control unit. Therefore, there is an effect that noise radiated from motor harnesses is reduced and it is possible to reduce the influence on radio noise.

Moreover, the motor-side connection section is projected from the electric motor in a direction orthogonal to an axial direction thereof. Therefore, there is an effect that, when the electric motor is assembled while being rotated in mounting the electric motor on the reduction gear box, it is possible to surely prevent the unit-side connection section from being damaged by the motor-side connection section.

Moreover, a contact surface of the motor-side connection section and the unit-side connection section is arranged to be a plane identical with an attaching surface to the reduction gear box of the electric motor. Therefore, there is an effect that, when the electric motor is assembled while being rotated in mounting the electric motor on the reduction gear box, it is possible to surely prevent the projecting section of the attaching flange and the like of the electric motor from interfering with the connection section on the control unit side.

Furthermore, the contact surface of the motor-side connection section and the unit side connection is set in the axial direction of the electric motor. Therefore, there is an effect that it is possible to reduce the height of the contact surface and secure a sufficient contact area.

Furthermore, the sum of the distance L4 from the housing-side end face of the motor flange formed in the electric motor to the distal end of the motor side connection terminal, the distance L5 from the motor-side end face of the motor attaching flange formed in the gear housing to the motor-side end face of the worm shaft of the worm gear mechanism, and the distance L6 from the motor-side end face of the motor attaching flange to the distal end of the control unit side connection terminal is set smaller than the distance L7 from the housing-side end face of the motor flange to the distal end surface of the output shaft of the electric motor. Therefore, the motor side connection terminal does not overlap the control unit side connection terminal before the output shaft of the electric motor fits in the worm shaft of the worm gear mechanism.

Therefore, it is possible to easily perform phasing of the output shaft of the electric motor and the worm shaft of the worm gear mechanism.

Since at least one of the motor side connection terminal and the board side connection terminal is formed in the flexible structure, the other is formed in the rigid structure, and one of the connection terminals is elastically deformed to electrically connect both the connection terminals, it is unnecessary to arrange the motor side connection terminal and the board side connection terminal in highly accurate positions and it is also unnecessary to form both the motor side connection terminal and the board side connection terminal in the flexible structure. Therefore, there is an effect that it is possible to realize a reduction in manufacturing cost.

Moreover, according to the present invention, the electric motor and the control unit are assembled to the reduction gear box. Therefore, there is an effect that it is possible to efficiently transmit heat generated by the control unit directly to the reduction gear box having a large heat capacity and a large surface area, realize a reduction in size and weight of the control unit by forming the heat radiation fins of the control unit as small as possible or omitting the heat radiation fins, and, since the brushless motor is applied as the electric motor, no loss is caused by contact resistance of a brush, it is possible to omit a wire harness for motor energization, generate a large steering assisting thrust, and apply the electric power steering apparatus to a large car. Further, while a large steering assisting thrust is unnecessary, when the electric power steering apparatus is applied to a small car, since a loss is small, there is an effect that it is possible to further reduce sizes of the electric motor and the control unit than those in the present situation. Moreover, it is possible to omit a motor harness between the control unit and the electric motor. Besides, it is possible to omit a wire harness between the rotor rotation angle detector such as a resolver mounted on the electric motor and the control unit and between the steering torque sensor mounted on the reduction gear box and the control unit and provide a smaller, lighter, and low-cost electric power steering apparatus.

BRIEF DESCRIPTION OF THE DRAWINGS

FIGS. 11A and 11B are the diagram showing a connection relation between the electric motor and the control unit, wherein FIG. 11A is a perspective view and FIG. 11B is an enlarged view of the main part;

FIGS. 23A, 23B and 23C are the explanatory diagrams showing the relations of mounting of an electric motor and a control unit on a reduction gear box according to the second embodiment, wherein FIG. 23A is a plan view of a main part with a worm housing unit of the reduction gear box shown in section, FIG. 23B is a disassembled view of the main part, and FIG. 23C is a perspective view showing a relation between a connection terminal and a terminal block;

FIGS. 24A and 24B are the explanatory diagrams showing a third embodiment of the electric power steering apparatus according to the present invention, wherein FIG. 24A is an explanatory diagram showing a relation of mounting of an electric motor and a control unit on a reduction gear box, FIG. 24A is a plan view of a main part with a worm housing unit of the reduction gear box in a state in which a protective cover is removed shown in section, and FIG. 24B is a disassembled view of the main part;

FIGS. 25A, 25B, 25C and 25D are the perspective views showing a procedure for connecting a motor-side connection section of the electric motor and a unit-side connection section of the control unit according to the third embodiment;

FIG. 26 is a perspective view showing a part of the electric power steering apparatus according to the first embodiment of the present invention in a disassembled state;

FIGS. 39A and 39B are the perspective views showing the control unit, wherein FIG. 39A is a perspective view on a front side and FIG. 39B is a perspective view on a rear side.

BEST MODE FOR CARRYING OUT THE INVENTION

Embodiments of the present invention will be hereinafter explained on the basis of the drawings.

Figure 1:
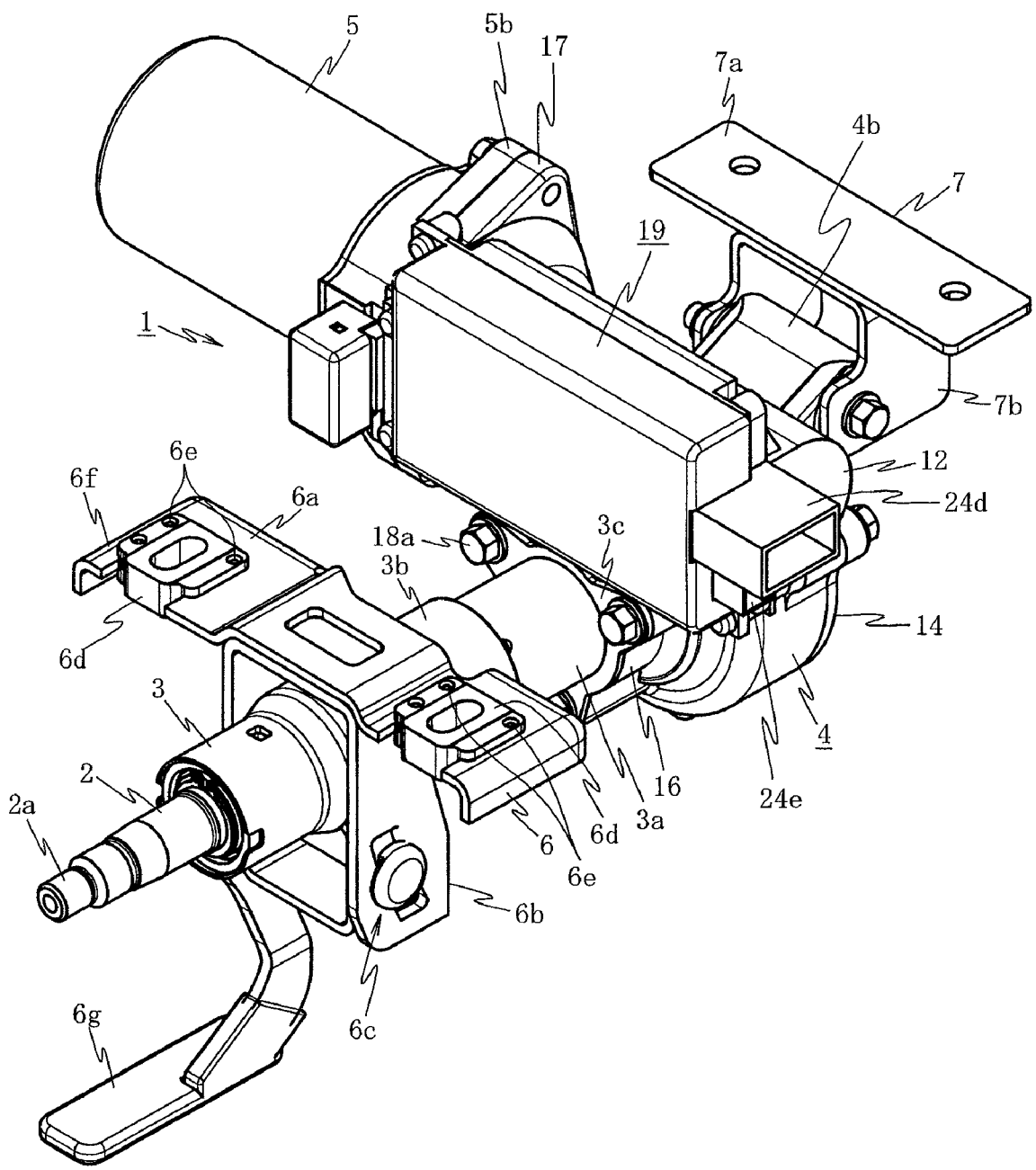
FIG. 1 is a perspective view showing a first embodiment of an electric power steering apparatus according to the present invention.
Figure 2:
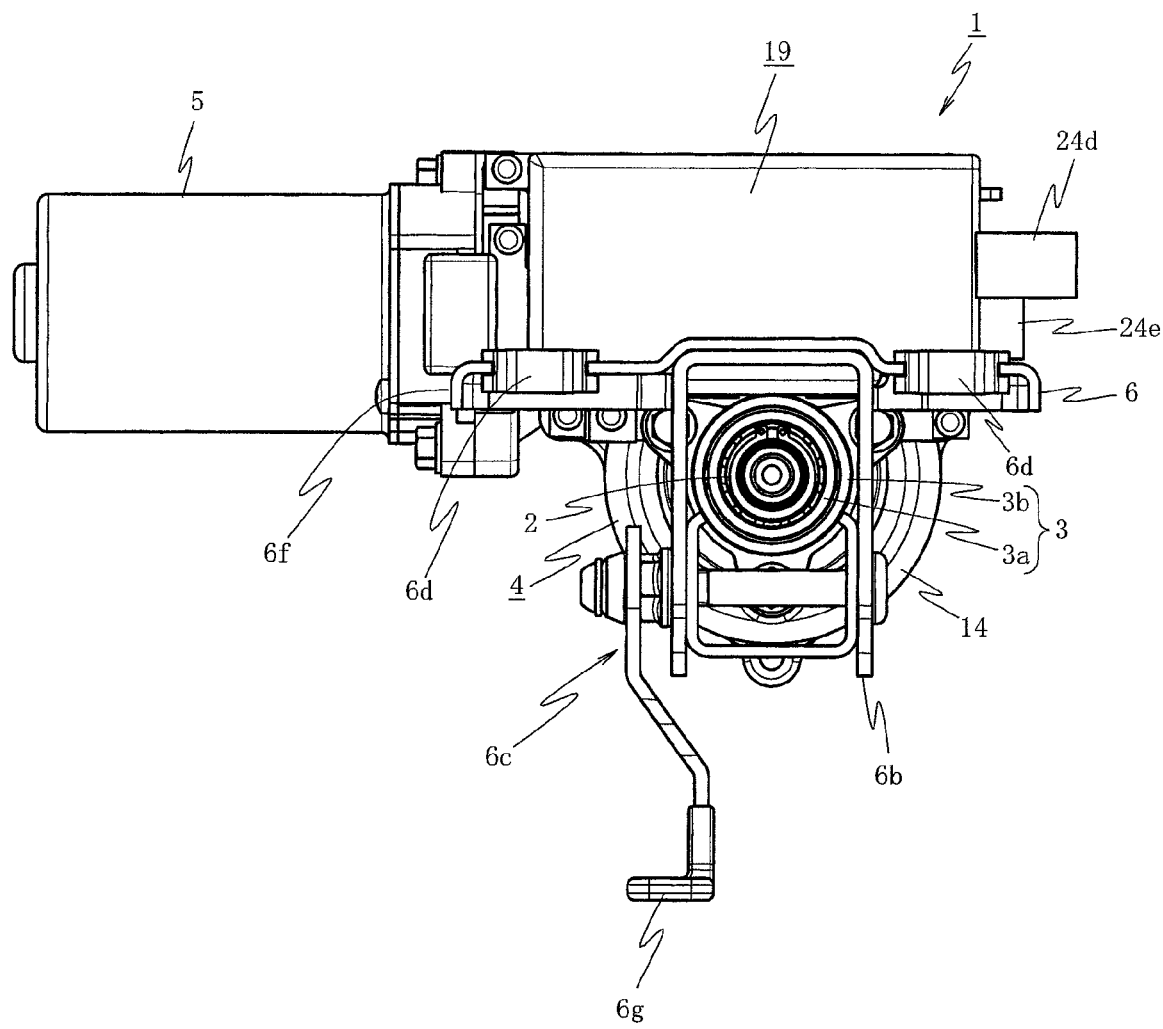
FIG. 2 is a front view of the electric power steering apparatus according to the present invention.
Figure 3:
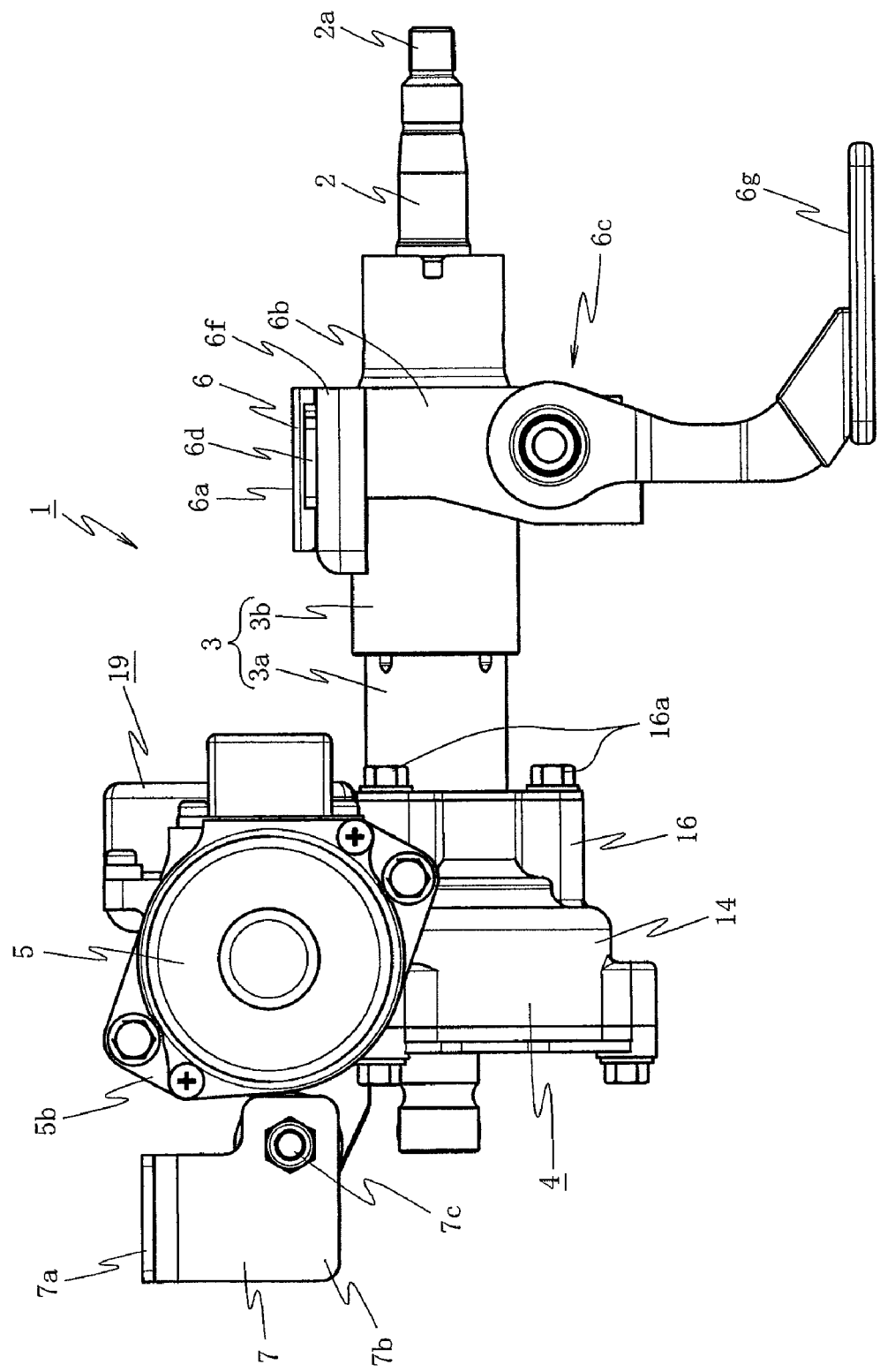
FIG. 3 is a left side view of FIG. 2.
Figure 4:
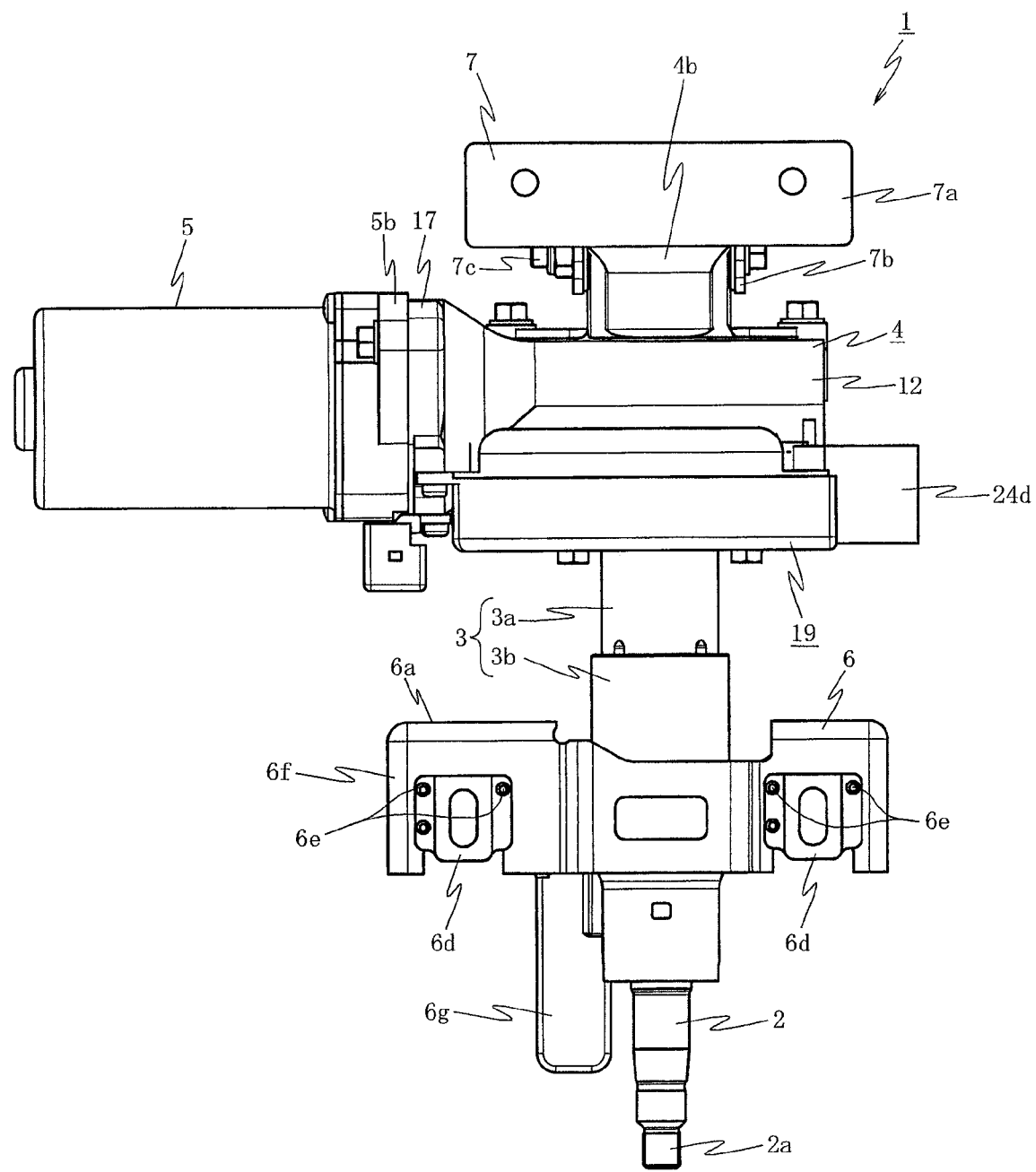
FIG. 4 is a plan view of FIG. 2.
Figure 5:
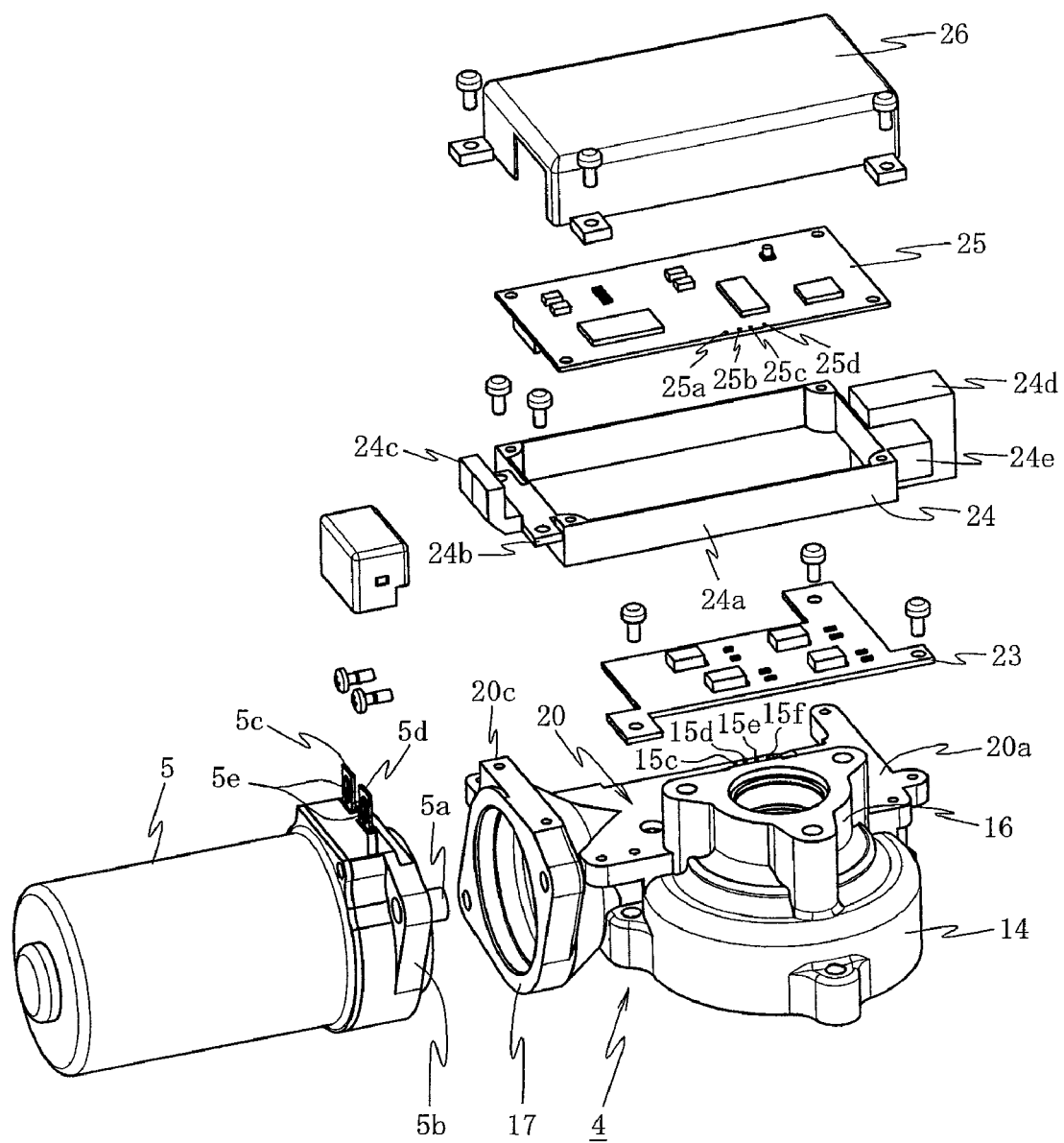
FIG. 5 is a disassembled perspective view of a main part of the present invention.
Figure 6:
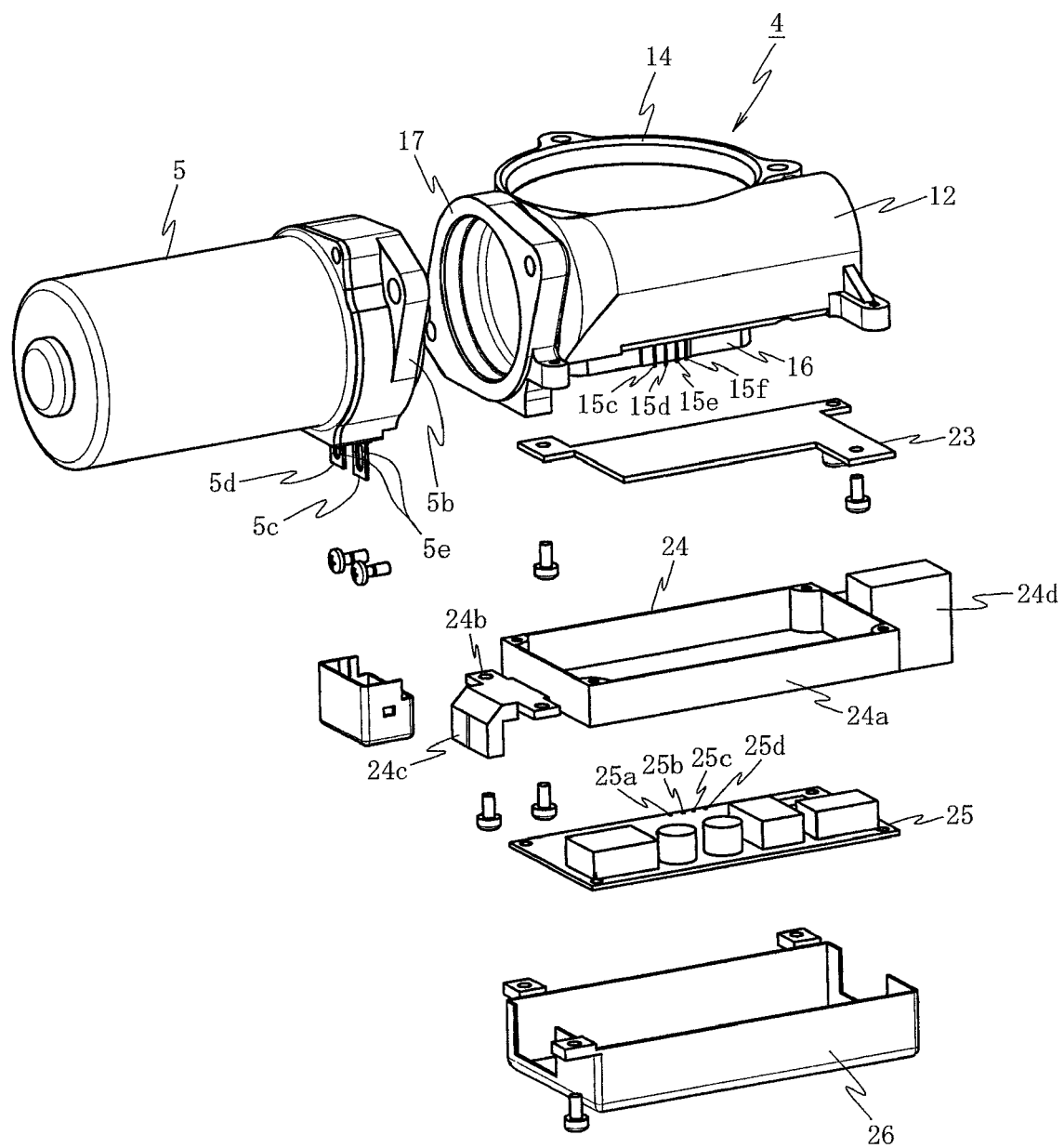
FIG. 6 is a disassembled perspective view of the main part of the present invention viewed from a direction opposite to that in FIG. 5.

FIG. 1 is a perspective view, FIG. 2 is a front view, FIG. 3 is a left side view, and FIG. 4 is a plan view showing an example of a case in which an embodiment of the present invention is applied to a right-hand drive car. FIGS. 5 and 6 are disassembled perspective views of a main part of the example.

In FIG. 1, reference numeral 1 denotes a column-type electric power steering apparatus. A reduction gear box 4 is coupled to a steering column 3 in which a steering shaft 2 having a steering-wheel mounting section 2a mounted with a steering wheel (not shown) is inserted rotatably. In this reduction gear box 4, an electric motor 5 including a brush motor, an axial direction of which is extended in a direction orthogonal to an axial direction of the steering column 3, is disposed.

The steering column 3 has, in a coupling section with the reduction gear box 4, a double tube structure including an inner tube 3a and an outer tube 3b for absorbing impact energy at the time of collapse and securing a predetermined collapse stroke. The outer tube 3b of the steering column 3 and the reduction gear box 4 are attached to a vehicle body side by an upper attachment bracket 6 and a lower attachment bracket 7. The lower attachment bracket 7 is formed by an attachment plate section 7a attached to a vehicle body side member (not shown) and a pair of supporting plate sections 7b that extend in parallel while keeping a predetermined space with respect to a lower surface of this attachment plate section 7a. A distal end of the supporting plate section 7b is pivotally coupled to, via a pivot 7c, a supporting section 4b integrally formed in a cover 4a disposed on a lower end side of the reduction gear box 4, i.e., a vehicle front side.

The upper attachment bracket 6 includes an attachment plate section 6a attached to the vehicle body side member (not shown), a square frame-shaped supporting section 6b formed integrally with this attachment plate section 6a, and a tilt mechanism 6c, which supports the outer tube 3b of the steering column 3, formed in this square frame-shaped supporting section 6b.

The attachment plate section 6a includes a pair of left and right capsules 6d attached to the vehicle body side member (not shown) and a sliding plate section 6f fixed to these capsules 6d by a resin injection 6e. When an impact force for moving the steering column 3 to the vehicle front is applied thereto at the time of collision, the sliding plate section 6f slides to the vehicle front with respect to the capsule 6d, the resin injection 6e is sheared, and a load of the shearing acts as a collapse start load.

It is possible to adjust a tilt position of the steering column 3 up and down around the pivot 7c of the lower attachment bracket 7 by releasing a supporting state by pivoting a tilt lever 6g of the tilt mechanism 6c.

Figure 7:
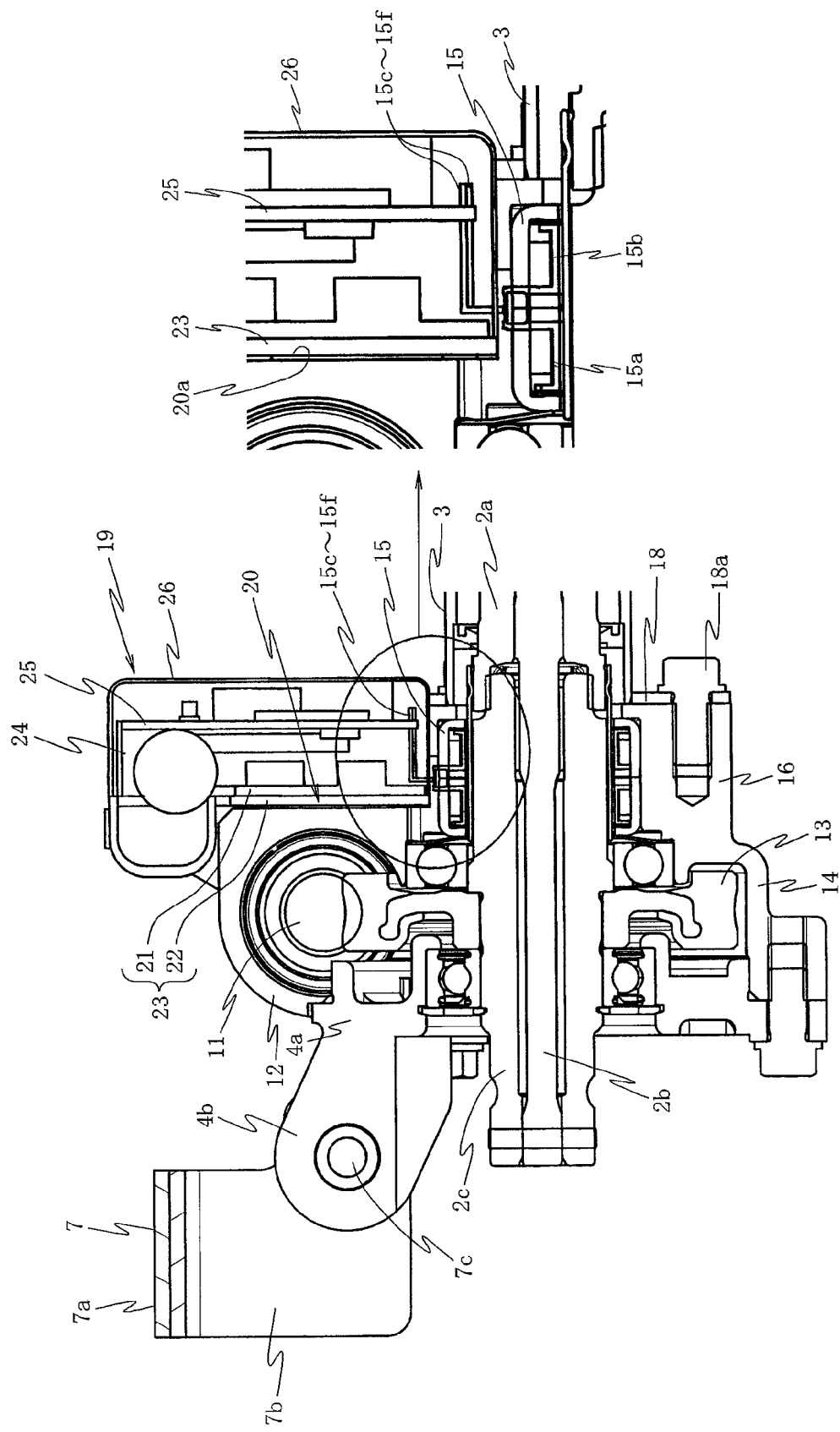
FIG. 7 is a longitudinal sectional view showing a main part in a reduction gear box position in enlargement.

Moreover, as shown in FIG. 7, the steering shaft 2 includes an input shaft 2a, an upper end of which is coupled to the steering wheel (not shown), and an output shaft 2c that is coupled to a lower end of this input shaft 2a via a torsion bar 2b and covers the torsion bar 2b.

Furthermore, as shown in FIGS. 5 to 7, the reduction gear box 4 is formed by, for example, die-casting a material having high heat conductivity, for example, any one of aluminum, an aluminum alloy, magnesium, and a magnesium alloy. This reduction gear box 4 includes a worm housing unit 12 that houses a worm 11 coupled to an output shaft 5a of the electric motor 5, a worm-wheel housing unit 14 that is provided on a lower side of this worm housing unit 12, has a center axis orthogonal to a center axis of the worm housing unit 12, and houses a worm wheel 13 that meshes with the worm 11, a torque-sensor housing unit 16 that is integrally and coaxially coupled to a rear side of this worm-wheel housing unit 14 and houses a torque sensor 15, a motor mounting section 17 that is formed in an open end face of the worm housing unit 12 and to which the electric motor 5 is attached, a column attaching section 18 that is formed in an rear end face of the torque-sensor housing unit 16 and to which an attachment flange 2a formed at a front end of the steering column 3 is attached, and a control-unit mounting section 20 that is formed in a plane orthogonal to a center axis of the worm-wheel housing unit 14 and the torque-sensor housing unit 16 across a part of the worm housing unit 12 and the worm-wheel housing unit 14 and to which a control unit 19 is mounted. The reduction gear box 4 is fixed to the steering column 3 by a bolt 18a in a state in which the attachment flange 3c of the steering column 3 is brought into contact with the column attaching section 18.

As shown in FIG. 7, the torque sensor 15 is configured to magnetically detect a twist state of the input shaft 2a and the output shaft 2c of the steering shaft 2 and detect steering torque transmitted to the steering shaft with a pair of detection coils 15a and 15b. External connection terminals 15c, 15d, 15e, and 15f, which project to the outside in parallel to a direction orthogonal to a center axis of the steering column 3, are connected to starts and ends of winding of these pair of detection coils 15a and 15b, respectively. Projecting portions of these external connection terminals 15c to 15f are bent, in the center thereof, in parallel to the center axis of the steering column 3 and formed in an L shape.

In the electric motor 5, in a position close to and opposed to the control unit 19 mounted on the control-unit mounting section 20 in a position closer to attachment flange sections 5b of the electric motor 5, connection terminals 5c and 5d as motor-side connection sections integrally formed with bus bars 5i and 5j described later for distributing power to a built-in brush are protrudingly formed toward the rear of the vehicle body perpendicular to an axis direction of the electric motor 5. Long holes 5e through which fixing screws are inserted are drilled at distal end portions of these bus bars 5c and 5d. In this case, as shown in FIG. 3, when the steering column 3 is viewed from a side, an angle θ formed by a line L1 connecting a pair of attachment flange sections 5b and a center line L2 between connection terminals 5c and 5d is set as an acute angle (e.g., 60°). The projecting length of the attachment flange sections 5b in a direction parallel to the steering column 3 and a direction orthogonal thereto is controlled to be small.

Figure 8:
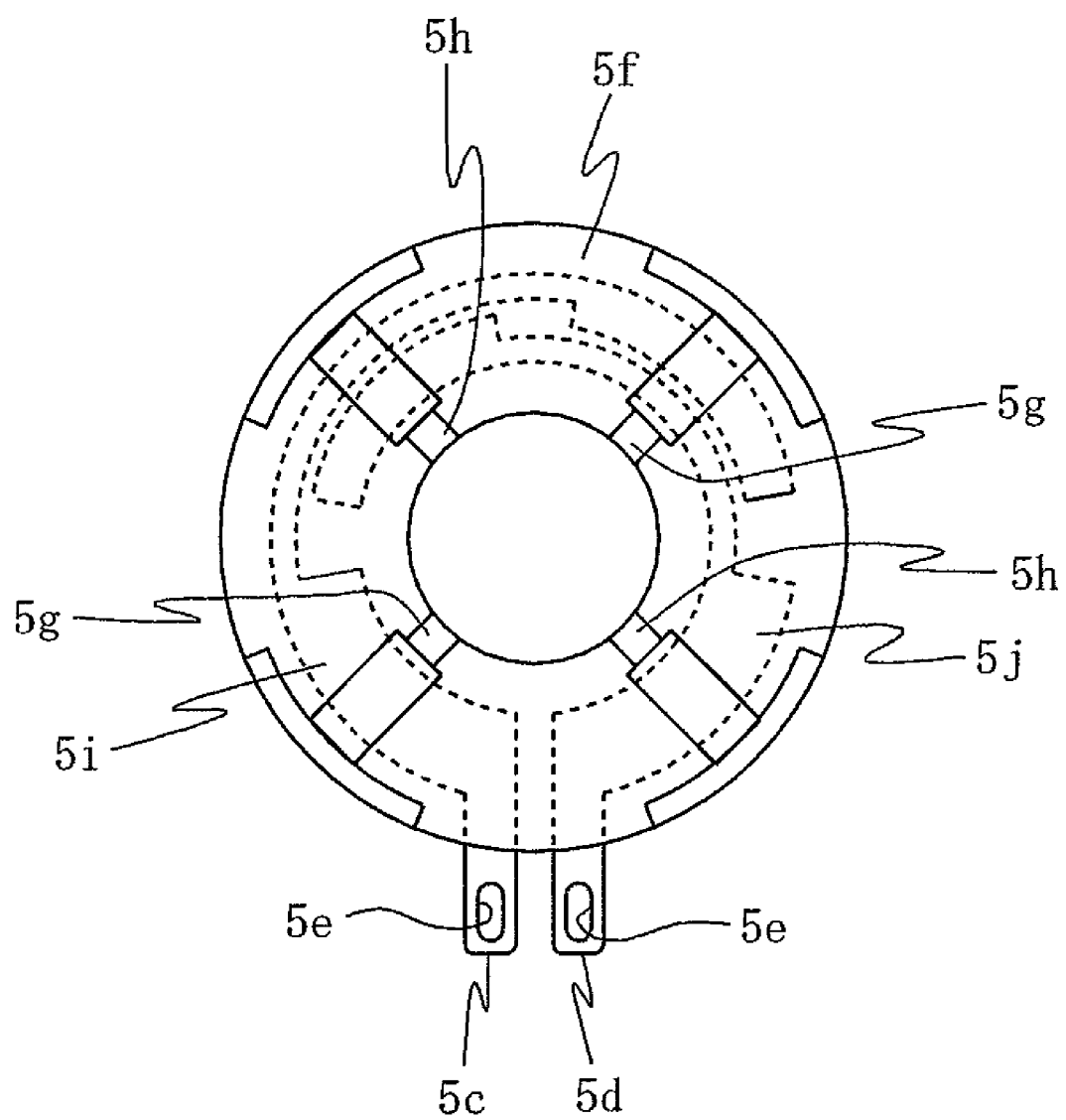
FIG. 8 is a front view showing a bus bar structure of an electric motor.

As shown in FIG. 8, the respective connection terminals 5c and 5d are disposed to be insulated from each other in a brush supporting member 5f made of synthetic resin having an armature insertion hole in the center of a bottom portion thereof. The connection terminals 5c and 5d are formed integrally with one ends opposed to each other of the arcuate bus bars 5i and 5j individually connected to two sets of brushes 5g and 5h. The electric motor 5 is attached with the attachment flange sections 5b thereof coupled to the motor mounting section 17 of the reduction gear box 4, the worm 11 coupled to the output shaft 5a thereof, and the connection terminals 5c and 5d extended to the rear of the vehicle body.

Figure 9:
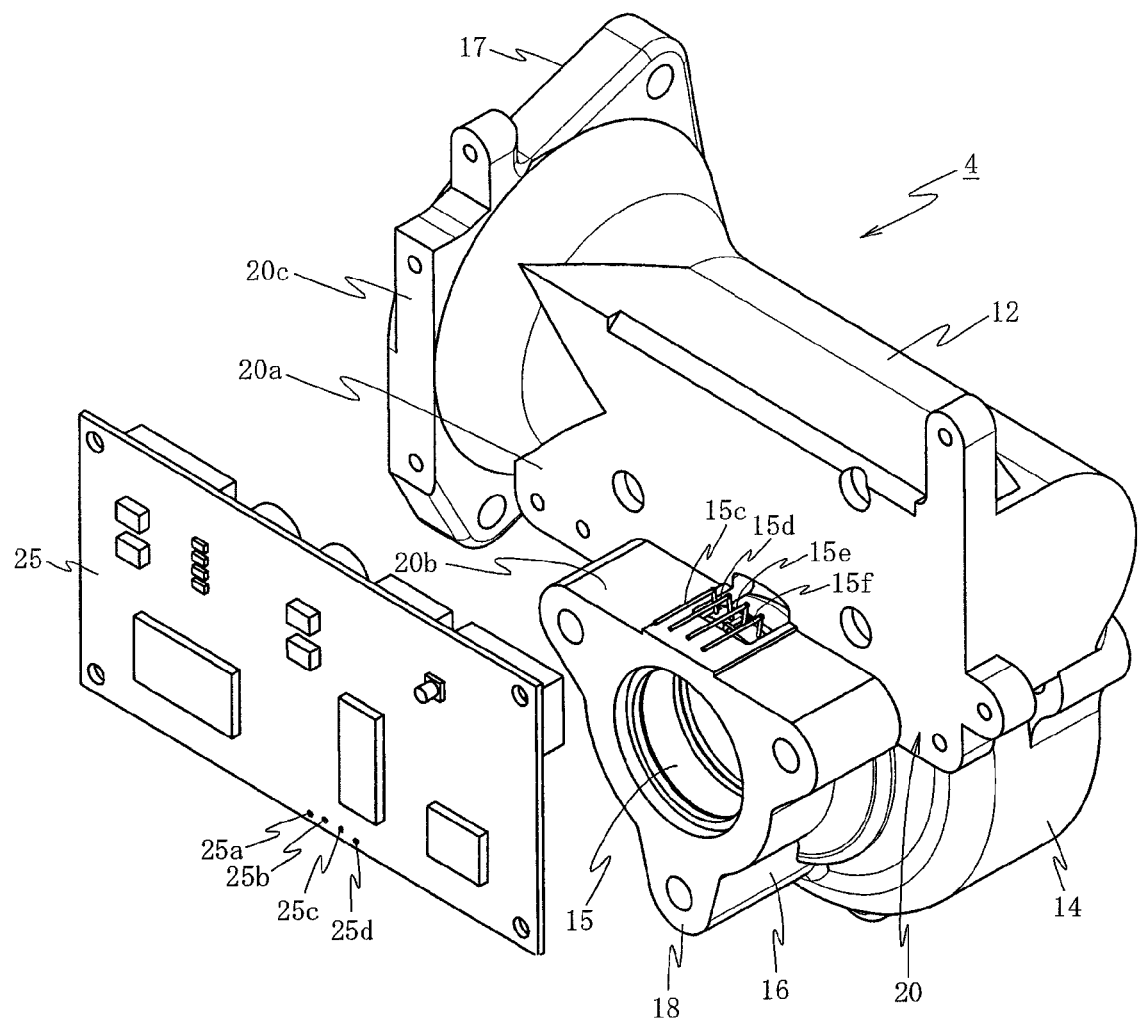
FIG. 9 is a perspective view showing a relation between the reduction gear box and a control board.

Moreover, as it is evident with reference to FIG. 9, in the control-unit mounting section 20 formed in the reduction gear box 4, a flat attaching surface 20a is formed by the worm housing unit 12 and an upper side of the worm-wheel housing unit 14 on a lower side of the worm housing unit 12. The control-unit mounting section 20 is formed in an L shape viewed from a left side surface by the flat attaching surface 20a and a flat surface 20b formed on an upper surface of the torque-sensor housing unit 16 and orthogonal to the flat attaching surface 20a. A narrow frame attaching surface 20c is also formed on a rear end surface of the motor mounting section 17 in parallel to the flat attaching surface 20a and in a position further on a rear side than the flat attaching surface 20a. The external connection terminals 15c to 15f of the torque sensor 15 are projected from the center in the left to right direction of the flat surface 20b in the torque-sensor housing unit 16.

Figure 10:
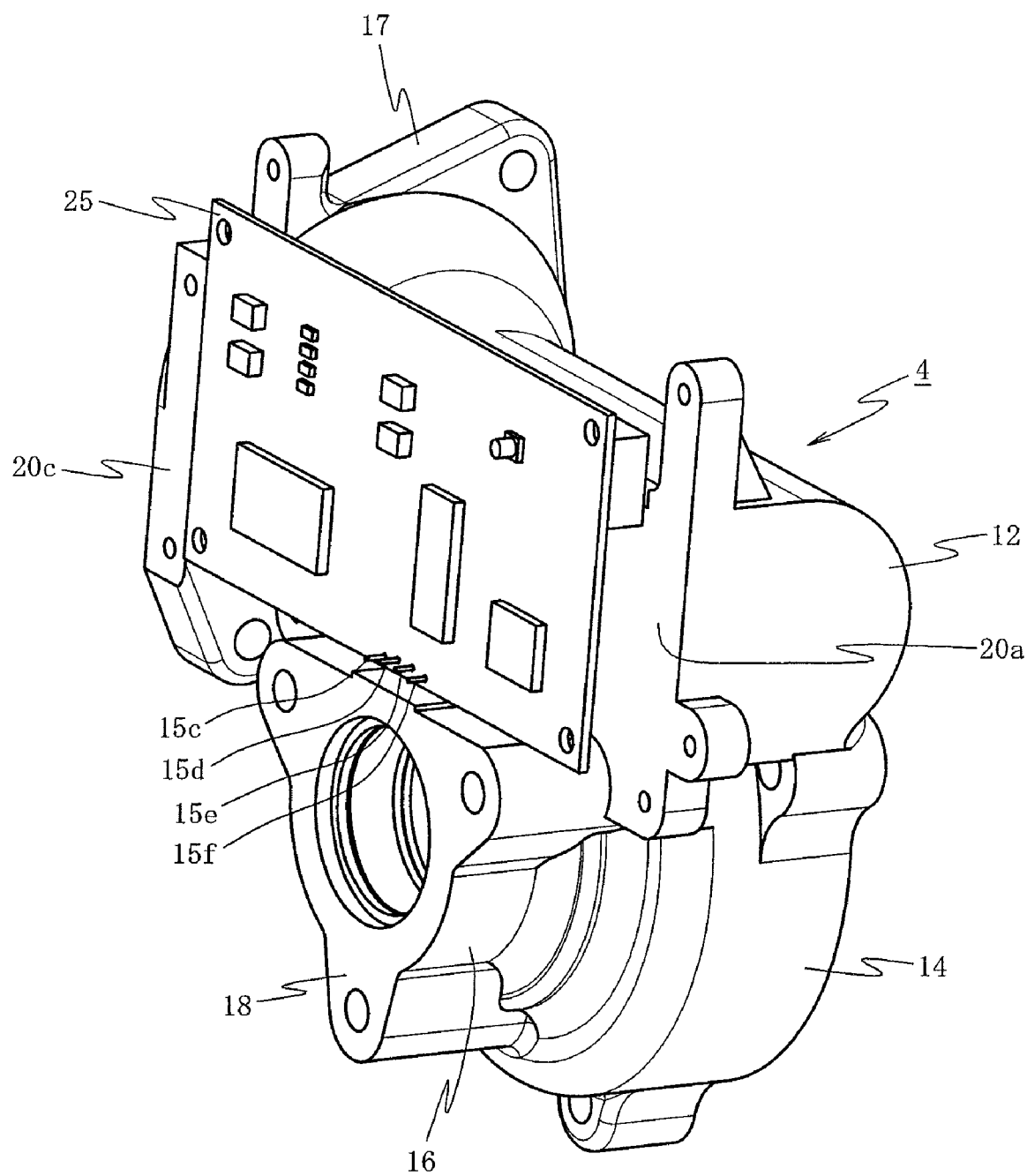
FIG. 10 is a perspective view showing a state in which an external connection terminal of a torque sensor in the reduction gear box is inserted through the control board.

As shown in FIGS. 5, 6, and 10, the control unit 19 mounted on this control-unit mounting section 20 includes a power board 23 made of metal having high thermal conductivity that is mounted with an H bridge circuit including a power switching element such as a field effect transistor, which controls to drive the electric motor 5, and a discrete component such as a pulse width modulation circuit, which drives the power switching element of this H bridge circuit, and is directly fixed to the flat attaching surface 20a via heat radiation grease, a synthetic resin frame 24 of a rectangle frame shape that surrounds this power board 23, a control board 25 in which through holes 25a to 25d, through which the external connection terminals 15c to 15f of the torque sensor 15 attached to a front surface of this synthetic resin frame 24 are directly inserted, are drilled and that is mounted with a micro control unit (MCU) that calculates a steering assisting current command value on the basis of a torque detection value from the torque sensor 15 and a vehicle speed detection value from a not-shown speed sensor and performs current feedback control on the basis of this steering assisting current command value and a detection value of a motor current outputted to the electric motor 5 to calculate a voltage command value to the pulse width modulation circuit of the power board 23 to thereby control a steering assisting force generated by the electric motor 5 and peripheral devices of the MCU, and a protective cover 26 that covers the power board 23, the synthetic resin frame 24, and the control board 25.

The synthetic resin frame 24 has integrally formed therein a frame main body 24a of a rectangular frame shape, an attachment plate section 24b that is protrudingly formed in a position near and opposed to the connection terminals 5c and 5d of the electric motor 5 at a left end of this frame main body 24a and is fixed to the frame attaching surface 20c of the reduction gear box 4, a terminal block 24c as a unit-side connection section that is projected in an L shape from this attachment plate section 24b, comes into surface contact with the connection terminals 5c and 5d of the electric motor 5, and is electrically connected to the connection terminals 5c and 5d, a power supply connector 24d that is disposed in a center position at a right end of the frame main body 24a and connected to a battery (not shown), and a signal connector 24e that performs exchange of data with control devices of respective units of the vehicle body and is connected to a network such as a CAN. In the respective power supply connector 24d and signal connector 24e, connection connector insertion openings are formed on right end sides such that external connection connectors connected to these connectors are inserted from a right side of the vehicle body.

The control unit 19 having the structure described above is assembled as described below. First, heat radiation grease is applied to a mounting position of the power board 23 on the flat attaching surface 20a in the control-unit mounting section 20 of the reduction gear box 4 and, then, the power board 23 is placed on the heat radiation grease and screwed to the flat attaching surface 20a. Subsequently, the synthetic resin frame 24 is placed on the flat attaching surface 20a and the frame attaching surface 20c to surround the power board 23. The attachment plate section 24b of the synthetic resin frame 24 is screwed to the frame attaching surface 20c of the reduction gear box 4 in the same manner. After or before screwing the attachment plate section 24b, the control board 25 is screwed on a front side of the synthetic resin frame 24 after the external connection terminals 15c to 15f of the torque sensor 15 are inserted through the through holes 25a to 25d of the control board 25. Finally, the external connection terminals 15c to 15f and the through holes 25a to 25d are soldered and, then, the cover 26 is attached to the flat attaching surface 20a.

Thereafter, the steering column 3, the steering shaft 2, the worm 11, and the worm wheel 13 are assembled and, finally, the electric motor 5 is assembled and fixing screws 5o as locking tools are screwed to the terminal block 24c through the long holes 5e from the connection terminals 5c and 5d side of the electric motor 5, whereby the connection terminals 5c and 5d and the terminal block 24c are electrically connected and, then, the terminal cover 27 is attached.

In this way, in a state in which the control unit 19 is mounted on the control-unit mounting section 20 of the reduction gear box 4, the thickness of the control unit 19 and a position of the flat attaching surface 20a of the control-unit mounting section 20 are set such that the control unit 19 is located further on the front side than a head of the bolt 18a for fixing the attachment flange 3c of the steering column 3 that serves as a stopper when steering column contracts at the time of collapse in a rear end surface position of the cover 26 of the control unit 19 and a rearmost end position of the reduction gear box 4. The control unit 19 is mounted in a position where, at the time of collapse, the control unit 19 does not interfere with a moving member at the time of collapse.

The power supply connector 24d and the signal connector 24e are disposed on a side of the control unit 19 opposite to the electric motor 5, i.e., on the right side of the vehicle. The electric motor 5, the control unit 19, the power supply connector 24d, and the signal connector 24e are linearly arranged. It is easy to connect a battery side connector and a network side connector to the power supply connector 24d and the signal connector 24e. The power supply connector 24d is in a position closer to the earth points normally provided in the left and right positions on the cabin side of the engine room of the vehicle. It is possible to reduce the length of earth cables between the power supply connector 24*d* and the earth points. Moreover, directions of connection of the power supply connector 24*d* and the signal connector 24*e* to the connectors forming pairs with the connectors 24*d* and 24*e*, respectively, are in the horizontal direction. It is possible to prevent penetration of drops of water and dust.

Next, operations in the first embodiment are explained.

First, to assemble an electric power steering apparatus 1, the torque sensor 15 is fixedly arranged in the torque-sensor housing unit 16 of the reduction gear box 4 such that distal ends of the external connection terminals 15*c* to 15*f* thereof extend to the rear of the vehicle body along the outer peripheral portion of the steering column 3.

Subsequently, the control unit 19 is mounted on the control-unit mounting section 20 of the reduction gear box 4. In this mounting of the control unit 19, first, heat radiation grease is applied to the flat attaching surface 20*a* and, then, the power board 23 is placed on the heat radiation grease and screwed to the flat attaching surface 20*a*. In this state, the synthetic resin frame 24 is placed on the flat attaching surface 20*a* to surround the power board 23 and the attachment plate section 24*b* of the synthetic resin frame 24 is brought into contact with the frame attaching surface 20*c* of the reduction gear box 4 and screwed. Moreover, the external connection terminals 15*c* to 15*f* of the torque sensor 15 are inserted through the through holes 25*a* to 25*d* of the control board 25, the through holes 25*a* to 25*d* and the external connection terminals 15*c* to 15*f* of the torque sensor 15 are soldered and, then, the cover 26 is attached to the control board 25, whereby the control unit 19 is configured.

Subsequently, the steering shaft 2, the steering column 3, the worm 11, the worm wheel 13, and the like are mounted on the reduction gear box 4 and, finally, the electric motor 5 is attached to the motor mounting section 17 of the reduction gear box 4.

Thereafter, the electric motor 5 is mounted on the motor mounting section 17 of the reduction gear box 4 with the connection terminals 5*c* and 5*d* set opposed to the control-unit mounting section 20 and the output shaft 5*a* coupled to the worm 11. In this case, since the output shaft 5*a* of the electric motor 5 and the worm 11 are serration-connected or spline-connected, the output shaft 5*a* and the worm 11 are coupled while the electric motor 5 is rotated in a circumferential direction. At a point when the coupling of the output shaft 5*a* and the worm 11 is completed, the attachment flange 5*a* is mounted on the motor mounting section 17 such that the connection terminals 5*c* and 5*d* come into surface contact with the terminal block 24*c* of the synthetic resin frame 24 in the control unit 19 mounted on the control-unit mounting section 20.

In this way, when the electric motor 5 is mounted on the reduction gear box 4, the electric motor 5 is mounted while being rotated in the circumferential direction. Therefore, by projecting the connection terminals 5*c* and 5*d* in a direction orthogonal to the axial direction, the terminal block 24*c* and a peripheral portion thereof are not damaged by the connection terminals 5*c* and 5*d* and it is possible to easily assemble the electric motor 5 to the reduction gear box 4.

Incidentally, when the connection terminals 5*c* and 5*d* extend along the outer peripheral surface of the electric motor 5, when the electric motor 5 is turned in, it is likely that the connection terminals 5*c* and 5*d* come into contact with and damage the terminal block 24*c* of the control unit 19 and the peripheral portion thereof. Therefore, there is a problem in that assembly of the electric motor 5 needs to be carefully performed and assembly work takes time. However, in the first embodiment, when the electric motor 5 is turned in, the connection terminals 5*c* and 5*d* do not interfere with the terminal block 24*c* of the control unit 19 and the peripheral portion thereof and it is possible to easily perform assembly work.

In this state, the terminal block 24*c* formed in the synthetic resin frame 24 and the connection terminals 5*c* and 5*d* of the electric motor 5 come into surface contact with each other. As shown in FIG. 11, by screwing the fixing screws 5*o* in the terminal block 24*c* from the connection terminals 5*c* and 5*d* side through the long holes 5*e*, it is possible to firmly attach the connection terminals 5*c* and 5*d* to the terminal block 24*c* in a shortest distance.

In this way, it is possible to bring the connection terminals 5*c* and 5*d* of the electric motor 5 into surface contact with and electrically connected directly to the terminal block 24*c* of the control unit 19 without the intervention of a power supply cable and it is possible to electrically connect the external connection terminals 15*c* to 15*f* of the torque sensor 15 and the through holes 25*a* to 25*d* of the control board 25 directly without the intervention of a signal cable. Therefore, it is possible to minimize the electric connection length between the control unit 19 and the electric motor 5 and between the control unit 19 and the torque sensor 15, minimize wiring resistance, control a power loss, and reduce mixing electric noise.

Since it is unnecessary to provide a motor harness between the electric motor and the control unit, noise radiated from motor harnesses is reduced and it is possible to reduce the influence on radio noise.

Moreover, the attachment plate section 24*b* is formed near the terminal block 24*e* connected to the connection terminals 5*c* and 5*d* of the electric motor 5 formed in the synthetic resin frame 24 in the control unit 19. This attachment plate section 24*b* is fixed to the frame attaching surface 20*c* formed in the motor mounting section 17 of the reduction gear box 4. Therefore, it is possible to prevent the terminal block 24*c* from generating vibration different from that of the reduction gear box 4 because of vibration of the vehicle and suppress stress concentration from occurring in the terminal block 24*c* to improve rigidity of the terminal block 24*c*.

The power board 23 involving heat generation, which configures the control unit 19, is in direct contact with, via the heat radiation grease, the flat attaching surface 20*a* in the control-unit mounting section 20 of the reduction gear box 4 formed of any one of aluminum, an aluminum alloy, magnesium, and a magnesium alloy. Therefore, it is possible to directly radiate the generated heat of the power board 23 to the reduction gear box 4 serving as the heat mass with a large heat capacity and surely prevent the power board 23 from coming into an overheated state.

Moreover, it is possible to reduce the length in the axial direction of the entire reduction gear box 4 and realize a reduction in size thereof by arranging the control unit 19 above the torque-sensor housing unit 16 of the reduction gear box 4.

In this state, the upper attachment bracket 6 and the lower attachment bracket 7 are attached to the vehicle body side member and, then, the external connection connectors connected to the battery and the earth points and the connection connector of the network such as the CAN are attached to the power supply connector 24*d* and the signal connector 24*e* of the control unit 19, respectively, from the vehicle body right side, whereby the assembly of the electric power steering apparatus 1 is completed. In this way, the connection of the external connection connectors to the power supply connector 24*d* and the signal connector 24*e* can be performed from the vehicle body right side. Therefore, it is possible to easily connect both the connectors. In this case, in the upper attachment bracket 6, as shown in FIG. 1, the sliding plate section 6*f* is fixed to the capsules 6*d* forming the attachment plate section 6*a* by the resin injection 6*e*.

When this assembly of the electric power steering apparatus 1 is completed, it is possible to release a tilt lock state by pivoting the tilt lever 6*g* of the upper attachment bracket 6 and adjust a tilt position by pivoting the steering column 3 in this state around the pivot 7*c* of the lower attachment bracket 7.

When a not-shown ignition switch of the vehicle is turned on to supply electric power to the power board 23 and the control board 25 from the battery, steering assistance control processing is executed by the micro control unit (MCU) and a steering assisting current command value is calculated on the basis of detection values of the torque sensor 15 and the not-shown speed sensor. Current feedback processing is executed on the basis of this steering assisting current command value and a motor current detected by a motor-current detecting unit to calculate a voltage command value. This voltage command value is supplied to a gate driving circuit of the power board 23 to control the H bridge circuit, whereby a motor driving current flows to the electric motor 5 to drive the electric motor 5 to generate a necessary steering assisting force in a normal or reverse rotating direction.

Therefore, a steering assisting force corresponding to steering torque of the steering wheel is generated from the electric motor 5 and this steering assisting force is transmitted to an output of the steering shaft via the worm 11 and the worm wheel 13. Consequently, it is possible to steer the steering wheel with a light steering force.

Figure 12:
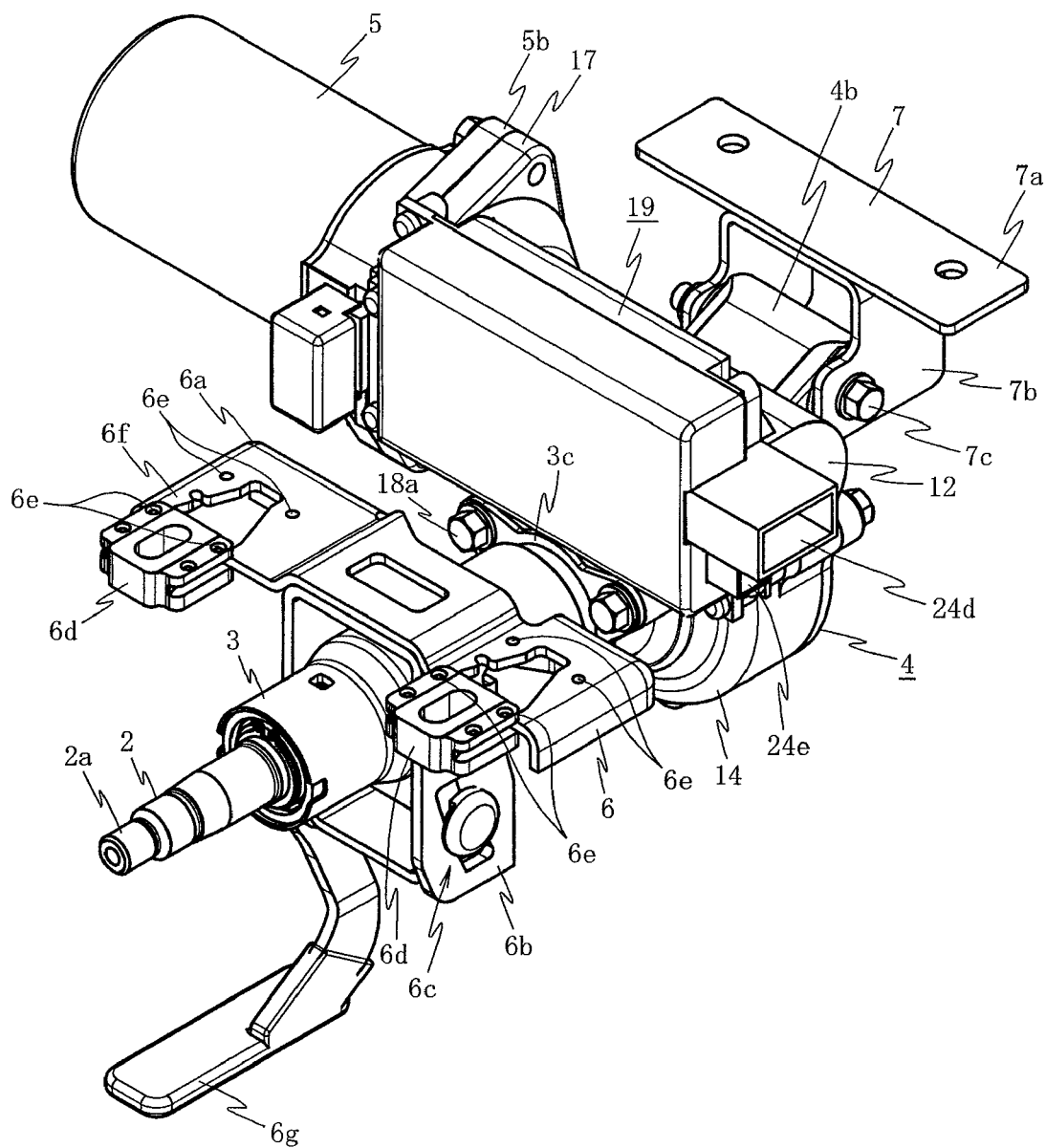
FIG. 12 is a perspective view showing the electric power steering apparatus at the time of collapse.
Figure 13:
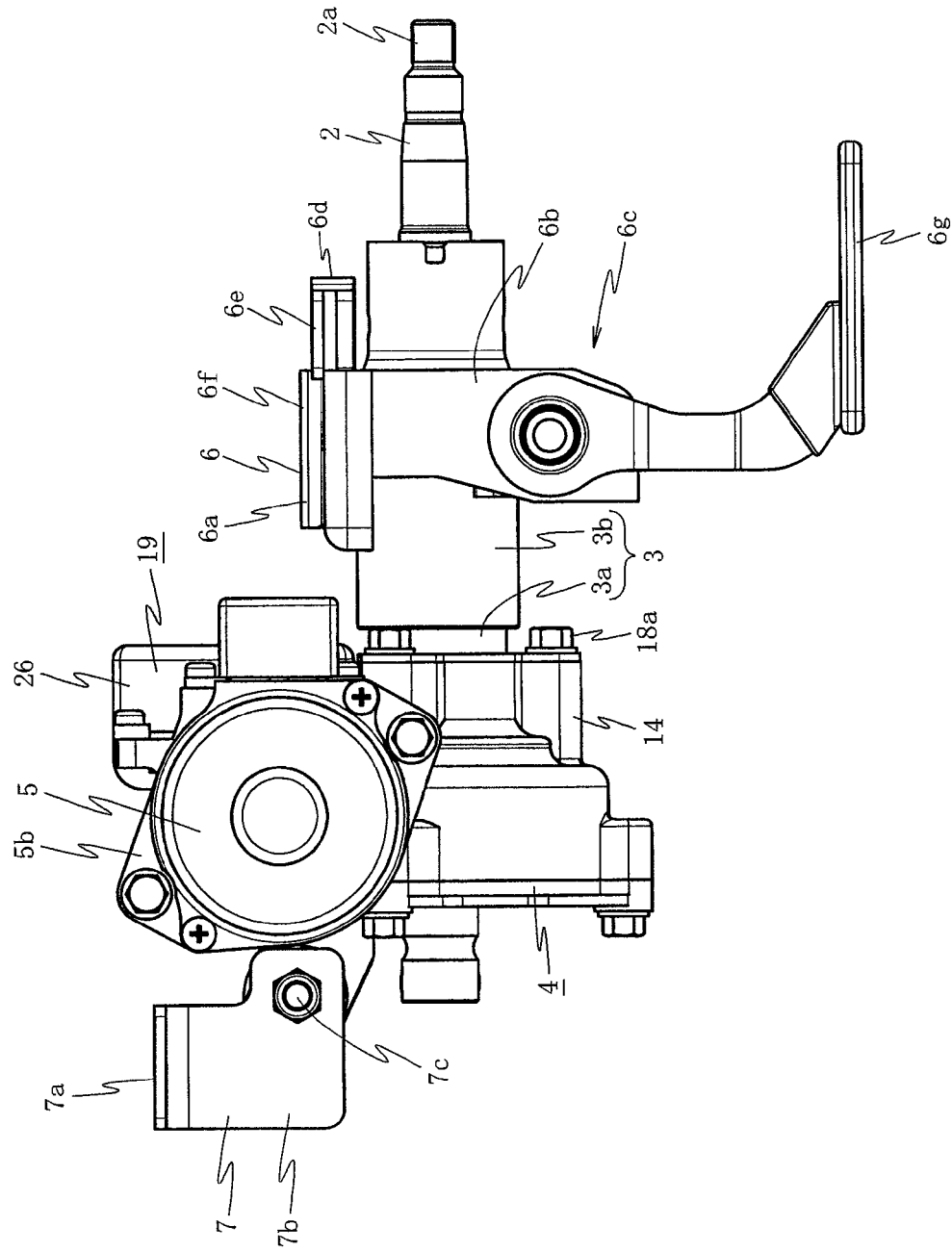
FIG. 13 is a left side view of the electric power steering apparatus at the time of collapse.
Figure 14:
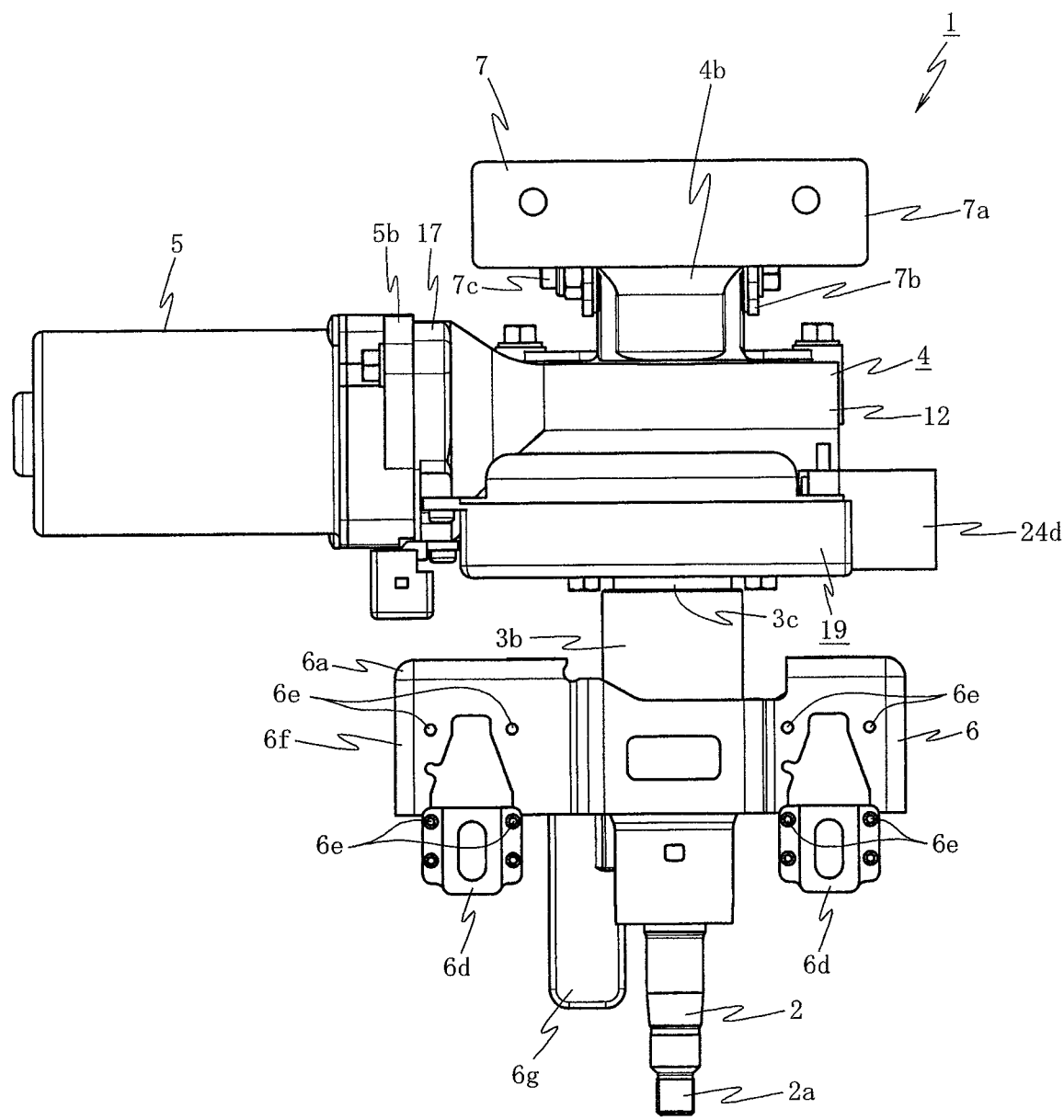
FIG. 14 is a plan view of the electric power steering apparatus at the time of collapse.

In this state, when a driver touches the not-shown steering wheel at the time of occurrence of collapse and an impact force that slides the steering column 3 forward acts on the steering column 3, as shown in FIGS. 12 to 14, the resin injection 6*e* between the capsules 6*d* and the sliding plate section 6*f* of the upper attachment bracket 6 is sheared. Consequently, the outer tube 3*b* slides with respect to the inner tube 3*a* on the attachment flange 3*c* side of the steering column 3 while absorbing the impact force and comes into contact with the head of the bolt 18*a* serving as the contraction stopper, whereby the steering column 3 contracts while securing a necessary collapse stroke.

When the steering column 3 contracts in this way, the members attached around the steering column 3 approach to the control unit 19. However, this control unit 19 is arranged in a position where the control unit 19 does not interfere with moving components in a state in which a predetermined collapse stroke is secured. Therefore, the control unit 19 does not interfere with the moving components to prevent collapse. It is possible to secure the necessary collapse stroke.

Incidentally, although it is conceivable to crush the control unit 19 as well in order to secure a collapse stroke at the time of occurrence of collapse, as described above, there is a problem in that it is difficult to control the crush of this control unit 19 and variation occurs in an energy absorption amount at the time of collapse. However, in the first embodiment, since the crush of the control unit 19 is not taken into account to secure a collapse stroke, it is possible to secure a stable energy absorption amount as specified by a set value at the time of collapse.

Figure 15A:
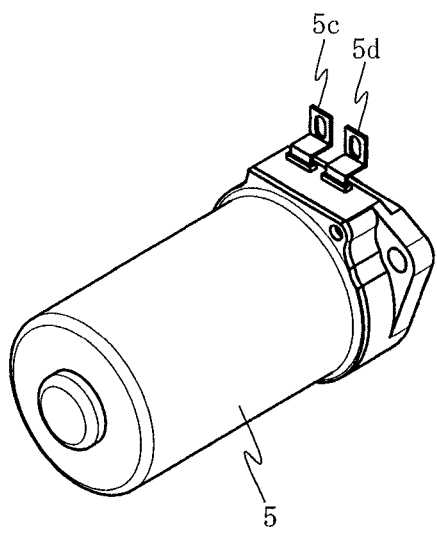
FIGS. 15A and 15B are the perspective views showing the modifications of a connection terminal of the electric motor.
Figure 15B:
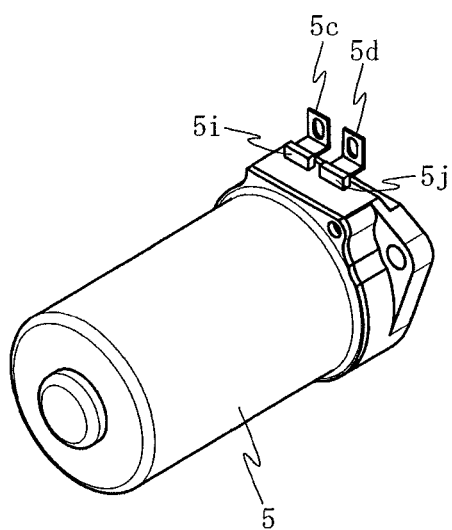

In the first embodiment, the case in which the connection terminals 5*c* and 5*d* of the electric motor 5 linearly extend is explained. However, the present invention is not limited to this. As shown in FIG. 15A, the connection terminals 5*c* and 5*d* may be once bent in the axial direction of the electric motor 5 and is, then, extended outward in a direction orthogonal to the axial direction. In this case, elasticity in bending portions of the connection terminals 5*c* and 5*d* can be secured. Therefore, it is possible to ease residual stress that occurs at the time of connection of the terminals and the terminal block and extend the durable life of the bus bars 5*c* and 5*d*. Similarly, as shown in FIG. 15B, the connection terminals 5*c* and 5*d* may be projected in the axial direction of the electric motor 5 first and is, then, extended outward in the direction orthogonal to the axial direction.

Figure 16:
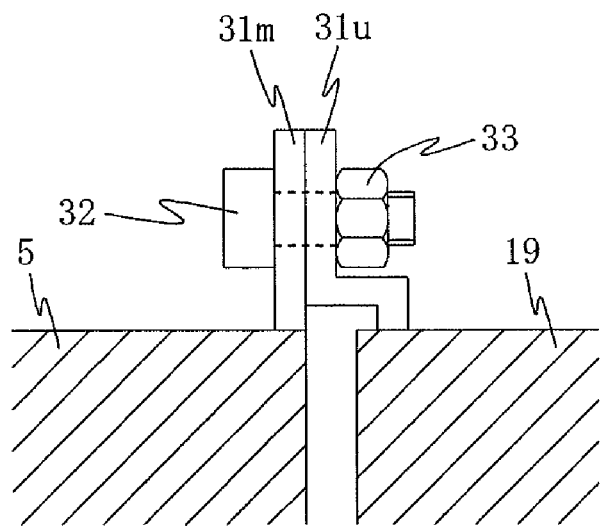
FIG. 16 is a diagram showing a state in which a motor-side connection section of the electric motor and a unit-side connection section of the control unit are connected by a locking tool.

In the first embodiment, the case in which the connection terminals 5*c* and 5*d* are provided in the electric motor 5 and the terminal block 24*c* is provided in the control unit 19 is explained. However, the present invention is not limited to this. A terminal block may be provided in the electric motor 5 and connection terminals may be provided in the control unit 19. Moreover, as shown in FIG. 16, both the motor-side connection section of the electric motor 5 and the unit-side connection section of the control unit 19 can be connection terminals 31*m* and 31*u*. In this case, both the connection terminals 31*m* and 31*u* can be integrally combined by inserting a bolt 32 into bolt insertion holes formed in the connection terminals 31*m* and 31*u*, for example, from the connection terminal 31*m* side in a state in which the connection terminals 31*m* and 31*u* are in surface contact with each other and screwing a nut 33 to an end projecting from the connection terminal 31*u* of the bolt 32 to tighten the nut 33. The bolt 32 and the nut 33 form a locking tool. However, the locking tool is not limited to the bolt 32 and the nut 33. A female screw may be formed in one of the connection terminals 31*m* and 31*u* and the bolt 32 may be screwed in the female screw from the other side. Other arbitrary locking tools such as a locking tool of a screw type and a locking tool of a rivet type can be applied.

Figure 17:
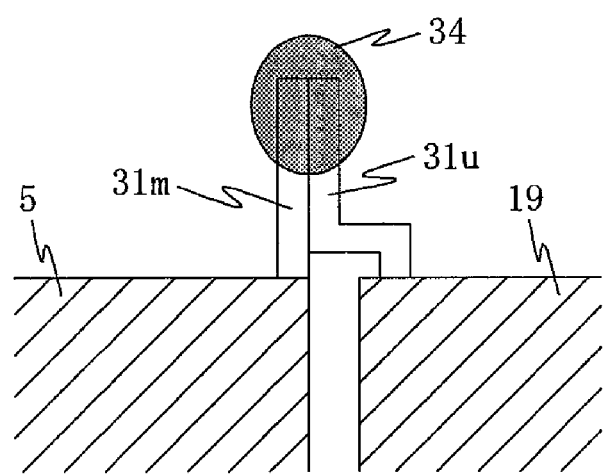
FIG. 17 is a diagram showing a state in which the motor-side connection section of the electric motor and the unit-side connection section of the control unit are welded.

The locking of the connection terminals 31*m* and 31*u* is not limited to the locking by the locking tool. As shown in FIG. 17, the connection terminals 31*m* and 31*u* may be integrated by forming a welding section 34 with welding means such as fusing, spot welding, or TIG welding.

Figure 18:
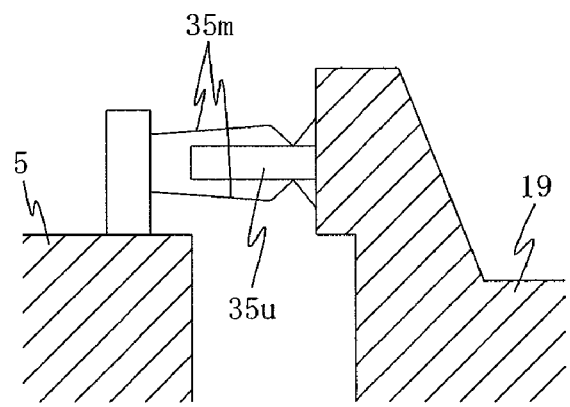
FIG. 18 is a diagram showing a state in which the motor-side connection section of the electric motor and the unit-side connection section of the control unit are connected by a female terminal and a male terminal.

Moreover, as shown in FIG. 18, for example, with the motor side connection terminal set as a female terminal 35*m*, both ends of which in the circumferential direction are opened, and the unit-side connection section set as a male terminal 35*u* protrudingly formed in the terminal block 24*c* of the control unit 19, the female terminal 35*m* and the male terminal 35*u* may be relatively pivoted in the circumferential direction to detachably connect the terminals. In this case, the motor side connection terminal may be set as the male terminal 35*u* and the unit-side connection section may be set as the male terminal 35*u*. By configuring the control unit 19 to be movable in the axial direction of the electric motor 5, after the electric motor 5 is assembled to the motor attaching surface 17 of the reduction gear box 4, the control unit 19 may be moved in the axial direction of the electric motor 5 to connect the male terminal 35*u* to the female terminal 35*m*.

Figure 19:
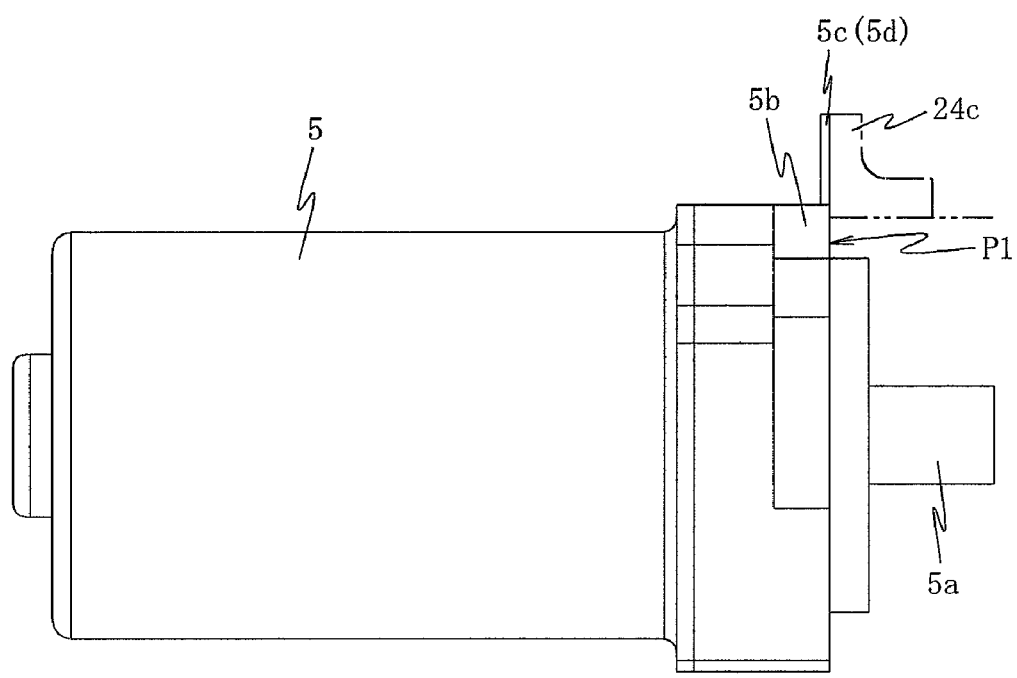
FIG. 19 is a side view showing an embodiment in which a connection terminal of the electric motor is formed to match an attaching surface.

Furthermore, in the first embodiment, as it is particularly evident in FIG. 11, the case in which the contact surface of the connection terminals 5*c* and 5*d* is formed in the position further on the inner side than the contact surface of the attachment flange sections 5*b*, which are brought into contact with the motor attaching surface 17 of the reduction gear box 4, in the electric motor 5 and away from the motor attaching surface 17 is explained. However, the present invention is not limited to this. As shown in FIG. 19, it is preferable to arrange the contact surfaces of the connection terminals 5*c* and 5*d* and the terminal block 24*c* to coincide with each other in a plane including a contact surface P1 with the motor attaching surface 17 of the attachment flange sections 5b. In this case, as described above, in assembling the electric motor 5 to the reduction gear box 4, the output shaft 5a of the electric motor 5 and the worm 11 disposed in the reduction gear box 4 are connected by using a serration or a spline. Therefore, it is necessary to couple the electric motor 5 while pivoting the electric motor 5 in the circumferential direction. When a pivotal range in this circumferential direction is small, there is no problem. However, when the pivotal range is increased, it is likely that the terminal block 24c of the control unit 19 and the attachment flange sections 5b of the electric motor 5 interfere with each other to damage the terminal block 24c. However, by setting the contact surfaces of the connection terminals 5c and 5d and the terminal block 24c in the plane including the contact surface in contact with the motor attaching surface 17 of the attachment flange sections 5b, even when the electric motor 5 is substantially pivoted in the circumferential direction in assembling the electric motor 5, it is possible to surely prevent the attachment flange sections 5b from interfering with the terminal block 24c of the control unit 19 and smoothly perform assembly work for the electric motor 5 without damaging the components. In this case, as in the above case, a shape of the connection terminals 5c and 5d can be an arbitrary shape. In short, the contact surfaces of the connection terminals 5c and 5d and the unit-side connection section only have to be formed in a plane including the attaching surface of the electric motor 5.

Figure 20A:
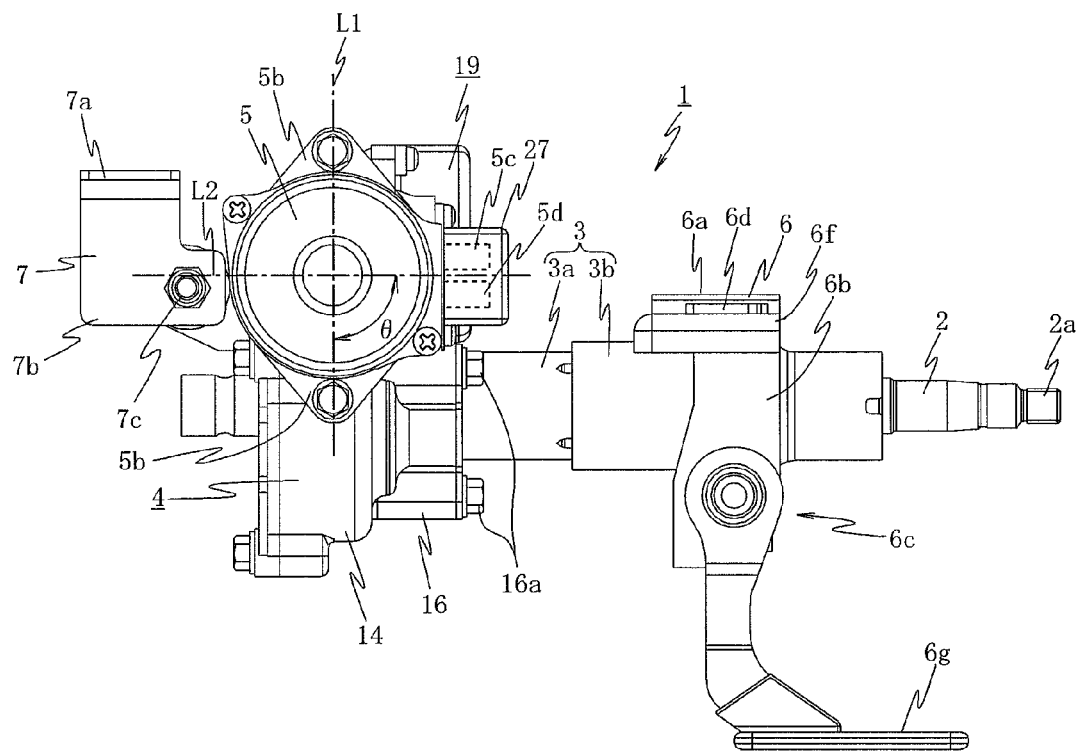
FIGS. 20A and 20B are the diagrams showing the embodiments in which an electric motor is commonly used in left-hand and right-hand drive cars.
Figure 20B:
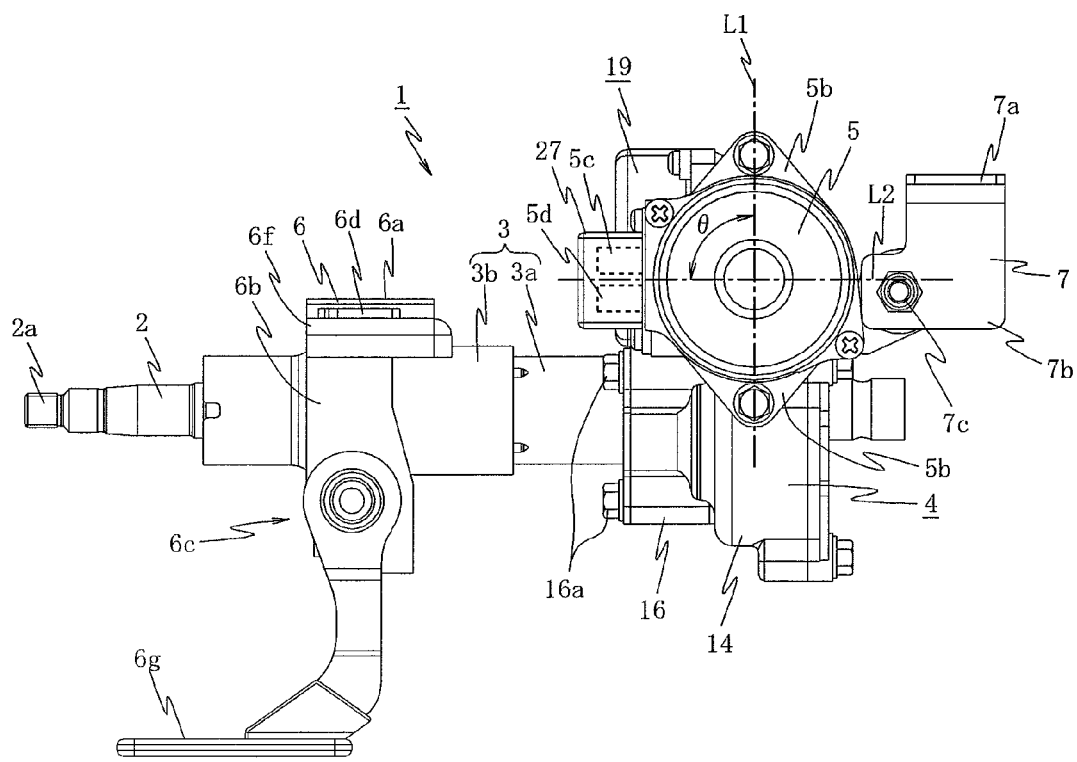
Figure 21A:
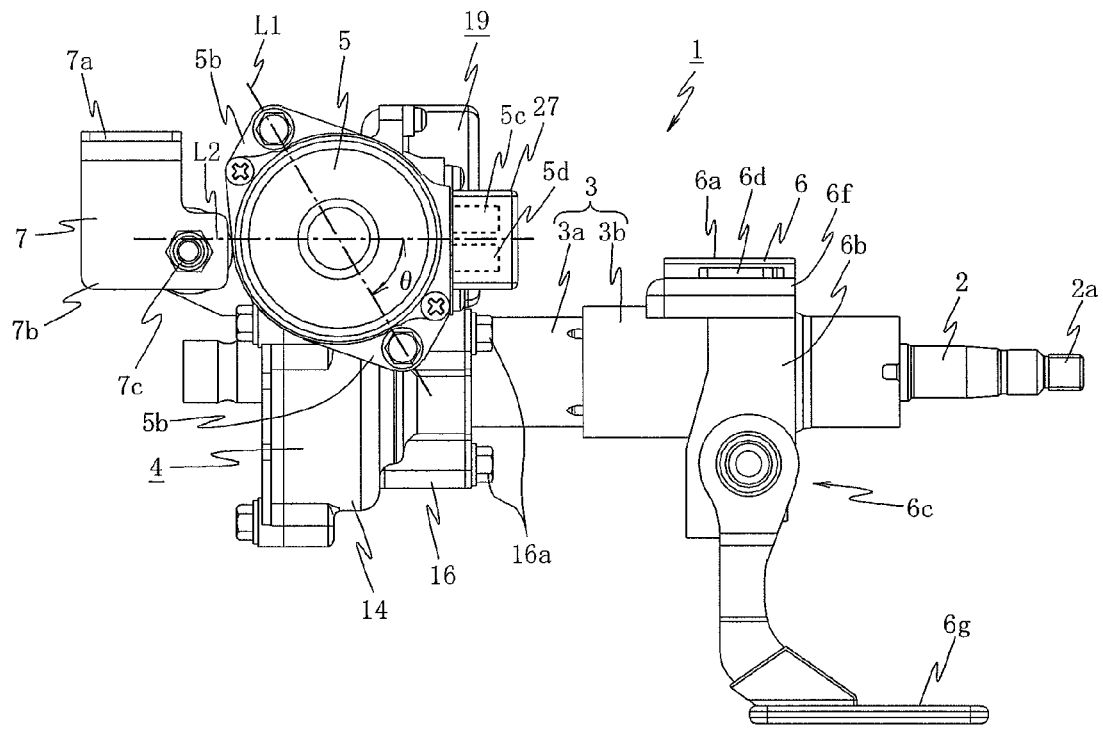
FIGS. 21A and 21B are the diagrams showing other embodiments in which an electric motor is commonly used in left-hand and right-hand drive cars.
Figure 21B:
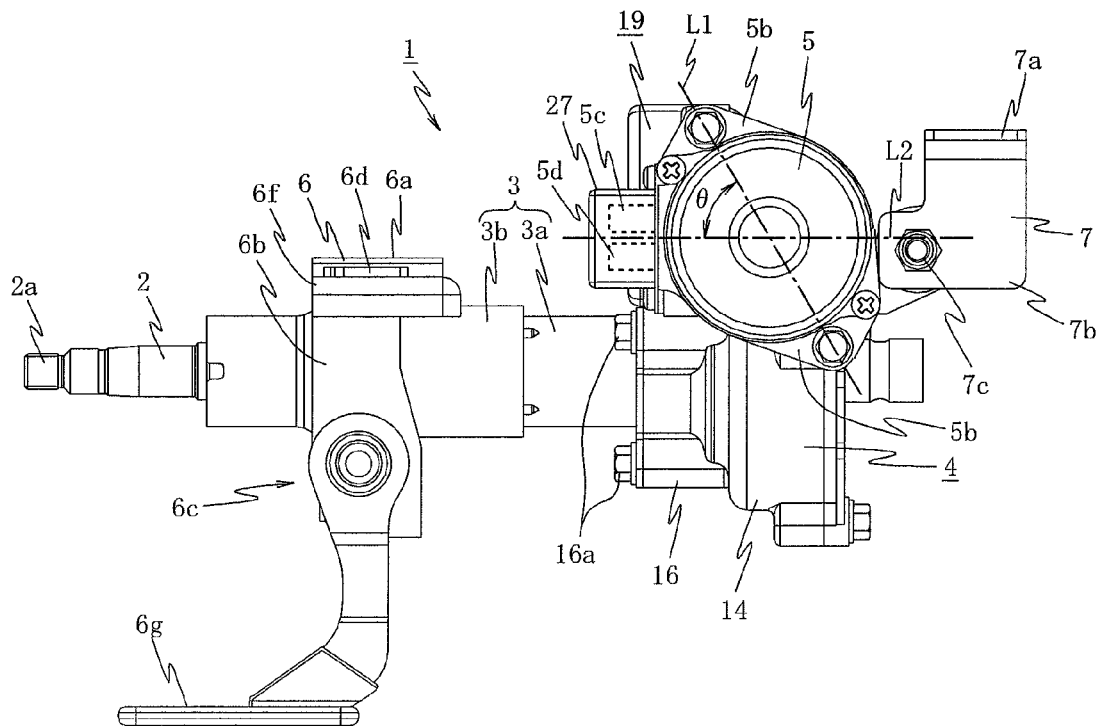

Furthermore, in the first embodiment, the case in which the present invention is applied to the right-hand drive car is explained. However, the present invention is not limited to this. When the present invention is applied to a left-hand drive car, as the arrangement of the reduction gear box 4, the electric motor 5, and the control unit 19, it is sufficient to arrange the electric motor 5 surface-symmetrically to the control unit 19 across a vertical surface passing the center axis of the steering column 1, i.e., on the right side of the control unit 19 and arrange the power supply connector 24d and the signal connector 24e of the control unit 19 on the left side. Moreover, the electric motor 5 may be arranged on the vehicle outer side and the power supply connector 24d and the signal connector 24e may be arranged on the vehicle inner side. In this case, as shown in FIGS. 20A and 20B, the connection terminals 5c and 5d and the attachment flange sections 5b are arranged such that a line L1 connecting the pair of attachment flange sections 5b and an extending direction of a center line L2 of the connection terminals 5c and 5d form a right angle. Consequently, it is possible to apply the common electric motor 5 in a right-hand drive car shown in FIG. 20A and a left-hand drive car shown in FIG. 20B. Besides, as shown in FIGS. 21A and 21B, attaching holes for attaching the attachment flange sections 5b may be set in identical positions in a right-hand drive car shown in FIG. 21A and a left-hand drive car shown in FIG. 21B with the connection terminals 5c and 5d of the electric motor 5 as a reference. In this case, it is possible to arbitrarily set an angle θ formed by the line L1 connecting the pair of attachment flange sections 5b and the extending direction of the center line L2 of the connection terminals 5c and 5d.

Next, a second embodiment of the present invention is explained with reference to FIGS. 22 and 23.

In this second embodiment, the contact surface of the motor-side connection section and the unit-side connection section is set in a direction parallel to the axial direction of the electric motor instead of the direction perpendicular to the axis of the electric motor.

Figure 22:
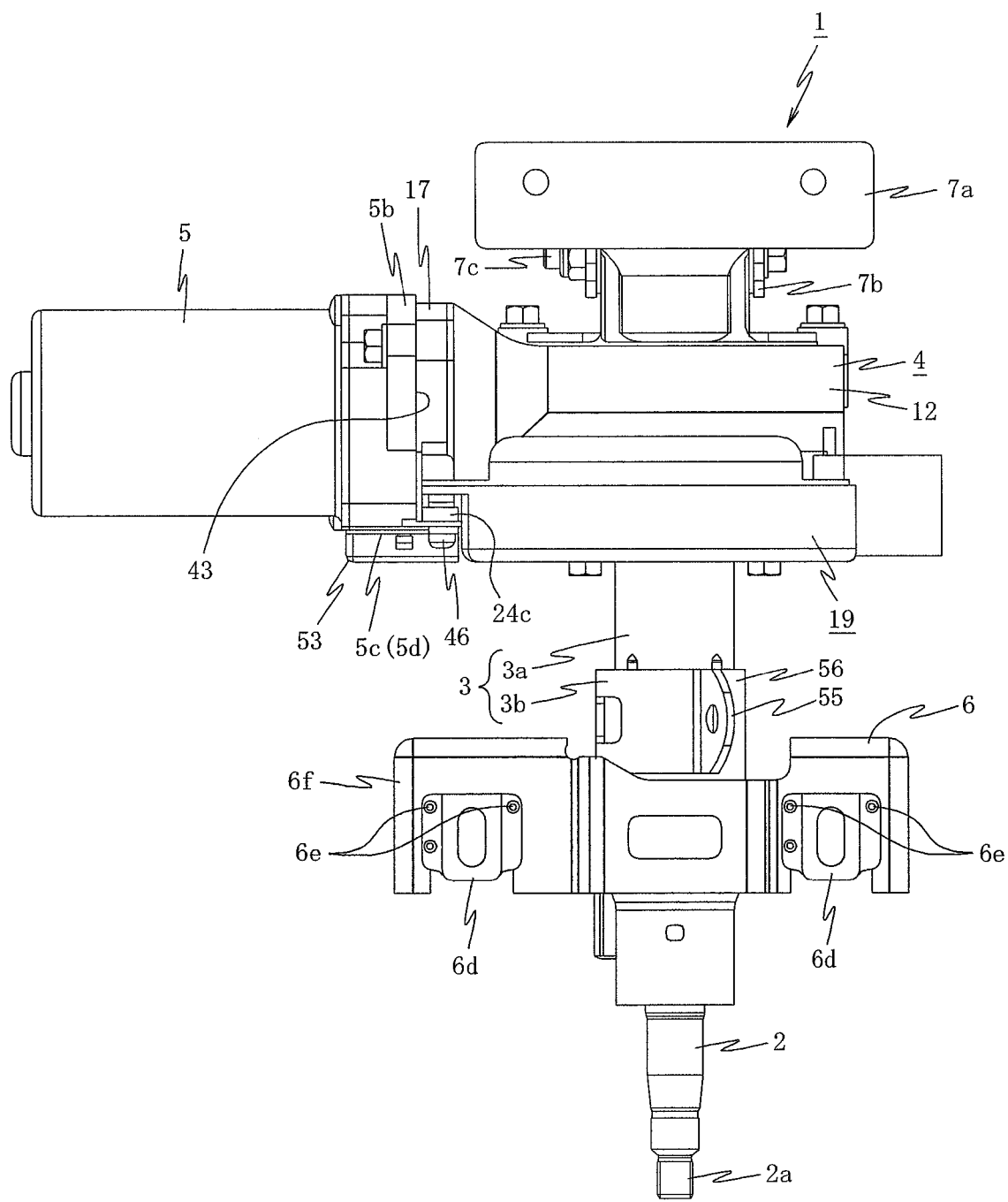
FIG. 22 is a plan view showing a second embodiment of the electric power steering apparatus according to the present invention.

In other words, in the second embodiment, as shown in FIG. 22, a height position on the steering wheel mounting section 2a side in an electric connection section 40 of the motor-side connection section of the electric motor 5 and the unit-side connection section of the control unit 19 is set to be equal to or lower than a height position on the steering wheel mounting section 2a of the control unit 19, i.e., not to further project than an end face on the steering wheel mounting section 2a of the control unit 19.

Figure 23A:
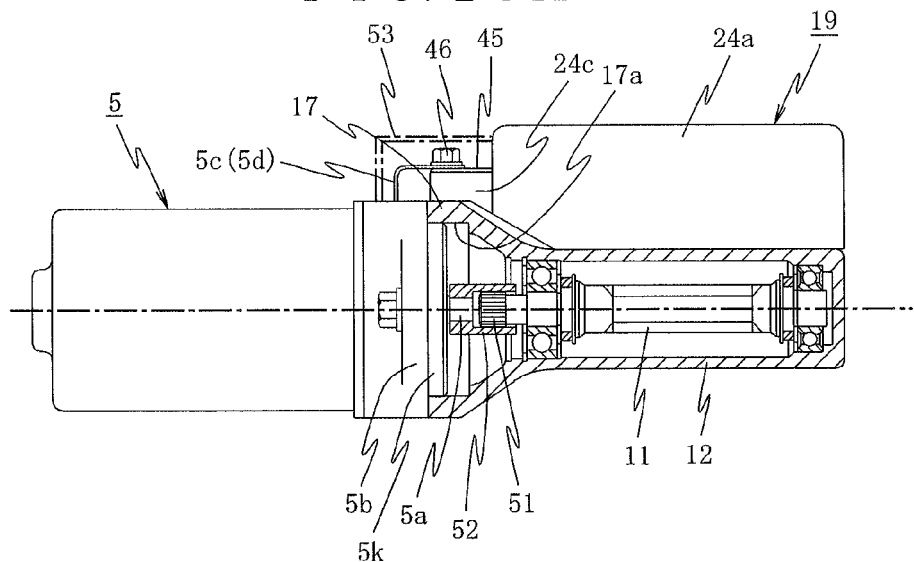
Figure 23B:
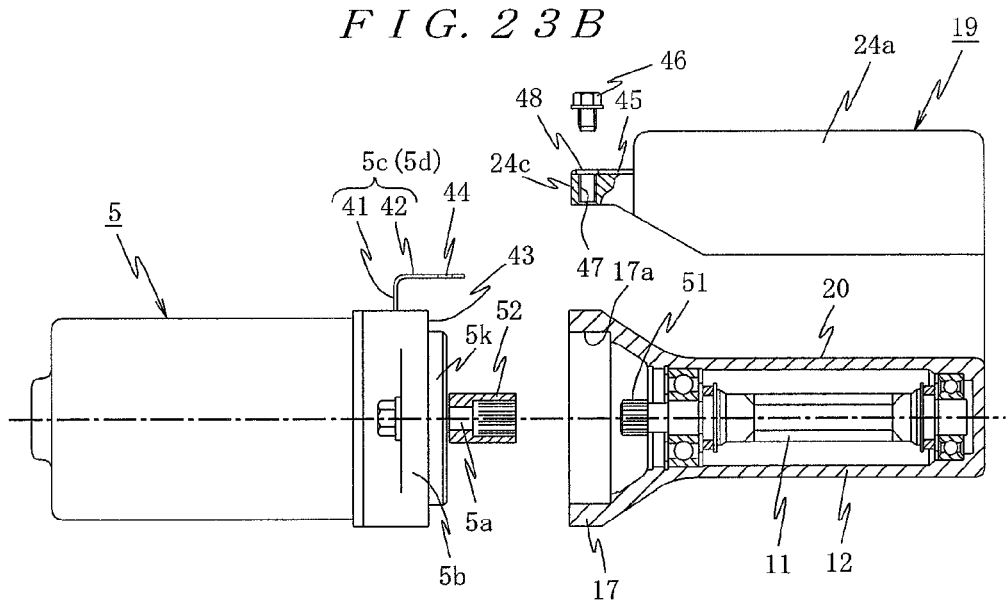
Figure 23C:
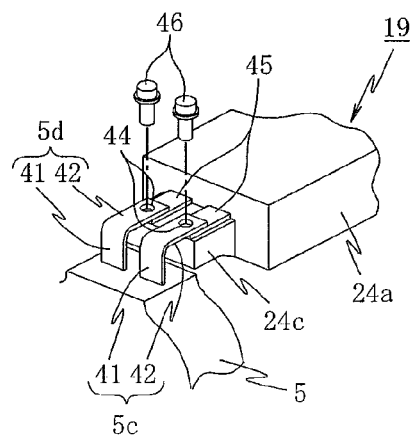

Therefore, as shown in FIGS. 23A to 23C, the connection terminals 5c and 5d as the motor-side connection section of the electric motor 5 include radial-direction plate sections 41 that project in a position shifted 90 degrees in the circumferential direction from the attachment flanges 5b of the electric motor 5 and in a radial direction on a plane substantially identical with a surface on the opposite side of the control unit 19 side of the attachment flanges 5b and axial-direction plate sections 42 that extend forward on the control unit 19 side in parallel to the axial direction of the electric motor 5 from upper ends of the radial-direction plate sections 41. Distal ends of the axial-direction plate sections 42 are projected further forward than an attachment end face 43 that is brought into contact with the motor mounting section 17 of the reduction gear box 4 of the electric motor 5. Relatively large through holes 44, through which fixing screws 46 are inserted, are drilled in centers in an axial direction of the axial-direction plate sections 42.

On the other hand, as shown in FIGS. 23A to 23C, the terminal block 24c of the control unit 19 is formed to project to the electric motor 5 side from the center in an up to down direction of an end face opposed to the electric motor 5 of the frame main body 24a of the control unit 19. Contact surfaces on which connection terminal plates 45 are disposed are formed on an upper end surface of the terminal block 24c in parallel to the axial direction of the electric motor 5. Female screws 47, in which the fixing screws 46 are screwed, are formed in the terminal block 24c. In the connection terminal plates 45, through holes 48, through which the fixing screws 46 are inserted, are formed in positions opposed to the female screws 47.

Moreover, a coupling 52, which is, for example, serration-connected to a worm shaft 51 attached with the worm 11 of the reduction gear box 4, is attached to the output shaft 5a of the electric motor 5.

The projection length of the axial-direction plate sections 42 of the connection terminals 5c and 5d of the electric motor 5 is adjusted such that, when the electric motor 5 is mounted on the reduction gear box 4, distal ends of the axial-direction plate sections 42 come into contact with the connection terminal plates 45 of the terminal block 24c of the control unit 19 after the coupling 52 of the electric motor starts to be serration-connected to the worm shaft 51 of the reduction gear box 4.

Moreover, in a state in which the electric motor 5 is mounted on the reduction gear box 4 and the connection terminals 5c and 5d are electrically connected to the terminal block 24c of the control unit 19, the terminal block 24c and the connection terminals 5c and 5d are covered with a protective cover 53 as indicated by an alternate long and short dash line in FIG. 23A. A height position on the steering-wheel mounting section 2a side of the protective cover 53 is set to be equal to or lower than a height position of the steering-wheel mounting section 2a side of the control unit 19.

An inro fitting section 17a is formed in the motor mounting section 17 of the reduction gear box 4. An inro section 5k fitting in the inro fitting section 17a is formed on the attachment end face 43 of the electric motor 5.

According to this second embodiment, as shown in FIG. 23B, in a state in which the worm housing unit 12 of the reduction gear box 4 is separated from the electric motor 5 and the control unit 19, the control unit 19 is mounted on the control-unit mounting section 20 on the worm housing unit 12 and, then, the electric motor 5 is mounted on the electric-motor mounting section 17.

In this case, during a period in which the coupling 52 attached to the output shaft 5a of the electric motor 5 is inserted through the worm housing unit 12 and the distal end of the coupling 52 starts to be serration-connected to the worm shaft 51, the distal ends of the axial-direction plate sections 42 in the connection terminals 5c and 5d of the electric motor 5 do not come into contact with the terminal block 24c of the control unit 19 and do not interfere with the terminal block 24c. Therefore, it is possible to easily perform the serration connection of the coupling 52 and the worm shaft 51 while rotating the electric motor 5 itself in the circumferential direction.

After the serration connection of the coupling 52 and the worm shaft 51 is started, in a state in which the axial-direction plate sections 42 of the connection terminals 5c and 5d of the electric motor 5 and the connection terminal plates 45 of the terminal block 24c of the control unit 19 are opposed to each other, the electric motor 5 is pushed into the motor mounting section 17 side of the reduction gear box 4. Consequently, the inro section 5k fits in the inro fitting section 17a and the electric motor 5 is mounted on the motor mounting section 17. The axial-direction plate sections 42 of the connection terminals 5c and 5d are brought into surface contact with the connection terminal plates 45 of the terminal block 24c of the control unit 19. The through holes 44 formed in the axial-direction plate sections 42 match the female screws 47 and the through holes 48 of the connection terminal plates 45. In this state, by screwing the fixing screws 46 in the female screws 47 through the through holes 44 and 48, the connection terminals 5c and 5d of the electric motor 5 and the connection terminal plates 45 of the terminal block 24c of the control unit 19 are electrically connected.

Thereafter, the protective cover 53 is attached to cover the terminal block 24c of the control unit 19 and the connection terminals 5c and 5d of the electric motor 5.

In this way, according to the second embodiment, the connection terminals 5c and 5d of the electric motor 5 are formed in a reverse L shape in the radial-direction plate sections 41 and the axial-direction plate sections 42. The terminal block 24c of the control unit 19 is formed in a middle position in the up to down direction of the frame main body 24a and in a direction in which the contact surface thereof in contact with the axial-direction plate sections 42 is parallel to the axial direction of the electric motor 5. Therefore, it is possible to set a height position to which the protective cover 53 is adjusted on the steering-wheel mounting section 2a side to be equal to or lower than a height position of the control unit 19. It is possible to surely prevent an impact load from being inputted from the steering-wheel mounting section 2a side and adversely affecting an impact absorbing function of the outer column 3b and the upper bracket 6 that stroke-move to the gear box 4 side while absorbing the impact load. Further, it is possible to surely prevent the motor-side connection section of the electric motor 5 and the unit-side connection section of the control unit 19 from projecting to the steering-wheel mounting section 2a side from the control unit 19 and interfering with or approaching a key lock flange 55 and a key lock unit 56 attached to this key lock flange 55 mounted on an outer peripheral surface of the outer column 3b of the steering column 3 shown in FIG. 21 to be a hindrance to an assembly structure.

Moreover, the projection length of the connection terminals 5c and 5d of the electric motor is maintained in a state in which the coupling 52 of the electric motor 5 is separated in the axial direction from the terminal block 24c of the control unit 19 until the coupling 52 starts serration connection with the worm shaft 51 in the worm housing unit 12 formed in the reduction gear box 4. Therefore, when the electric motor 5 itself is rotated in the circumferential direction in order to serration-connect the coupling 52 and the worm shaft 51, it is possible to surely prevent the connection terminals 5c and 5d and the terminal block 24c from interfering with each other.

In the second embodiment, the case in which the motor-side connection section includes the radial-direction plate sections 41 and the axial-direction plate sections 42 and the unit-side connection section includes the terminal block 24c is explained. However, the present invention is not limited to this. The unit-side connection section may include the radial-direction plate sections 41 and the axial-direction plate sections 42 and the motor-side connection section may include the terminal block 24c.

Next, a third embodiment of the present invention is explained with reference to FIGS. 24 and 25.

In the third embodiment, the connection terminals 5c and 5d according to the second embodiment described above has flexibility.

Figure 24A:
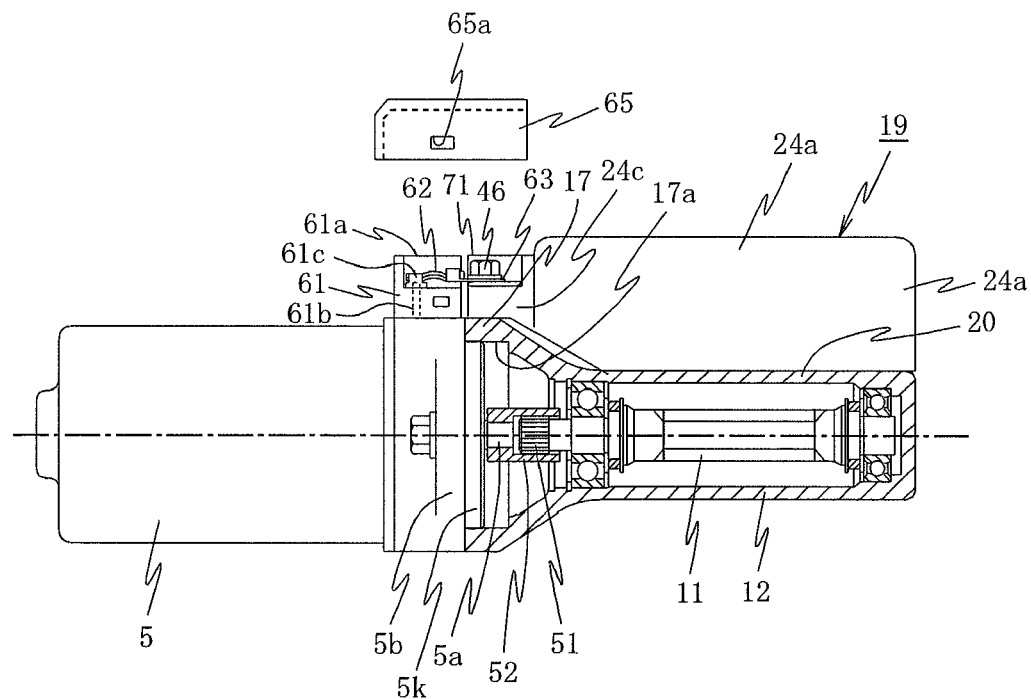

In short, in the third embodiment, as shown in FIGS. 24 and 25, the motor-side connection section of the electric motor 5 includes a cable guide section 61 that has insulating properties and is opened at an upper end, has an insulating wall 61a in the center in the circumferential direction, and is fixed to an outer peripheral portion near an attachment end face 60 attached to the motor mounting section 17 of the reduction gear box 4 of the electric motor 5, two radial-direction plate sections 61b installed in two areas, which are defined by the insulating partition wall 61a of this cable guide section 61, and connected to the bus bars 5i and 5j, flexible cables 62 that are fastened by a fastening tool 61c to a projecting section projecting from the cable guide section 61 of these radial-direction plate sections 61b and include, for example, pigtail cables in which a mesh-like conductor is disposed in a bendable outer peripheral portion formed in an L shape with a distal end thereof bent upward, and a terminal plate section 63 attached to distal ends of the flexible cables 62. Locking pawls 66 that lock locking holes 65a formed in the protective cover 65 is formed in sidewalls at both ends in a circumferential direction of the cable guide section 61.

On the other hand, as shown in FIGS. 25A to 25C, the terminal block 24c of the control unit 19 has the structure same as that shown in FIGS. 23A to 23C except that an insulating partition wall 71 connected to the insulating wall 61a in the cable guide section 61 of the electric motor 5 is formed between the connection terminal plates 45 according to the second embodiment.

In this third embodiment, as in the embodiments described above, a height position of the end face on the steering-wheel mounting section 2a side of the protective cover 65 is set equal to or lower than a height position of the end face on the steering-wheel mounting section 2a side of the control unit 19 to prevent the protective cover 65 from projecting further to the steering-wheel mounting section 2a side than the end face on the steering-wheel mounting section 2a side of the control unit 19.

Figure 24B:
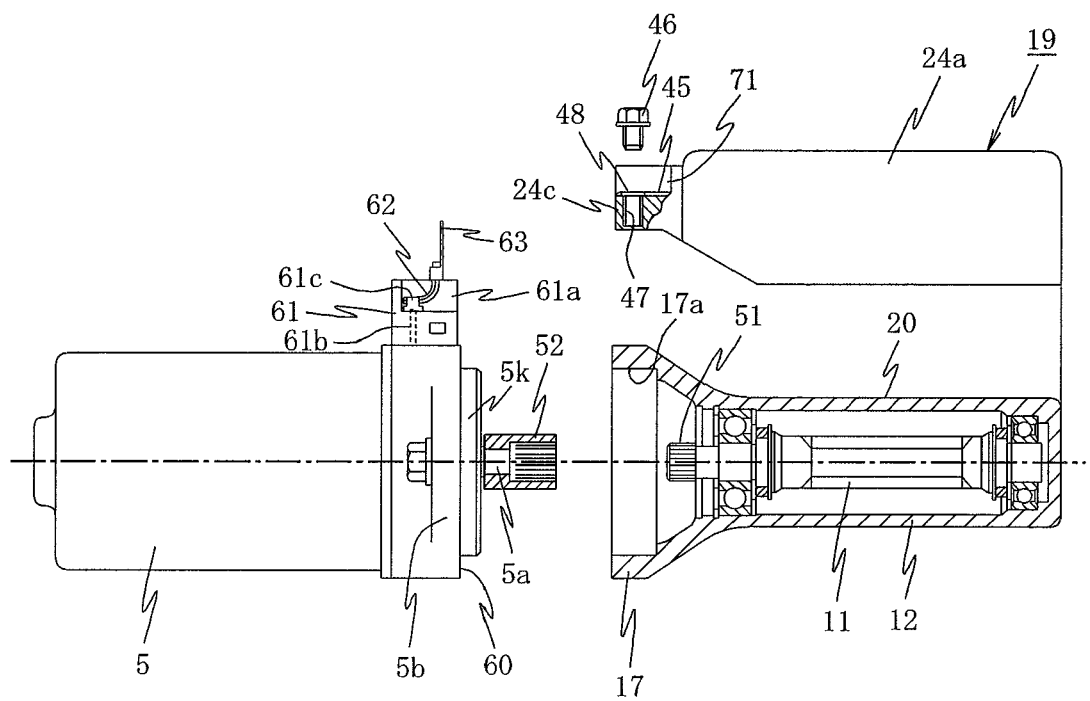

According to this third embodiment, in a state in which the control unit 19 is mounted on the reduction gear box 4 as in the first and second embodiments described above, when the electric motor 5 is assembled to the reduction gear box 4, the flexible cables 62 of the electric motor 5 are bent in an L shape such that the terminal plate section 63 extends in the radial direction as shown in FIGS. 24B and 25A. By bending the flexible cables 62 in an L shape in this way, the flexible cables 62 and the terminal plate section 63 do not interfere with the terminal block 24c of the control unit 19 in the circumferential direction and it is possible to easily perform serration connection of the coupling 52 attached to the output shaft 5a of the electric motor 5 and the worm shaft 51 of the worm housing unit 12 of the reduction gear box 4.

In a state in which the serration connection of the coupling 52 and the worm shaft 51 is started, the electric motor 5 is mounted on the motor mounting section 17 of the reduction gear box 4 such that the cable guide section 61 and the terminal block 24c are opposed to each other. In this state, as shown in FIG. 25B, by extending bent sections of the flexible cables 62, the terminal plate section 63 is brought into surface contact with the connection terminal plates 45 of the terminal block 24c of the control unit 19 and through holes 64 formed in the terminal plate section 63, and the female screws 47 of the terminal block 24c and the through holes 48 of the connection terminal plates 45 are matched. In this state, as shown in FIGS. 25B and 25C, by screwing the fixing screws 46 in the female screws 47 through the through holes 64 and 48, the terminal plate section 63 of the electric motor 5 and the connection terminal plates 45 of the terminal block 24c of the control unit 19 are electrically connected. In this case, the insulating partition wall 61a is formed in the cable guide section 61 of the electric motor 5 and the insulating partition wall 71 is formed in the terminal block 24c of the control unit 19. Therefore, it is possible to surely prevent the flexible cables 62 from coming into contact with one another to short-circuit.

Thereafter, as shown in FIG. 25D, the protective cover 65 is attached to cover the terminal block 24c of the control unit 19 and the cable guide section 61 of the electric motor 5 with the locking hole sections 65a, which are formed in an inner side surface thereof, locked to the locking pawls 66 formed on the side of the cable guide section 61.

In this way, in the third embodiment, as in the embodiments described above, the projection height on the steering-wheel mounting section 2a side of the motor-side connection section and the unit-side connection section, which electrically connect the electric motor 5 and the control unit 19, is set to be equal to or smaller than the projection height on the steering-wheel mounting section 2a side of the control unit 19. Therefore, when the outer column 3b and the upper bracket 6 are stroke-moved to the reduction gear box 4 side by an impact load from the steering-wheel mounting section 2a side, mounting members such as the key lock flange 55 and the key lock unit 56 mounted on the outer column 3b of the steering column 3 and the protective cover 65 do not interfere with each other. Therefore, it is possible to sufficiently show an impact absorbing function. Further, it is possible to secure a sufficient work space and easily perform assembly work when the electric power steering apparatus is assembled.

Moreover, since the motor connecting section of the electric motor 5 has the flexible cables 62, even if a manufacturing error occurs in the electric motor 5 and the reduction gear box 4, it is possible to absorb this manufacturing error with bending of the flexible cables 62.

In the third embodiment, the case in which the motor-side connecting section includes the cable guide section 61 having the radial-direction plate section 61b installed therein, the fastening tool 61c, the flexible cables 62, and the terminal plate section 63 and the unit-side connecting section includes the terminal block 24c is explained. However, the present invention is not limited to this. The unit-side connecting section may include the cable guide section 61, the fastening tool 61c, the flexible cables 62, and the terminal plate section 63 and the motor-side connecting section may include the terminal block 24c.

In the third embodiment, the case in which the flexible cables 62 are fastened and fixed to the radial-direction plate section 61b installed in the insulating cable guide section 61 is explained. However, the present invention is not limited to this. An insulating cable guide section may be embedded in the outer peripheral portion of the electric motor 5 to make it possible to directly lead out the flexible cables 62 from the outer peripheral portion of the electric motor 5. When flexible cables with the conductor in the center insulated and coated are applied as the flexible cables instead of pigtail cables having the mesh-like conductor on the outer peripheral surface, it is unnecessary to make the cable guide section insulative and the cable guide section itself may be omitted.

Moreover, in the second and third embodiments, the case in which the connection terminals 5c and 5d and the terminal plate section 63 of the electric motor 5 and the terminal block 24c of the control unit 19 are fixed by the fixing screws 46 is explained. However, the present invention is not limited to this. As in the first embodiment described above, the motor-side connecting section and the unit-side connecting section may be fixed by the locking tool such as a bolt or a rivet or fixed by welding means such as fusing, spot welding, or TIG welding.

Moreover, in the second and third embodiments, the case in which the coupling 52 of the electric motor 5 and the worm shaft 51 of the reduction gear box 4 are serration-connected is explained. However, the present invention is not limited to this. The coupling 52 and the worm shaft 51 may be spline-connected. It is possible to apply an arbitrary connection method.

Furthermore, in the first to third embodiments, the case in which the external connection terminals 15c to 15f of the torque sensor 15 are bent in an L shape and inserted through the through holes 25a to 25d of the control board 25 is explained. However, the present invention is not limited to this. In order to facilitate insertion of the external connection terminals 15c to 15f through the through holes 25a to 25d, a guide member having a funnel-like guide surface may be provided on an insertion side of the external connection terminals 15c to 15f of the through holes 25a to 25d.

In the first to third embodiments, the case in which the external connection terminals 15c to 15f of the torque sensor 15 is explained. However, the present invention is not limited to this. The external connection terminals 15c to 15f may be provided linearly and electrically connected by soldering, fusing, or the like along a connection land formed in the control board 25 or may be clipped to the control board 25 using the external connection terminals as clip terminals.

Moreover, in the first to third embodiments, the case in which the flat attaching surface 20a of the control-unit mounting section 20 of the reduction gear box 4 is a plane orthogonal to the center axis of the steering column 3 is explained. However, the present invention is not limited to this. The flat attaching surface 20a may be a surface inclining with respect to a surface orthogonal to the center axis of the steering column 3.

Furthermore, in the first to third embodiments, the case in which the electric motor 5, the control unit 19, and the connectors 24d and 24e are linearly arranged along a line orthogonal to the center axis of the steering column 3 is explained. However, the present invention is not limited to this. The electric motor 5, the control unit 19, and the connectors 24d and 24e may be linearly arranged along a line orthogonal to the center axis of the steering column 3. Furthermore, in the first to third embodiments, the case in which the connection opening for the power supply connector 24*d* and the signal connector 24*e* of the control unit 19 is provided on the right end side is explained. However, the present invention is not limited to this. The connection opening may be formed in the axial direction of the steering column 3 and the external connectors may be mounted from the axial direction of the steering column 3.

In the first to third embodiments, when the control unit 19 is configured, first, the power board 23 is screwed to the flat attaching surface 20*a* and, then, the synthetic resin frame 24 is fixed, and the control board 25 is screwed to this synthetic resin frame 24 is explained. However, the present invention is not limited to this. The synthetic resin frame 24 may be fixed to the flat attaching surface 20*a* after the power board 23 and the control board 25 are attached to the synthetic resin frame 24. Moreover, a part of the synthetic resin frame 24 and the power board 23 may be tightened together.

Moreover, in the first to third embodiments, the case in which the power board 23 is formed by a metal board having high thermal conductivity is explained. However, a metal board as a separate member may be attached to the flat attaching surface 20*a* of the control-unit mounting section 20 via the metal board and the hear radiation grease. Moreover, the power board 23 formed by a metal board may be mounted on the flat attaching surface 20*a* via a still another metal board and the radiation grease.

Furthermore, in the first to third embodiments, the case in which the brush motor is applied as the electric motor 5 is explained. However, the present invention is not limited to this. A brushless motor may be applied. In this case, the bus bars 5*c* and 5*d* may be connected to a power distribution side of energization coils of the respective phases and an inverter circuit having, for example, a field effect transistor (FET) for driving the brushless motor and a gate driving circuit that drives a gate of the field effect transistor of the inverter circuit may be mounted on the power board 23.

Next, a fourth embodiment of the present invention is explained with reference to FIGS. 26 to 29.

This fourth embodiment is adapted such that, in the second embodiment, when the electric motor 5 is mounted on the reduction gear box 4, the motor-side connection terminals 5*c* and 5*d* and the terminal block 24*c* on the control unit 19 side do not interfere with each other.

Figure 27:
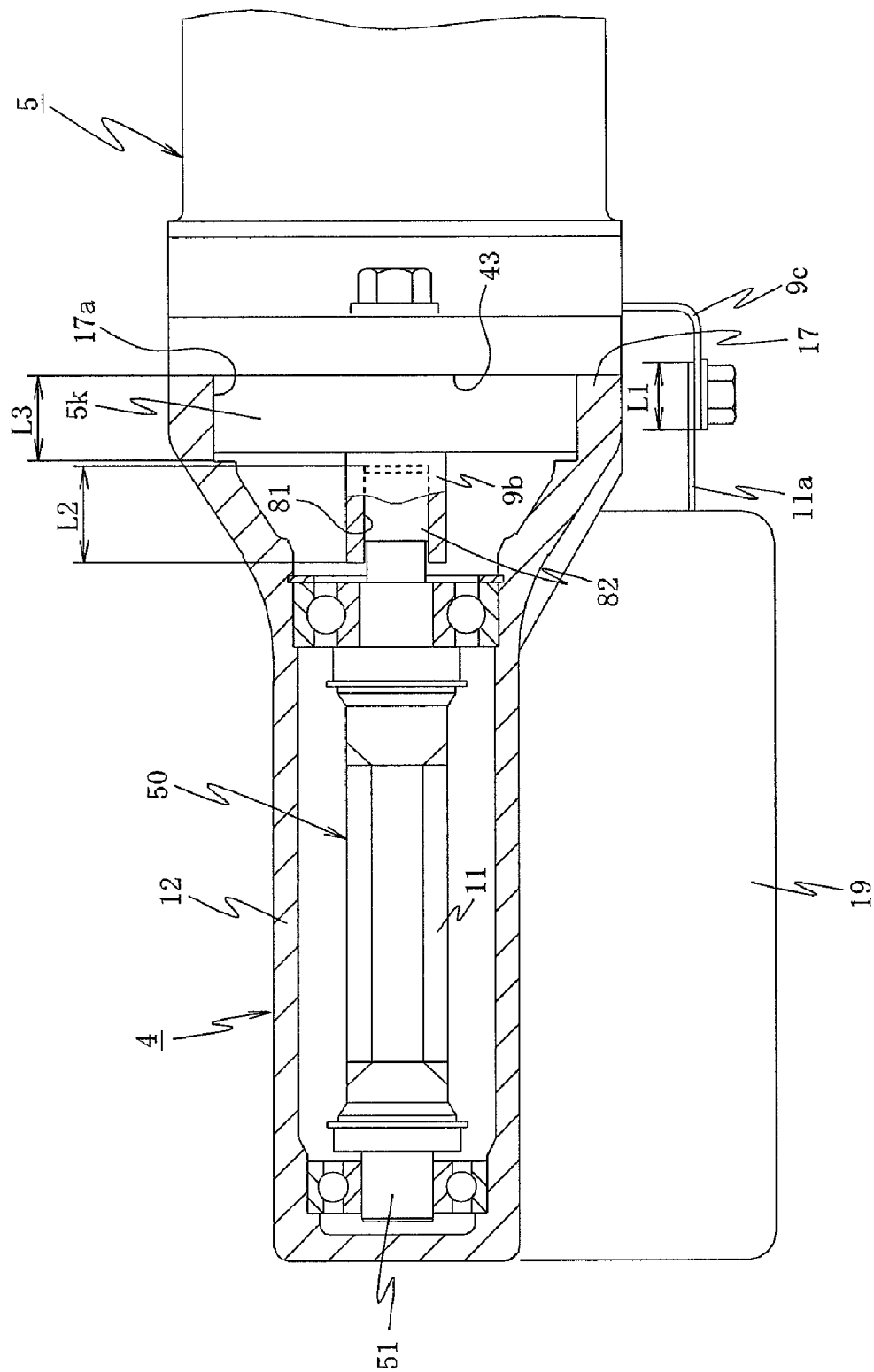
FIG. 27 is a sectional view showing the inside of a gear housing shown in FIG. 26.

In short, in the fourth embodiment, as shown in FIGS. 26 and 27, a spline hole 81 (see FIG. 27) is formed in a distal end surface of the output shaft 5*ab* of the electric motor 5. The electric motor 5 has the two connection terminals 5*c* and 5*d* (see FIG. 5) near the motor attachment flange 17 serving as the motor mounting section of the gear housing 4 serving as the reduction gear box. These motor-side connection terminals 5*c* and 5*d* are made of a metal plate such as a copper plate and formed in an L shape with a distal end portion thereof bent to the gear housing side.

A worm gear mechanism 50 built in the gear housing 4 includes the worm shaft 51 in which the worm 11 is formed and a worm wheel (not shown) that meshes with the worm 11. At the motor side end of the worm shaft 51, a spline shaft 82 that fits in the spline hole 81 is formed integrally with the worm shaft 51.

As shown in FIG. 26, the motor control unit 19 has two connection terminals 83*a* and 83*b* formed in a flat shape near the motor attachment flange 17 of the gear housing 4. These control-unit-side connection terminals 83*a* and 83*b* project to the electric motor side. As shown in FIG. 27, the control-unit-side connection terminals 83*a* and 83*b* overlap and are in surface contact with the motor-side connection terminals 5*c* and 5*d* on a plane parallel to the output shaft 5*a* of the electric motor 5.

As shown in FIG. 27, when the length of a portion where the motor-side connection terminals 5*c* and 5*d* and the control-unit-side connection terminals 83*a* and 83*b* overlap (hereinafter referred to as "lap length") is represented as L1, the spline fitting length of the output shaft 5*a* of the electric motor 5 and the worm shaft 51 of the worm gear mechanism 50 is represented as L2, and the inro fitting length of the inro section 5*k* of the electric motor 5 and the inro fitting section 17*a* of the gear housing 4 is represented as L3, in this embodiment, L2>L3>L1.

Figure 28A:
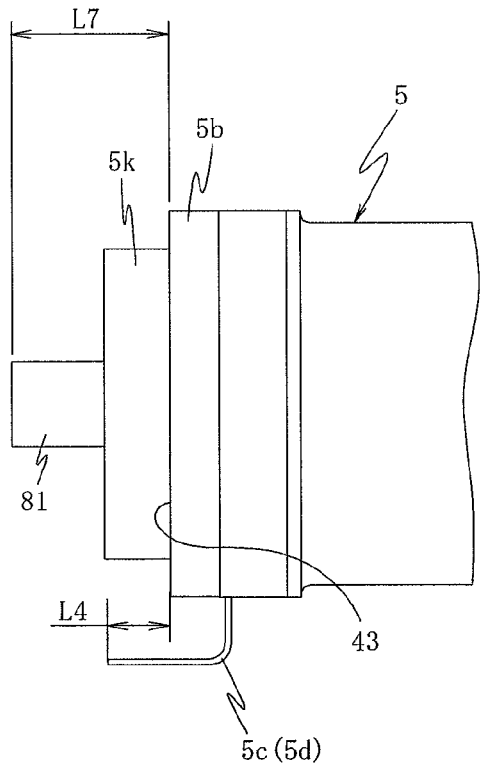
FIGS. 28A and 28B are the diagrams showing a main part of an electric power steering apparatus according to the third embodiment of the present invention.
Figure 28B:
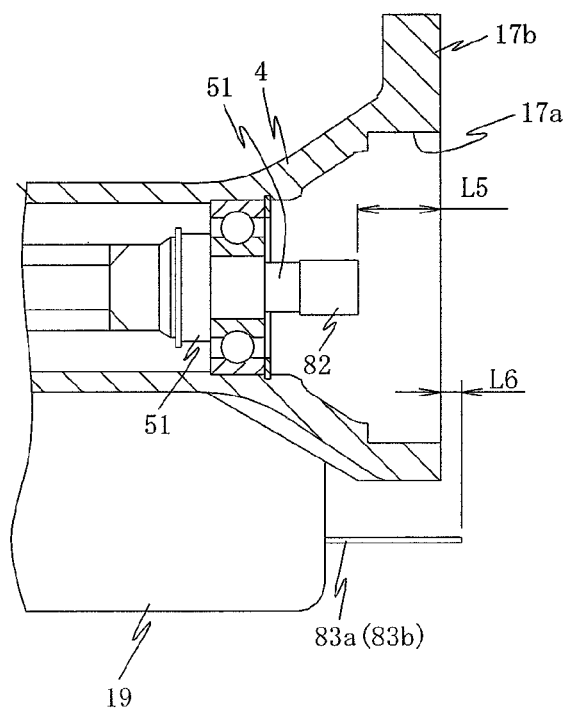

As shown in FIG. 28, when a distance from the housing-side end face 43 as the attaching surface of the attachment flange 5*b* formed in the electric motor 5 to the distal ends of the motor-side connection terminals 5*c* and 5*d* is represented as L4, a distance from the motor-side end face 17*b* of the attachment flange 17 formed in the gear housing 4 to the motor-side end face of the worm shaft 51 is represented as L5, a distance from the motor-side end face of the motor attachment flange 17 to distal ends of the control-unit-side connection terminals 83*a* and 83*b* is represented as L6, a distance from the housing-side end face 42 of the motor flange 5*b* to the distal end of the motor output shaft 5*a* is represented as L7, and an amount of a gap between the motor-side connection terminals 5*c* and 5*d* and the control-unit-side connection terminals 83*a* and 83*b* immediately before the motor output shaft 5*a* of the electric motor 5 fits in the worm shaft 51 is represented as L8 (see FIG. 8), in this embodiment, (L4+L5+L6)<L7 and (L4+L5+L6+L8)=L7.

When the distal ends of the control-unit-side connection terminals 83*a* and 83*b* do not project from the motor attachment flange 17 of the gear housing 4 to the electric motor side, the distance L6 takes a negative value. When the distal ends of the motor-side connection terminals 5*c* and 5*d* do not project from the motor flange 5*b* of the electric motor 5 to the gear housing side, the distance L4 takes a negative value.

Figure 29:
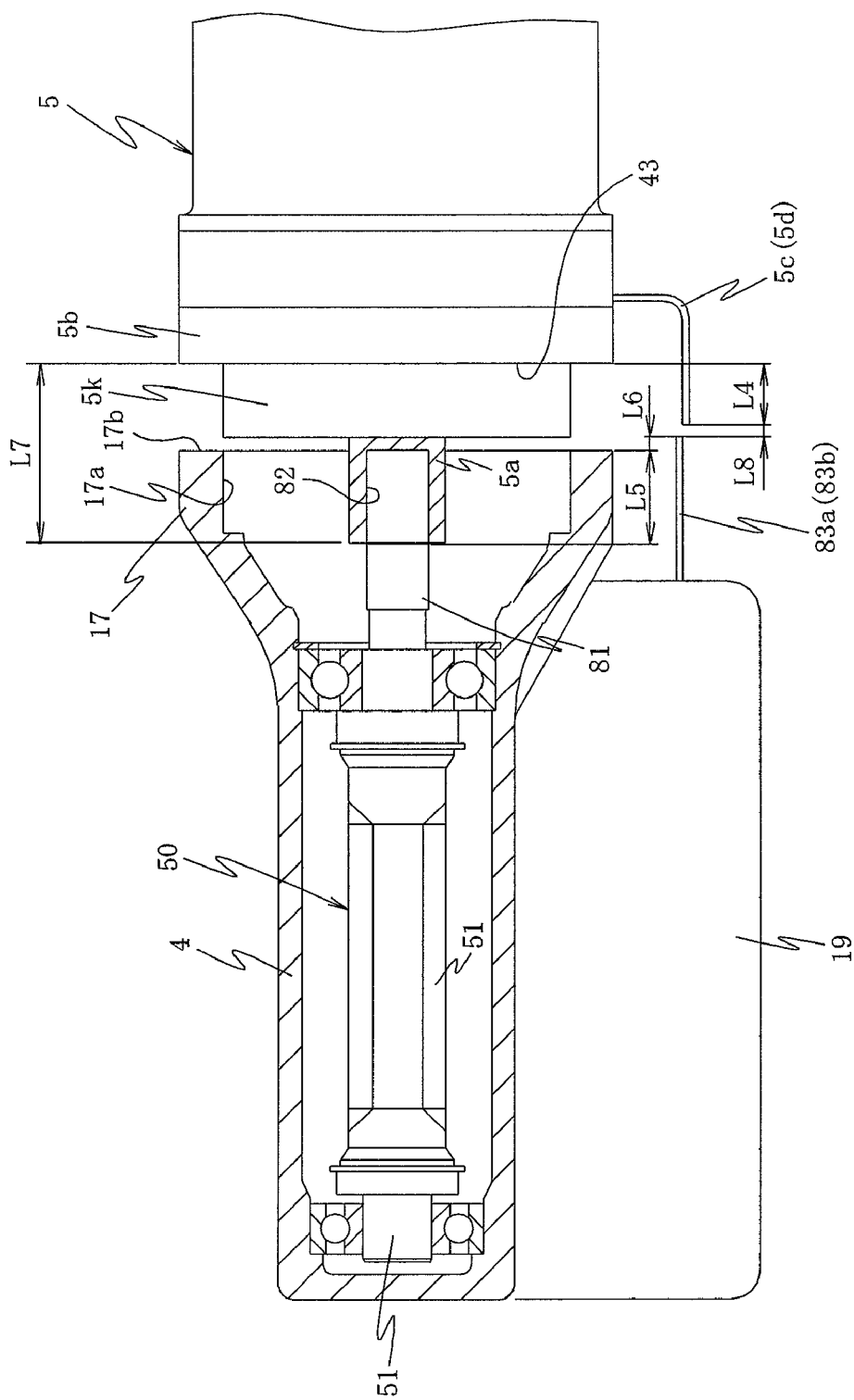
FIG. 29 is a diagram for explaining actions of the electric power steering apparatus according to the third embodiment of the present invention.

A state immediately before the motor output shaft 5*a* of the electric motor 5 spline-fits in the worm shaft 51 in such a configuration is shown in FIG. 29. As shown in the FIG., it is seen that, immediately before the motor output shaft 5*b* of the electric motor 5 spline-fits in the worm shaft 51, the motor-side connection terminals 5*c* and 5*d* do not lap over the control-unit-side connection terminals 83*a* and 83*b* yet. This is because a sum (L4+L5+L6) of the distance L4 from the housing-side end face 43 of the motor flange 5*b* to the distal ends of the motor-side connection terminals 5*c* and 5*d*, the distance L5 from the motor-side end face of the motor attachment flange 17 to the motor-side end face of the worm shaft 51, and the distance L6 from the motor-side end face 17*b* of the motor attachment flange 17 to the distal ends of the control-unit-side connection terminals 83*a* and 83*b* is smaller than the distance L7 from the housing-side end face 43 of the motor flange 17 to the distal end surface of the motor output shaft 5*a*.

Therefore, in the fourth embodiment described above, the sum (L4+L5+L6) of the distance L4 from the housing-side end face 43 of the motor flange 17 to the distal ends of the motor-side connection terminals 5*c* and 5*d*, the distance L5 from the motor-side end face 17*b* of the motor attachment flange 17 to the motor-side end face of the worm shaft 51, and the distance L6 from the motor-side end face of the motor attachment flange 17 to the distal ends of the control-unit-side connection terminals 83*a* and 83*b* is set smaller than the distance L7 from the housing-side end face 43 of the motor flange 5*b* to the distal end surface of the motor output shaft 5*a*.

Consequently, when the electric motor 5 is attached to the gear housing 4, the motor-side connection terminals 5c and 5d do not overlap and come into contact with the control-unit-side connection terminals 83a and 83b before the motor output shaft 5a of the electric motor 5 spline-fits in the worm shaft 51. Therefore, it is possible to easily perform phasing of the motor output shaft 5a of the electric motor 5 and the worm shaft 51.

The electric motor 5 does not move in a direction other than the axial direction and the peripheral direction of the electric motor 5 because the motor output shaft 5a of the electric motor 5 spline-fits in the worm shaft 51 before the connection terminals 5c and 5d of the electric motor 5 lap over the connection terminals 83a and 83b of the motor control unit 19. Therefore, it is also possible to prevent the electric connection section of the electric motor 5 and the motor control unit 19 from being brought into contact with an unnecessary portion to cause breakage or deformation of the electric connection portion.

In the forth embodiment described above, the motor output shaft 5a of the electric motor 5 that spline-fits in the worm shaft 51 is described as an example. However, the present invention is not limited to this. For example, the present invention can be applied to the motor output shaft 5a of the electric motor 5 that fits in the worm shaft 51 by coupling or the like. The motor output shaft 5a and the worm shaft 51 may be serration-fit instead of being spline fit.

In the fourth embodiment described above, the spline fitting length L2 of the motor output shaft 5a of the electric motor 5 and the worm shaft 51 larger than the inro fitting length L3 of the inro section 5k of the electric motor 5 and the inro fitting section 17a of the gear housing 4 is described as an example. However, the spline-fitting length L2 of the motor output shaft 5a of the electric motor 5 and the worm shaft 51 may be set smaller than the inro fitting length L3 of the inro section 5k of the electric motor 5 and the inro fitting section 17a of the gear housing 4. By setting a relation among L3, L2, and L1 as L3>L2>L1, an attachment length of the electric motor 5 projecting from the gear housing 4 is not so large even when the mass of the electric motor 5 is large (when the axial direction length of the motor body is large). Therefore, it is possible to attach an electric motor having the large mass to the gear housing 4.

Next, a fifth embodiment of the present invention is explained with reference to FIG. 30.

In this fifth embodiment, as in the third embodiment described above, the motor-side connection terminals are formed in the flexible structure and the control-unit-side connection terminals are formed in the rigid structure.

Figure 30:
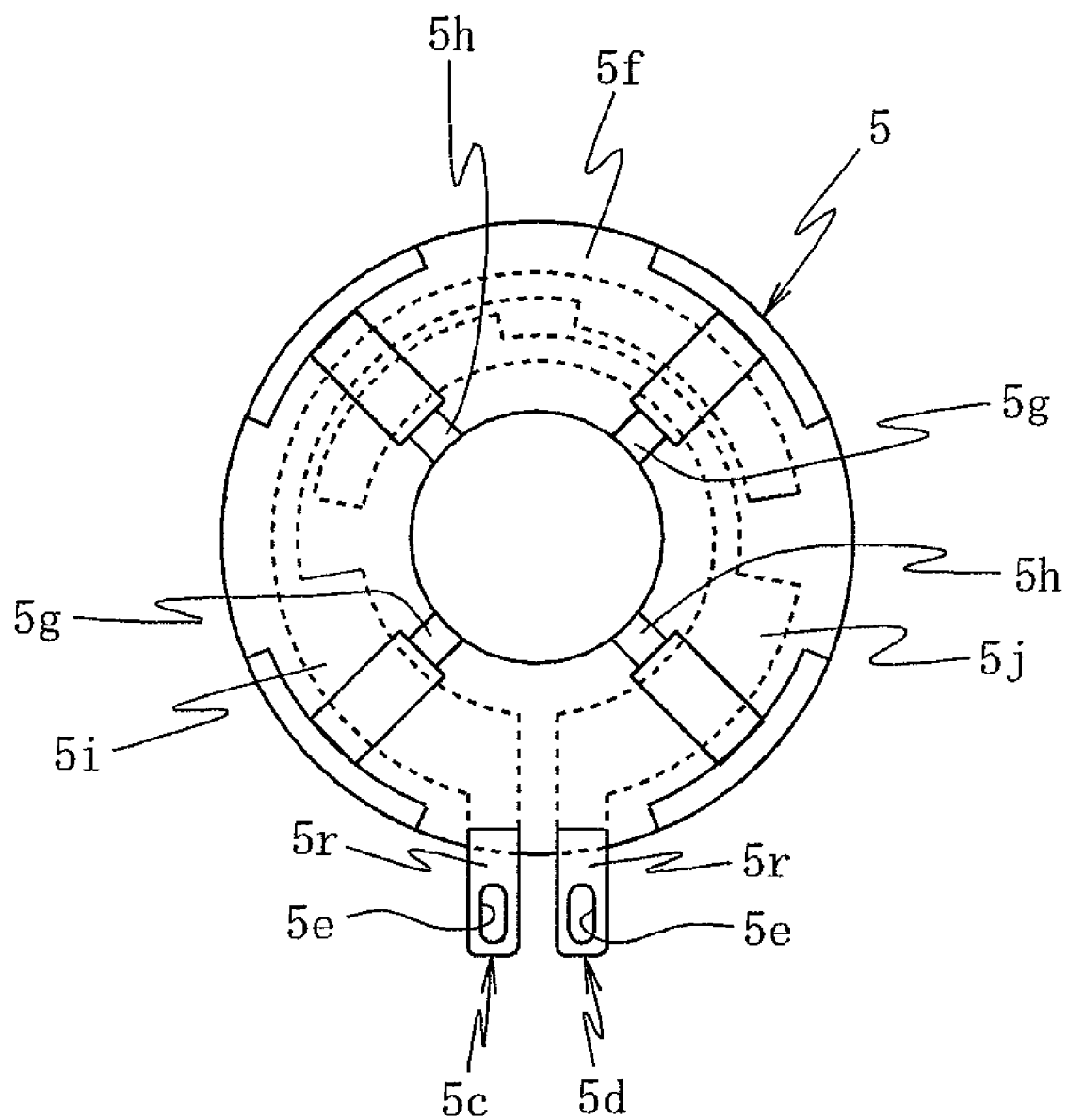
FIG. 30 is a front view showing an internal structure of an electric motor forming an electric power steering apparatus according to a fourth embodiment of the present invention.
Figure 31A:
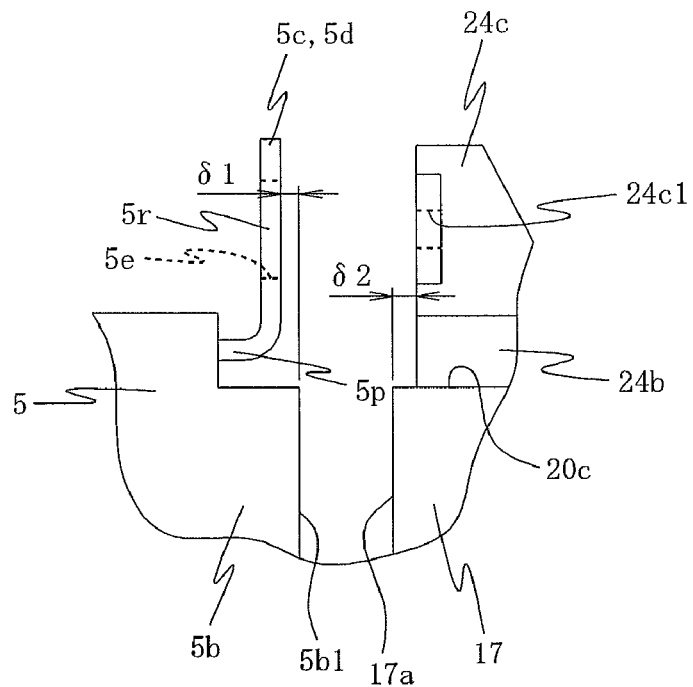
FIGS. 31A and 31B are the diagrams showing a connection structure of a connection terminal of an electric motor and a terminal block of a control unit according to the fourth embodiment.
Figure 31B:
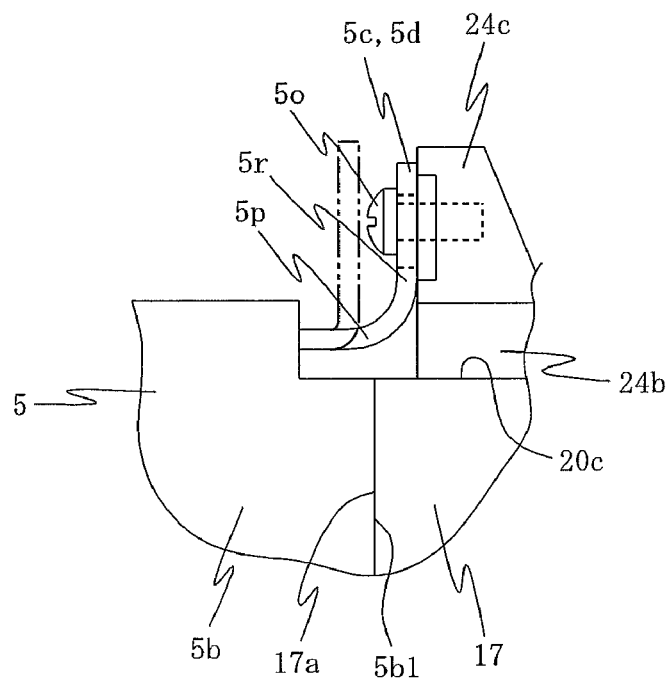

In this fifth embodiment, FIG. 30 shows the internal structure of the electric motor 5 same as that shown in FIG. 8 according to the first embodiment described above. FIG. 31A shows a shape of the connection terminals 5c and 5d and a position of the terminal block 24c before the attachment flange 5b of the electric motor 5 and the motor attaching section 17 of the reduction gear box 4 are assembled. FIG. 31B shows a connection state of the terminal block 24c and the connection terminals 5c and 5d after the attachment flange 5b and the motor attaching section 17 are assembled.

As shown in FIG. 31A, the respective connection terminals 5c and 5d are tabular metal members bent in an L shape including first elastic plate sections 5p extending in the axial direction of the electric motor 5 and second elastic plate sections 5r extending from the distal ends of the first elastic plate sections 5p in a direction orthogonal to the axis of the electric motor 5 and are formed in a flexible structure elastically deformable in the axial direction of the electric motor 5.

The long holes 5e, through which fixing screws are inserted, are drilled at distal end portions of the second elastic plate sections 5r. The long holes 5e are drilled such that a major axis direction thereof extends in a longitudinal direction of the second elastic plate sections 5r. The respective connection terminals 5c and 5d are formed such that the second elastic plate sections 5r extend at a first tolerance δ1 with respect to a flange surface 5b1 of the attachment flange 5b.

The terminal block 24c fixed to the frame attaching surface 20c, which is provided on the outer periphery (a vehicle rear surface) of the motor attaching (mounting) section 17, via the attachment plate section 24b is also formed such that a terminal surface thereof (a surface opposed to the connection terminals 5c and 5d) is located at a second tolerance δ2 with respect to the flange surface 17a of the motor attaching section 17 and is formed in a rigid structure not deformable to the connection terminal 5c and 5d side. Screw holes 24c1 are formed in the terminal surface.

As shown in FIG. 31B, the attachment flange 5b and the motor attaching section 17 are assembled by bringing the flange surfaces 5b1 and 17a thereof into contact with each other. In this case, a gap (a distance obtained by adding up the first tolerance δ1 and the second tolerance δ2) is present between the connection terminals 5c and 5d and the terminal block 24c. However, the second elastic plate sections 5r of the connection terminals 5c and 5d are moved to the terminal block 24c side and the first elastic plate sections 5p and the second elastic plate sections 5r are elastically deformed to bring the distal end side of the second elastic plate sections 5r into surface contact with the terminal block 24c while absorbing the gap. The fixing screws 5o are screwed into the screw holes 24c1 of the terminal block 24c through the long holes 5e from the connection terminals 5c and 5d side, whereby the connection terminals 5c and 5d and the terminal block 24c are connected.

Next, operations according to the fifth embodiment are explained.

First, to assemble the electric power steering apparatus, as in the first embodiment described above, the torque sensor 15 is fixedly arranged in the torque-sensor housing unit 16 of the reduction gear box 4 such that the distal ends of the external connection terminals 15c to 15f thereof extend to the rear of the vehicle along the outer peripheral portion of the steering column 3.

Subsequently, the control unit 19 is mounted on the control-unit mounting section 20 of the reduction gear box 4. Subsequently, the steering shaft 2, the steering column 3, the worm 11, the worm wheel 13, and the like are mounted on the reduction gear box 4. Finally, the electric motor 5 is attached to the motor attaching section 17 of the reduction gear box 4.

The flange surface 5b1 of the attachment flange 5b and the flange surface 17a of the motor attaching section 17 are brought into contact with each other to set the connection terminals 5c and 5d of the electric motor 5 and the terminal block 24c of the control unit 19 opposed to each other and couple and attach the output shaft 5a of the electric motor 5 to the worm 11.

In this case, the gap (the distance obtained by adding up the first tolerance δ1 and the second tolerance δ2) present between the connection terminals 5c and 5d and the terminal block 24c is absorbed by moving the second elastic plate sections 5r of the connection terminals 5c and 5d to the terminal block 24c side and elastically deforming the first elastic plate sections 5p and the second elastic plate sections 5r. The distal end side of the second elastic plate sections 5r is brought into surface contact with the terminal block 24c. The fixing screws 5o are screwed in the terminal block 24c through the long holes 5*e* from the connection terminals 5*c* and 5*d* side to connect the connection terminals 5*c* and 5*d* and the terminal block 24*c*.

Therefore, according to this embodiment, the connection terminals 5*c* and 5*d* having the flexible structure are formed such that the second elastic plate sections 5*r* extend at the first tolerance δ1 with respect to the flange surface 5*b*1 of the attachment flange 5*b*. The terminal block 24*c* having the rigid structure is also formed such that the terminal surface (the surface opposed to the connection terminals 5*c* and 5*d*) is located at the second tolerance δ2 with respect to the flange surface 17*a* of the motor attaching section 17. It is unnecessary to arrange the connection terminals 5*c* and 5*d* and the terminal block 24*c* in highly accurate positions and it is also unnecessary to form both the connection terminals 5*c* and 5*d* and the terminal block 24*c* in the flexible structure. Therefore, it is possible to realize a reduction in manufacturing cost.

When the connection terminals 5*c* and 5*d* and the terminal block 24*c* are electrically connected, after the connection terminals 5*c* and 5*d* are elastically deformed to be brought into surface contact with the terminal block 24*c*, the fixing screws 5*o* are screwed in the terminal block 24*c* from the connection terminals 5*c* and 5*d* side through the long holes 5*e* formed in the connection terminals 5*c* and 5*d*, whereby the connection terminals 5*c* and 5*d* and the terminal block 24*c* are connected. Since the long holes 5*e* are formed in the connection terminals 5*c* and 5*d*, it is possible to absorb fluctuation at the time of manufacturing of the connection terminals 5*c* and 5*d* and the terminal block 24*c*. Therefore, it is possible to realize a further reduction in manufacturing cost.

The connection terminals 5*c* and 5*d* having the flexible structure is formed in an L-shaped structure in which the first elastic plate sections 5*p* and the second elastic plate sections 5*r* elastically deform when the second elastic plate sections 5*r* are moved to the terminal block 24*c* side. Even if a gap is present between the connection terminals 5*c* and 5*d* and the terminal block 24*c*, the connection terminals 5*c* and 5*d* can elastically deform to the terminal block 24*c* side, absorb the gap, and come into contact with each other and is electrically connected. Therefore, it is possible to ease residual stress at the time of connection of the connection terminals 5*c* and 5*d* and the terminal block 24*c* and it is possible to realize extension of the durable life of the connection terminals 5*c* and 5*d* and the terminal block 24*c*.

When the electric motor 5 is mounted on the reduction gear box 4, the electric motor 5 is mounted while being rotated in the circumferential direction. However, since the connection terminals 5*c* and 5*d* of the electric motor 5 do not project forward from the flange surface 5*b*1 of the attachment flange 5*b*, the terminal block 24*c* of the control unit 19 and the peripheral portion thereof are not damaged by the connection terminals 5*c* and 5*d*. It is possible to easily assemble the electric motor 5 to the reduction gear box 4.

The terminal block 24*c* formed in the synthetic resin frame 24 and the connection terminals 5*c* and 5*d* of the electric motor 5 are firmly attached via the fixing screws 5*o*. Therefore, it is possible to minimize the electric connection length between the control unit 19 and the electric motor 5, minimize wiring resistance, control a power loss, and reduce mixing of electric noise. Since it is unnecessary to provide a motor harness between the electric motor 5 and the control unit 19, noise radiated from motor harnesses is reduced and it is possible to reduce the influence on radio noise.

In the fifth embodiment, the case in which the connection terminals 5*c* and 5*d* are provided in the electric motor 5 and the terminal block 24*c* is provided in the control unit 19 is explained. However, the present invention is not limited to this. A terminal block may be provided in the electric motor 5 and connection terminals may be provided in the control unit 19.

In the fifth embodiment, the case in which the electric motor 5, the control unit 19, the power supply connector 24*d*, and the signal connector 24*e* are linearly arranged along the line orthogonal to the center axis of the steering column 3 is explained. However, the present invention is not limited to this. The electric motor 5, the control unit 19, the power supply connector 24*d*, and the signal connector 24*e* may be linearly arranged along a line orthogonal to the center axis of the steering column 3.

In the fifth embodiment, the case in which the brush motor is applied as the electric motor 5 is explained. However, the present invention is not limited to this. A brushless motor may be applied.

Figure 32:
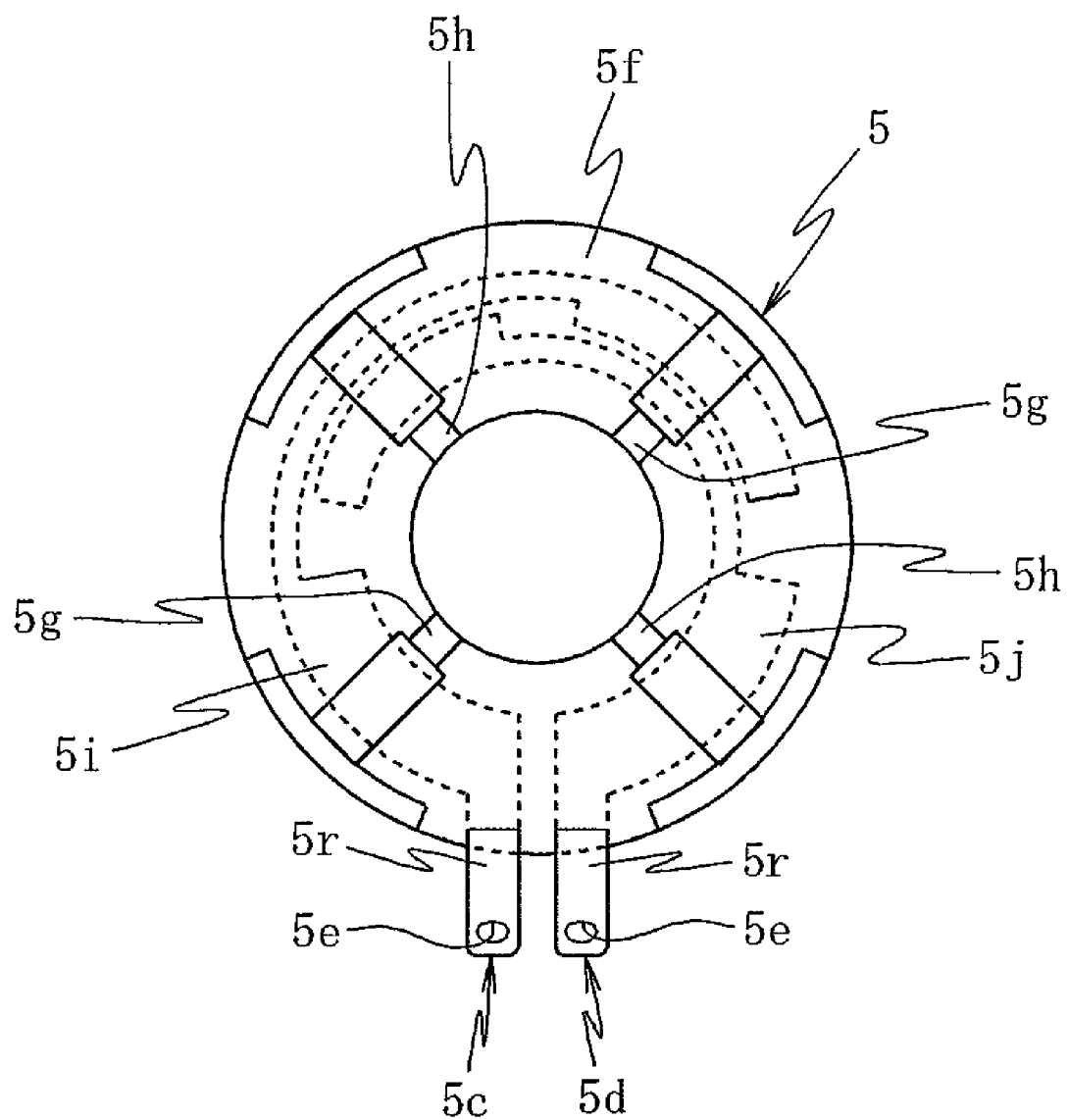
FIG. 32 is a diagram showing another shape of the connection terminal projecting from the electric motor according to the fourth embodiment.

In the explanation with reference to FIGS. 30 and 31A in the fifth embodiment, the long holes 5*e*, the major axis direction of which extends in the longitudinal direction of the second elastic plate sections 5*r*, are formed in the connection terminals 5*c* and 5*d* of the electric motor 5. However, the present invention is not limited to this. As shown in FIG. 32, the long holes, the major axis direction of which extends in a width direction of the second elastic plate sections 5*r*, may be formed in the second elastic plate sections 5*r* of the connection terminals 5*c* and 5*d*.

Next, a sixth embodiment of the present invention is explained with reference to FIGS. 33 to 40.

In this sixth embodiment, a brushless motor is applied as an electric motor.

Figure 33:
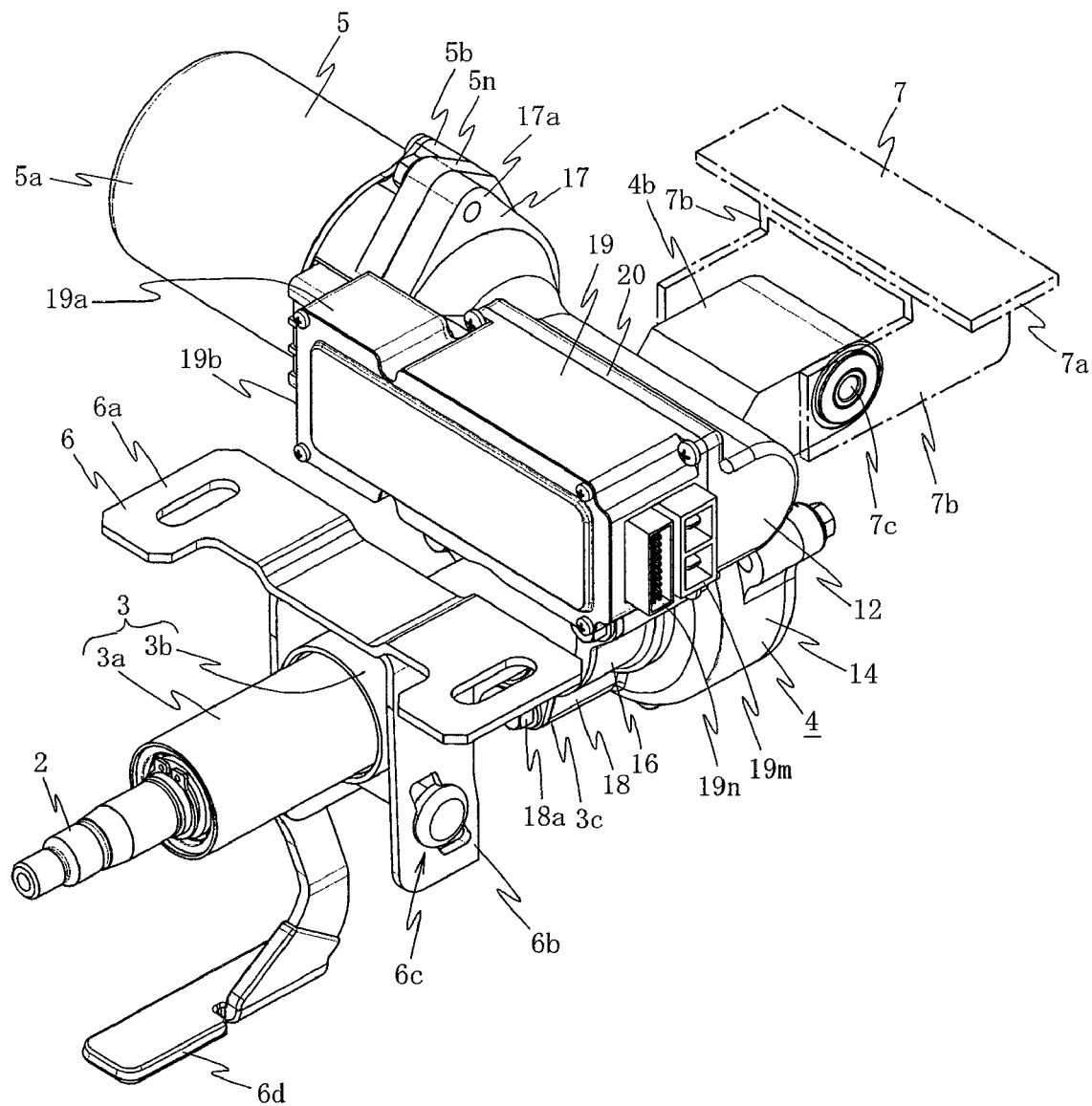
FIG. 33 is a perspective view showing a fifth embodiment of the present invention.
Figure 34:
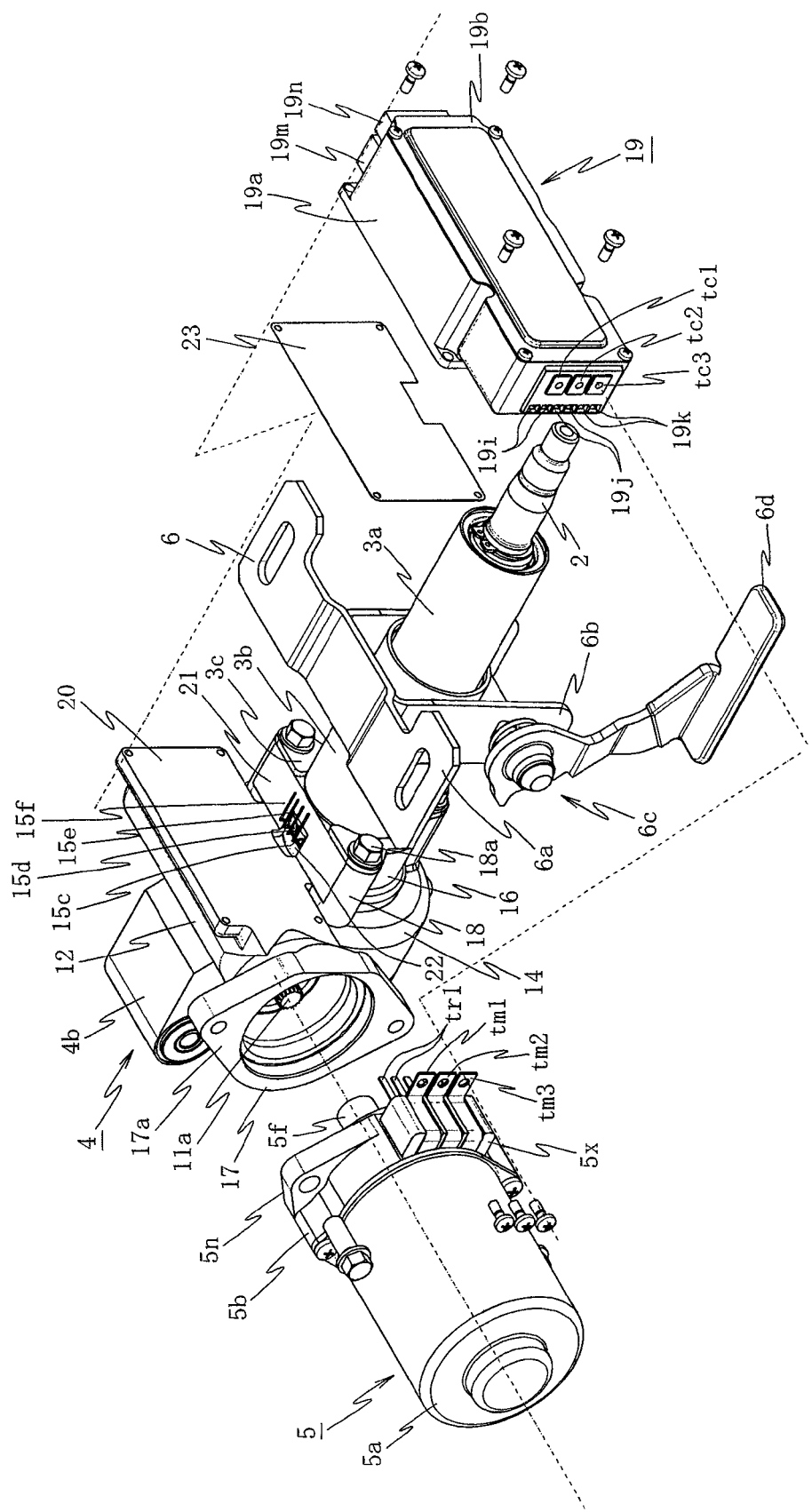
FIG. 34 is a disassembled perspective view of FIG. 33.
Figure 35:
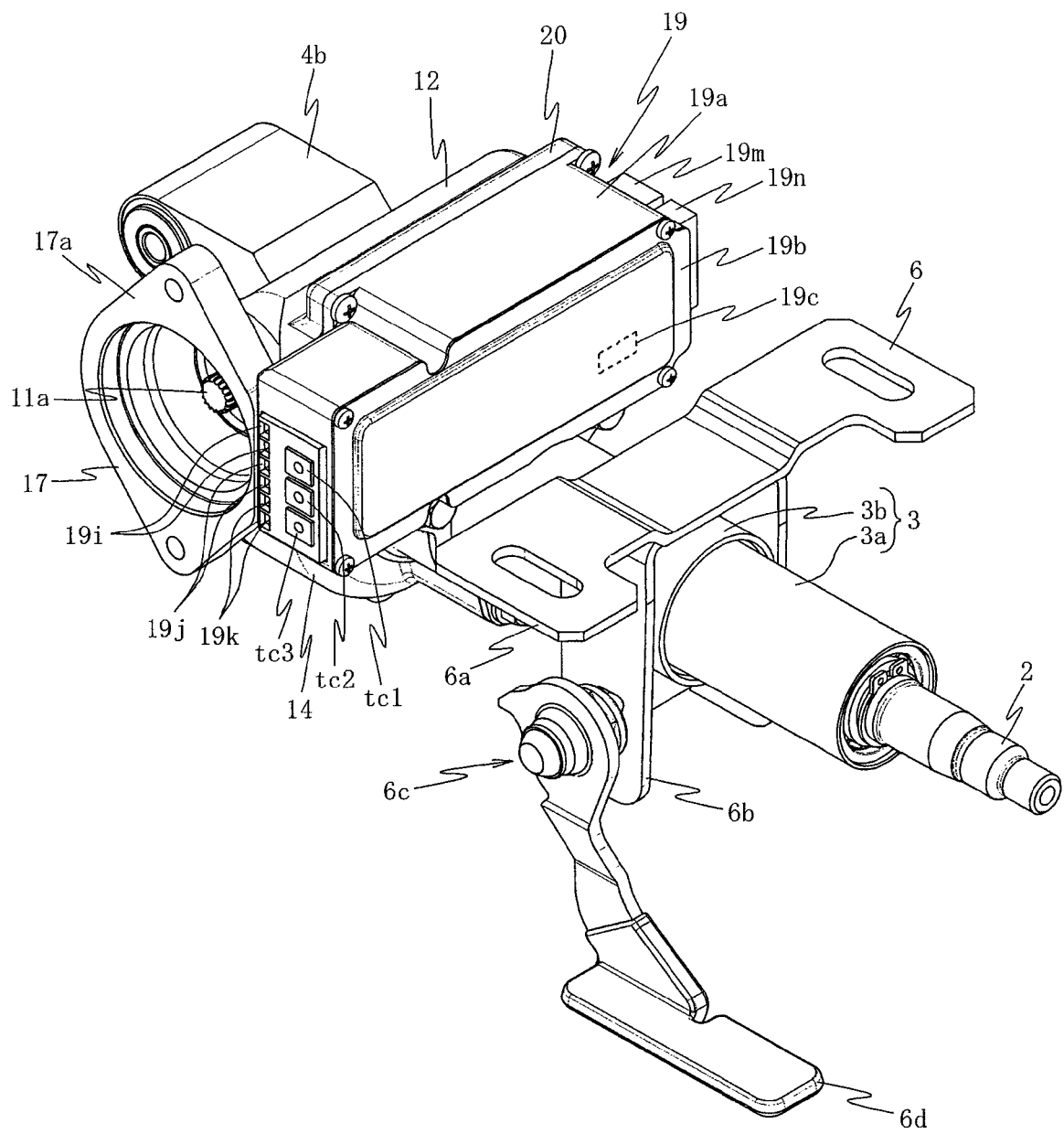
FIG. 35 is a perspective view showing a state in which the electric motor is removed.
Figure 36:
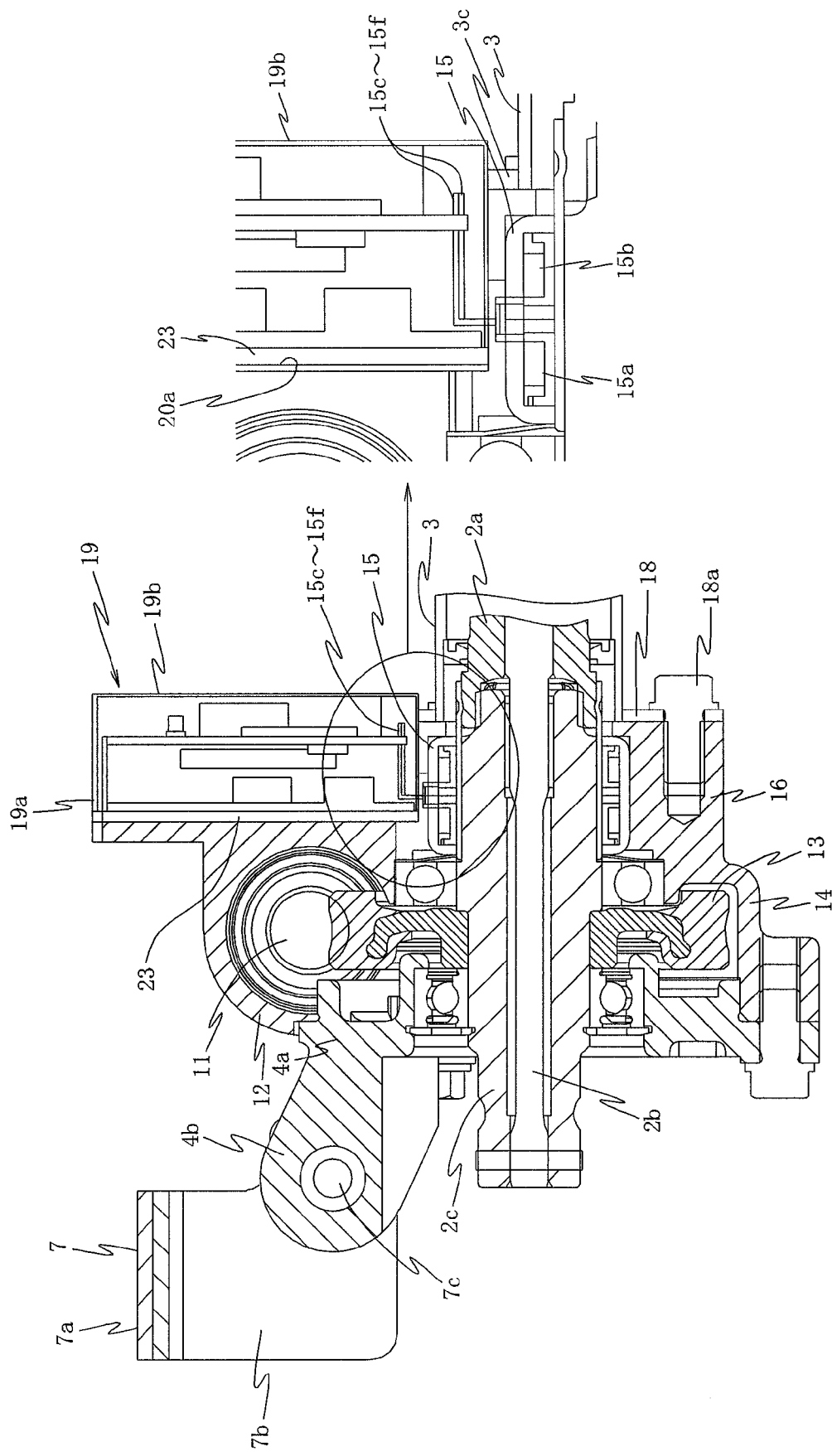
FIG. 36 is a longitudinal sectional view of a reduction gear box.
Figure 37:
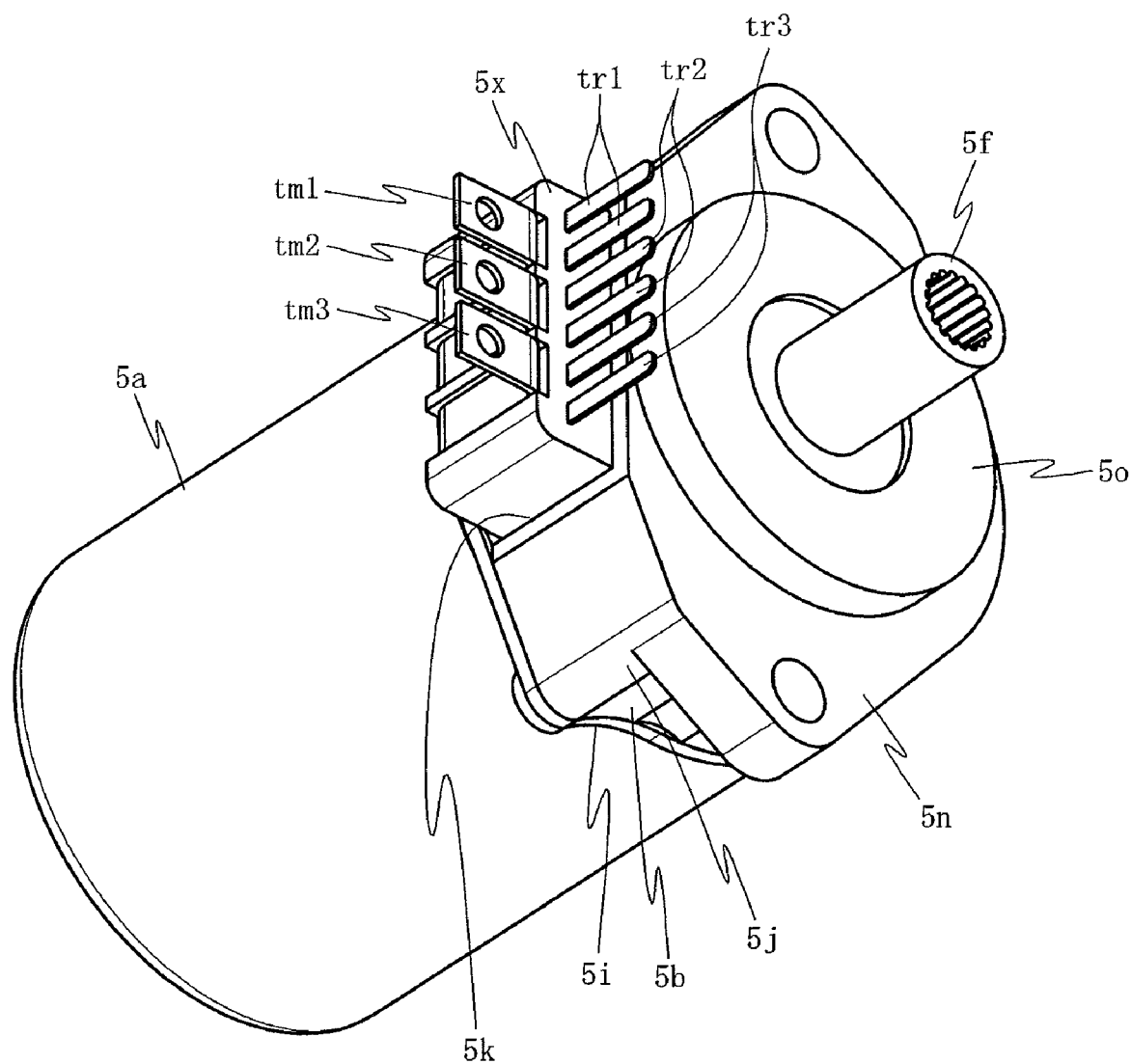
FIG. 37 is a perspective view showing the electric motor.
Figure 38:
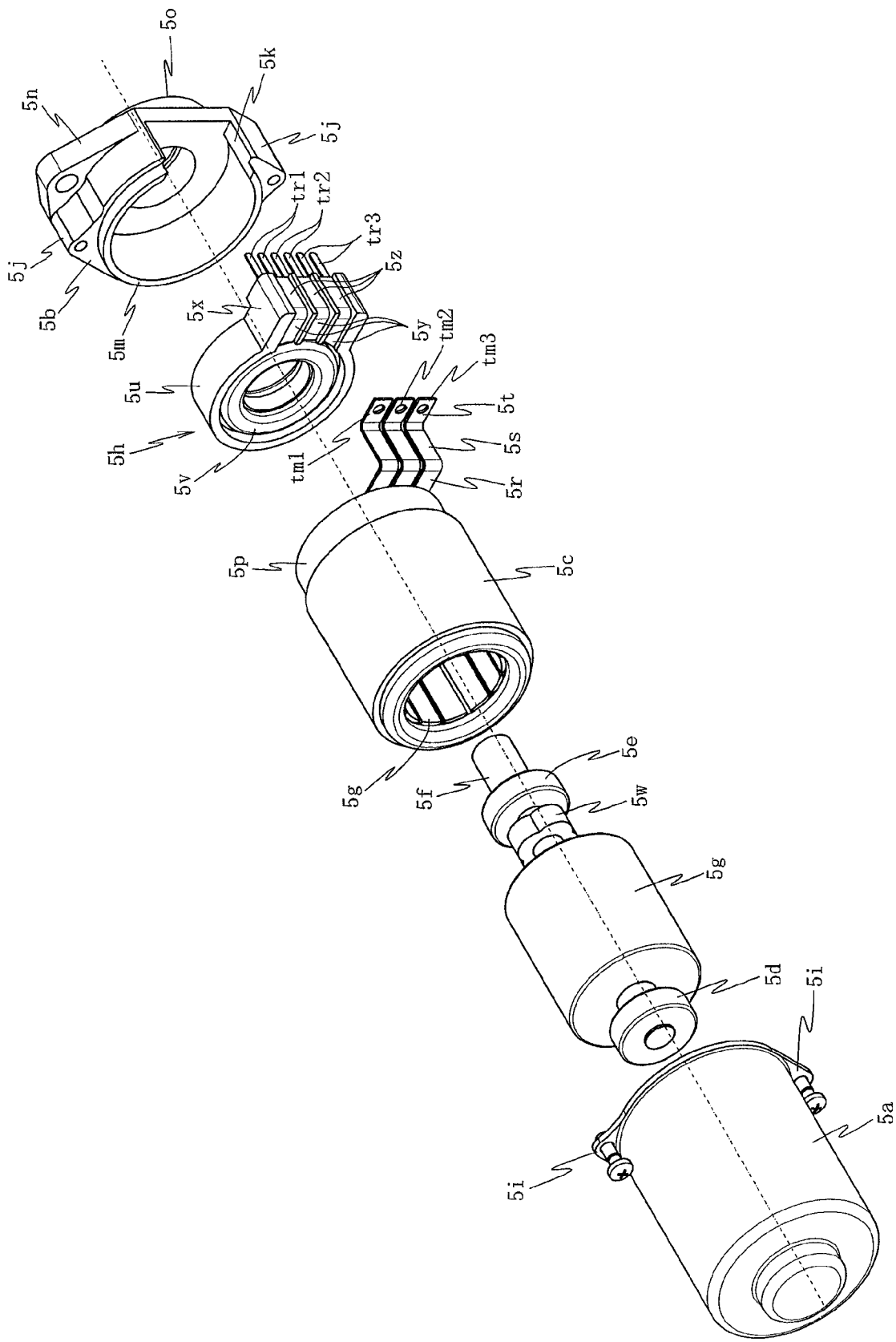
FIG. 38 is a disassembled perspective view of the electric motor.
Figure 39A:
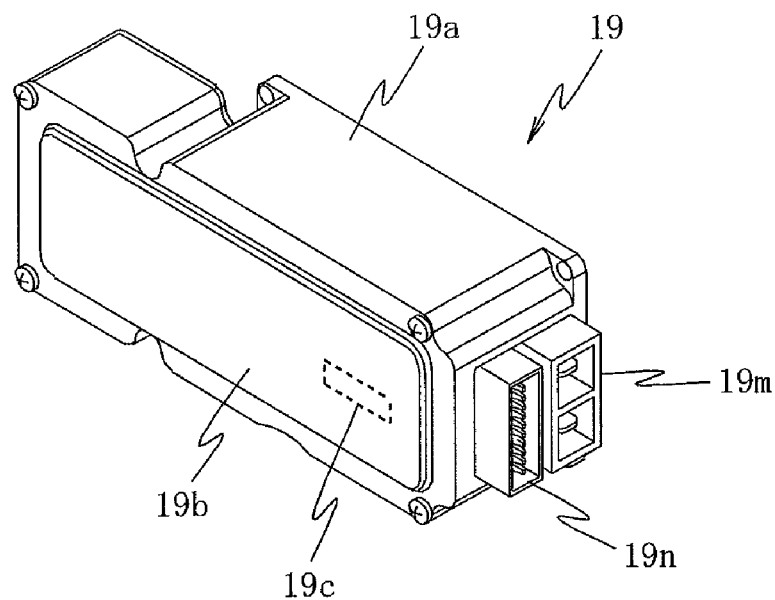
Figure 39B:
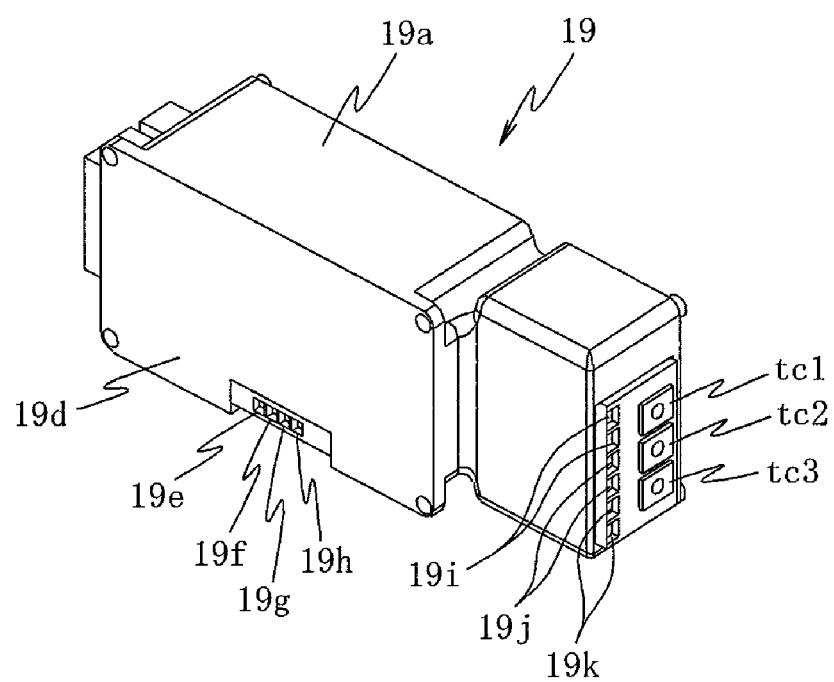

In the sixth embodiment, FIG. 33 is a perspective view showing a fifth embodiment of the present invention. FIG. 34 is a disassembled perspective view of FIG. 33. FIG. 35 is a perspective view of a state in which the electric motor shown in FIG. 33 is removed. FIG. 36 is a longitudinal sectional view of a reduction gear box. FIG. 37 is a perspective view of the electric motor. FIG. 38 is a disassembled perspective view of the electric motor. FIG. 39 is a perspective view of the control unit.

In FIG. 33, reference numeral 1 denotes a column-assist-type electric power steering apparatus. The reduction gear box 4 is coupled to the steering column 3 in which the steering shaft 2 coupled to the steering wheel (not shown) is inserted rotatably. In this reduction gear box 4, the electric motor 5 including the brush motor, the axial direction of which is extended in the direction orthogonal to the axial direction of the steering column 3, is disposed.

The steering column 3 has, in the coupling section with the reduction gear box 4, the double tube structure including the inner tube 3*a* and the outer tube 3*b* for absorbing impact energy at the time of collapse and securing a predetermined collapse stroke. The outer tube 3*b* of the steering column 3 and the reduction gear box 4 are attached to the vehicle body side by the upper attachment bracket 6 and the lower attachment bracket 7.

The lower attachment bracket 7 is formed by the attachment plate section 7*a* attached to the vehicle body side member (not shown) and the pair of supporting plate sections 7*b* that extend in parallel while keeping a predetermined space with respect to the lower surface of this attachment plate section 7*a*. The distal end of the supporting plate section 7*b* is pivotally coupled to, via the pivot 7*c*, the supporting section 4*b* integrally formed in the cover 4*a* disposed on the lower end side of the reduction gear box 4, i.e., the vehicle front side.

The upper attachment bracket 6 includes the attachment plate section 6*a* attached to the vehicle body side member (not shown), the square frame-shaped supporting section 6*b* formed integrally with this attachment plate section 6a, and the tilt mechanism 6c, which supports the outer tube 3b of the steering column 3, formed in this square frame-shaped supporting section 6b.

The tilt mechanism 6c can adjusts a tilt position of the steering column 3 up and down around the pivot 7c of the lower attachment bracket 7 by pivoting the tilt lever 6d to release a supporting state of the tilt lever 6d.

Moreover, as shown in FIG. 36, the steering shaft 2 includes the input shaft 2a, the upper end of which is coupled to the steering wheel (not shown), and the output shaft 2c that is coupled to the lower end of this input shaft 2a via the torsion bar 2b and covers the torsion bar 2b.

Furthermore, as shown in FIGS. 34 to 36, the reduction gear box 4 is formed by, for example, die-casting a material having high heat conductivity, for example, any one of aluminum, an aluminum alloy, magnesium, and a magnesium alloy. This reduction gear box 4 includes the worm housing unit 12 that houses the worm 11 coupled to an output shaft 5f of the electric motor 5, the worm-wheel housing unit 14 that is provided on the lower side of this worm housing unit 12, has the center axis orthogonal to the center axis of the worm housing unit 12, and houses the worm wheel 13 that meshes with the worm 11, the torque-sensor housing unit 16 that is integrally and coaxially coupled to the rear side of this worm-wheel housing unit 14 and houses the torque sensor 15, the motor mounting section 17 that is formed in the open end face of the worm housing unit 12 and to which the electric motor 5 is attached, the column attaching section 18 that is formed in the end face of the torque-sensor housing unit 16 and to which the attachment flange 3c formed at the front end of the steering column 3 is attached, and the control-unit mounting section 20 that is formed in the plane orthogonal to the center axis of the worm-wheel housing unit 14 and the torque-sensor housing unit 16 across a part of the worm housing unit 12 and the worm-wheel housing unit 14 and to which the control unit (ECU) 19 is mounted. The control-unit mounting section 20 is cut in a plane shape in order to improve adhesion with the control unit 19.

The reduction gear box 4 is fixed to the steering column 3 by the bolt 18a in a state in which the attachment flange 3c of the steering column 3 is brought into contact with the column attaching section 18.

As shown in FIG. 36, the torque sensor 15 is configured to magnetically detect a twist state of the input shaft 2a and the output shaft 2c of the steering shaft 2 and detect steering torque transmitted to the steering shaft with the pair of detection coils 15a and 15b.

The external connection terminals 15c, 15d, 15e, and 15f, which project to the outside in parallel to the direction orthogonal to the center axis of the steering column 3, are connected to starts and ends of winding of these pair of detection coils 15a and 15b, respectively. The projecting portions of these external connection terminals 15c to 15f are bent, in the center thereof, in parallel to the center axis of the steering column 3 and formed in an L shape and, as shown in FIG. 34, projected upward from an opening 22 formed in a guide surface 21 for guiding a lower surface of the control unit 19 formed perpendicular to the control-unit mounting section 20.

As shown in FIGS. 37 and 38, the electric motor 5 includes a frame 5a of a bottomed cylindrical shape opened at a front end, a coupling section 5b that covers the front end of this frame 5a and is mounted on the reduction gear box 4, a motor stator 5c disposed in the frame 5a, an output shaft 5f that is inserted through this motor stator 5c and rotatably supported by a front side bearing 5e fixed to a rear side bearing 5d and the coupling section 5b fixed to a bottom of the frame 5a, a motor rotor 5g of a surface magnet type that is fixed to a position opposed to the motor stator 5c of this output shaft 5f and on a surface of which a permanent magnet is formed, and a resolver 5h as a rotor rotation angle detector that detects a rotation angle of a rotor disposed in a position opposed to the coupling section 5b of this motor rotor 5g.

In the frame 5a, as shown in FIG. 38, flange sections 5i are formed in positions 180 degrees apart from each other on an outer peripheral surface on the opened end side.

In the coupling section 5b, as shown in FIG. 38, flange attaching sections 5j are formed in positions opposed to the flange sections 5i. An opening 5k for exposing an electric contact described later to the outside is formed on an outer peripheral surface in a middle position between the flange attaching sections 5j. An inro section 5m inro-connected to the frame 5a is formed on an end face on the frame 5a side. An attachment flange 5n mounted on the motor mounting section 17 of the reduction gear box 4 is formed in a position on the opposite side of this inro section 5m and shifted in a circumferential direction from the flange attaching sections 5j. An inro section 5o inro-connected to the motor mounting section 17 is formed on an inner side of this attachment flange 5n.

Moreover, in the motor stator 5c, a stator 5q is disposed in an insulating case 5p of a cylindrical shape and motor terminals tm1 to tm3 as electric contacts for external connection insert-molded with resin together with a bus bar 5p of a substantial annular shape connected to a terminal end of a three-phase coil wound around the stator 5q are disposed.

These motor terminals tm1 to tm3 include projecting sections 5r that project from a front end surface of the bus bar 5p of the motor stator 5c in a radial direction orthogonal to the center axis of the electric motor 5, extending sections 5s that extend from upper ends of the projecting sections 5r forward in parallel to the center axis of the electric motor 5, and terminal sections 5t that extend from front ends of the extending sections 5s in a direction same as the direction of the projecting sections 5r.

Moreover, the rear side bearing 5d and the front side bearing 5e include deep-slot ball bearings. A fixed wheel of the rear side bearing 5d is fit in an inner diameter section of a projection formed in the bottom section of the frame 5a. A not-shown wave washer is inserted in an axial direction of the fixed wheel between a bottom section of the projection and an end face of the fixed wheel in the rear side bearing 5d to give an axial direction preload. On the other hand, a fixed wheel of the front side bearing 5e is fit in the coupling section 5b and fixed by a not-shown collar in an axial direction thereof.

Moreover, the resolver 5h has a resolver stator 5v fixed on an inner peripheral surface of a resolver case 5u fixed in the coupling section 5b and a resolver rotor 5w fixed to the output shaft 5f inserted through this resolver stator 5v.

When an excitation signal $f(t)=A \cdot \sin(\omega t)$ of a sine wave is inputted from an external signal processing circuit, the resolver stator 5v outputs resolver signals $Ys(=k \cdot \sin(\theta) \cdot f(t))$ and $Yc(=k \cdot \sin(\theta) \cdot f(t))$ of a sine wave and a cosine wave corresponding to a rotation angle θ of the rotor.

Therefore, the resolver stator 5v includes resolver terminals tr1, tr2, and tr3 each including a pair of an excitation signal input terminal and a resolver signal output terminal for inputting and outputting these excitation signal f(t) and resolver signals Ys and Yc. These resolver terminals tr1 to tr3 are projected forward in parallel to the center axis of the output shaft 5f of the electric motor 5, i.e., in a vertical direction with respect to an end face of the coupling section 5b from a projecting section 5x that is formed on an outer peripheral surface of the resolver case 5u, extends in a radial direction, and projects outward from the opening 5k formed in the coupling section 5b.

On the other hand, in the projecting section 5x, engaging grooves 5y with which the projecting sections 5r of the motor terminals tm1 to tm3 of the motor stator 5c engage are formed in a rear end face and engaging grooves 5z with which the extending sections 5s of the motor terminals tm1 to tm3 engage are formed in a front end face.

In a state in which the motor stator 5c, the rear side bearing 5d, the front side bearing 5e, the output shaft 5f, the motor rotor 5g, and the resolver 5h are mounted in the frame 5a and the coupling section 5b, the flange section 5i of the frame 5a is screwed to the flange attaching section 5j of the coupling section 5b, whereby the electric motor 5 can be assembled as shown in FIG. 37.

In this case, the resolver 5h is housed in the coupling section 5b in a state in which the projecting section 5x of the resolver case 5u is projected outward from the opening 5k. The motor stator 5c is fit in the frame 5a such that the projecting section 5x of this resolver case 5u and the motor terminals tm1 to tm3 are opposed to each other. Consequently, when the coupling section 5b is inro-connected to the frame 5a, the frame 5a and the coupling section 5b are integrated in a state in which the projecting sections 5r of the motor terminals tm1 to tm3 of the motor stator 5c are engaged with the engaging grooves 5y formed in the projecting section 5x of the resolver case 5u and the extending sections 5s are engaged with the engaging grooves 5z.

In this state, the length of the extending sections 5s is set such that the terminal sections 5d of the motor terminals tm1 to tm3 are flush with end faces of the projecting sections 5x that are slightly on a rear side than an end face of the attachment flange 5n.

By configuring the electric motor 5 with such a component array, deviation in axial direction positions of the resolver stator 5v and the resolver rotor 5w due to an assembly error, accuracy of respective components, a difference in a coefficient of linear expansion, and the like is controlled to prevent detection accuracy from falling.

A female spline is formed on an end face projecting from a coupling section of the output shaft 5f of the electric motor 5. When the electric motor 5 is assembled to the reduction gear box 4, a shaft coupling can be formed by simply fitting this female spline in a male spline formed in the worm shaft 11a to which the worm 11 is attached. Therefore, since man-hours are few and reliability is high, the female spline is suitably used in an electric power steering apparatus.

However, the fitting of the splines cannot be performed unless phases of crests and troughs thereof do not match. In assembling the electric motor 5, it is necessary to press the coupling section 5b against the worm shaft 11a while arbitrarily rotating the coupling section 5b in the circumferential direction until the phases of the splines match, at a point when the splines can be fit even a little, rotate the coupling section 5b such that a through hole of the coupling section 5b and a tap hole of the motor mounting section 17 match, and, then, push in the coupling section 5b until the end face of the coupling section 5b and an end face of the motor mounting section 17 come into contact with each other.

When the resolver terminals tr1 to tr3 are inserted in spring contact terminals 19i to 19k of the control unit 19 described later, the splines have to be prevented from coming off each other. Therefore, in this embodiment, the fitting length of the splines is set larger than the projection length from the end face of the coupling section 5b in the resolver terminals tr1 to tr3.

Consequently, it is possible to rotate the coupling section 5b in a state in which the splines are shallowly fit and match phases of the resolver terminals tr1 to tr3 and insertion ports of the spring contact terminals 19i to 19k. It is possible to omit a wire harness for signal transmission between the resolver terminals tr1 to tr3 and the spring contact terminals 19i to 19k while using the splines as shaft couplings.

As shown in FIG. 39, the control unit 19 includes a housing 19a of a substantial rectangular parallelepiped shape that is installed by laminating a power board, a control board, and the like, mounted on the control-unit mounting section 20 of the reduction gear box 4, formed by casting a conductive material such as aluminum having satisfactory thermal conductivity, and opened on the opposite side of the control-unit mounting section 20 and a lid member 19b that closes an opened end face of this housing 19a. Although not shown in the FIG., a washer is provided between the housing 19a and the lid member 19b to improve dust-proof and drip-proof properties. An adjustment window 19c is provided in the lid member 19b to make it possible to configure a torque sensor signal processing circuit of a circuit board shape without removing the lid member 19b. As shown in FIG. 35, in a state before the electric motor 5 is assembled to the reduction gear box 4, when the control unit 19 is assembled to the reduction gear box 4, it is possible to accurately adjust the torque sensor signal circuit without being affected by the electric motor by performing calibration of the torque sensor signal circuit. The adjustment window 19c is sealed by a not-shown sealing sticker after the calibration of the torque sensor signal processing circuit.

At a lower end of a bearing surface 19d mounted on the control-unit mounting section 20 of the housing 19a, spring contact terminals 19e to 19h that hold the external connection terminals 15c to 15f of the torque sensor 15 with a spring force when the external connection terminals 15c to 15f are inserted are disposed. On an end face on a side opposed to the electric motor 5, screwing terminals tc1 to tc3 that come into contact with the motor terminals tm1 to tm3 and spring contact terminals 19i to 19k that hold the resolver terminals tr1 to tr3 of the resolver 5h with a spring force when the resolver terminals tr1 to tr3 are inserted are disposed.

On an end face on the opposite side of the end face of the housing 19a on which the screwing terminals tc1 to tc3 and the spring contact terminals 19i to 19k are disposed, a power supply terminal 19m and an ECU connection terminal 19n connected to a control device (ECU) on the vehicle body side by, for example, CAN (Controller Area Network) communication are disposed.

As shown in FIG. 34, in a state in which the bearing surface 19d is set as the control-unit mounting section 20 side and a heat transmission sheet 23 having high thermal conductivity and having a cutout in a position opposed to the spring contact terminals 19e to 19h is set in contact with the bearing surface 19d, the control unit 19 is mounted on the control-unit mounting section 20 of the reduction gear box 4 while a lower surface of the housing 19a is brought into contact with a guide surface 22 from the vertical direction with respect to the control-unit mounting section 20. Consequently, the external connection terminals 15c to 15f of the torque sensor 15 are inserted into the spring contact terminals 19e to 19h and held by a spring force.

In this state, the mounting of the control unit 19 on the control-unit mounting section 20 is completed as shown in FIG. 35 by screwing the housing 19a and the control-unit mounting section 20.

In this way, simply mounting the control unit 19 on the control-unit mounting section 20 of the reduction gear box 4 from the vertical direction, it is possible to complete electric connection of the external connection terminals 15c to 15f of the torque sensor and the spring contact terminals 19e to 19h and it is possible to assemble the control unit 19 to the reduction gear box 4 without removing the lid member 19b of the control unit 19. Therefore, it is possible to reduce man-hours and omit a wire harness for transmitting a torque sensor signal as well.

As shown in FIG. 35, in a state in which the control unit 19 is assembled to the control-unit mounting section 20 of the reduction gear box 4, the screwing terminals tc1 to tc3 and the spring contact terminals 19i to 19k formed in the housing 19a are parallel to the motor mounting section 17 of the reduction gear box 4 and slightly project from the motor mounting section 17.

In this assembled state of the control unit 19, as shown in FIG. 34, the axis of the worm shaft 11a and the axis of the electric motor 5 are matched in the motor mounting section 17 of the reduction gear box 4 and the motor terminals tm1 to tm3 and the resolver terminals tr1 to tr4 are mounted to be opposed to the screwing terminals tc1 to tc3 and the spring contact terminals 19i to 19k, respectively. Consequently, the terminal sections 5t of the motor terminals tm1 to tm3 come into contact with the screwing terminals tc1 to tc3 and the resolver terminals tr1 to tr3 are inserted and held in the spring contact terminals 19i to 19k.

In this state, the motor mounting section 17 and the attachment flange 5n in the coupling section 5b of the electric motor 5 are bolted and the motor terminals tm1 to tm3 are screwed to the screwing terminals tc1 to tc3. Consequently, as shown in FIG. 33, the assembly of the electric motor 5 to the reduction gear box 4 is completed.

In this way, simply by mounting the electric motor 5 on the motor mounting section 17 of the reduction gear box 4 from a vertical direction with respect to the mounting surface of the motor mounting section 17, it is possible to directly connect the motor terminals tm1 to tm3 and the screwing terminals tc1 to tc3 without the intervention of a wire harness, and the motor terminals tm1 to tm3 and the screwing terminals tc1 to tc3 are firmly and surely connected by a spring axial force and electrically connected. Therefore, it is possible to reduce a wiring loss and control fluctuation in contact resistance.

The motor terminals tm1 to tm2 are folded at plural stages from the projecting sections 5r, the extending sections 5s, and the terminal sections 5t. Therefore, it is possible to prevent excessive stress from being applied to the connection sections of the screwing terminals tc1 to tc3 of the control unit 19, the motor terminals tm1 to tm3, and the bus bar 5p because of an assembly error of the electric motor 5 and the control unit 19, accuracy of the respective components, a difference in a coefficient of linear expansion, and the like.

Moreover, the motor terminals tm1 to tm3 are arranged on the coupling section 5b side together with a bus bar of a substantial annular shape that connects a terminal end of a motor coil wound around the motor stator 5c. Therefore, it is possible to reduce the length of the motor terminals tm1 to tm3 and reduce a wiring loss.

Simultaneously with this, it is possible to insert and hold the resolver terminals tr1 to tr3 in the spring contact terminals 19i to 19k. It is possible to directly connect the resolver terminals tr1 to tr3 and the spring contact terminals 19i to 19k without the intervention of a wire harness.

Next, an assembling operation according to the embodiment is explained.

First, in assembling the electric power steering apparatus 1, the torque sensor 15 is fixedly arranged in the torque-sensor housing unit 16 of the reduction gear box 4 such that the distal ends of the external connection terminals 15c to 15f extend to the rear of the vehicle body along the guide surface 22.

Subsequently, the control unit 19 is mounted on the control-unit mounting section 20 of the reduction gear box 4. This mounting of the control unit 19 is performed by mounting, in a state in which the bearing surface 19d is set on the control-unit mounting section 20 side and the heat transmission sheet 23 having high thermal conductivity is set in contact with this bearing surface 19d, the control unit 19 on the control-unit mounting section 20 of the reduction gear box 4 from the vertical direction thereof while bringing a lower surface of the housing 19a into contact with the guide surface 22 from the vertical direction with respect to the control-unit mounting section 20. By assembling the control unit 19 to the control-unit mounting section 20 of the reduction gear box 4 from the vertical direction in this way, it is possible to easily hold the heat transmission sheet for improving thermal conductivity between the control unit 19 and the control-unit mounting section 20.

When the control unit 19 is mounted on the control-unit mounting section 20 of the reduction gear box 4, simultaneously with this mounting, the external connection terminals 15c to 15f of the torque sensor 15 are inserted into the spent contact terminals 19e to 19h of the control unit 19 and held by a spring force. Therefore, it is unnecessary to interpose a wire harness between the external connection terminals 15c to 15f of the torque sensor 15 and the spring contact terminals 19e to 19h and it is possible to surely perform electric connection.

In this case, the torque sensor 15 includes only a torque detection element and is installed in the reduction gear box 4. The signal processing circuit of the torque sensor 15 is incorporated in the control unit 19. Therefore, it is possible to easily perform calibration of this signal processing circuit from the adjustment window 19c of the lid member 19b. Moreover, it is possible to perform the calibration of the signal processing circuit before assembling the electric motor to the reduction gear box 4. Therefore, it is possible to perform accurate calibration without being affected by the electric motor 5.

Moreover, the external connection terminals 15c to 15f of the torque sensor 15 are bent in an L shape. Therefore, it is possible to prevent excess stress from being applied to the junctions of the spring contact terminals 19e to 19h of the control unit 19, the external connection terminals 15c to 15f of the torque sensor 15, and the torque sensor 15 because of an assembly error of the torque sensor 15 and the control unit 19, accuracy of the respective components, a difference in a coefficient of linear expansion, and the like and it is possible to improve durability.

Thereafter, as described above, the electric motor 5 assembled in a state shown in FIG. 37 is brought close to the motor mounting section 17 adjacent to the control unit 19 of the reduction gear box 4 from the vertical direction with respect to the end face of the motor mounting section 17 in a state in which the center axis of the worm shaft 11a and the center axis of the electric motor 5 are matched and the motor terminals tm1 to tm3 and the resolver terminals tr1 to tr3 are generally opposed to the screwing terminals tc1 to tc3 and the spring contact terminals 19i to 19k of the control unit 19.

In this case, first, the female spline formed at the distal end of the output shaft 5f and the male spline formed in the worm shaft 11a come into contact with each other. The female spline and the male spline are fit in by predetermined length while the electric motor 5 is rotated to match phases of the splines. In this state, the motor terminals tm1 to tm3 and the resolver terminals tr1 to tr3 are opposed to the screwing terminals tc1 to tc3 and the spring contact terminals 19i to 19k of the control unit 19 and the attachment flange 5*n* of the coupling section 5*b* and the flange section of the motor mounting section 17 are opposed to each other to push in the electric motor, whereby the inro section 5*o* of the coupling section 5*b* of the electric motor 5 is inro-connected to the motor mounting section 17 and the end face of the coupling section 5*b* and the end face of the motor mounting section 17 are brought into contact with each other.

In this state, first, the resolver terminals tr1 to tr3 are inserted into the insertion ports of the spring contact terminals 19*i* to 19*k*. Subsequently, the terminal sections 5*t* of the motor terminals tm1 to tm3 come into contact with the screwing terminals tc1 to tc3 of the control unit 19.

In this state, the attachment flange 5*n* of the coupling section 5*b* and the flange section 17*a* of the motor mounting section 17 are bolted and the terminal sections 5*t* of the motor terminals tm1 to tm3 and the screwing terminals tc1 to tc3 of the control unit 19 are screwed.

In this way, simply by mounting the electric motor 5 on the motor mounting section 17 of the reduction gear box 4 from the vertical direction with respect to the end face thereof, the motor terminals tm1 to tm3 are brought into contact with the screwing terminals tc1 to tc3 of the control unit 19 and the resolver terminals tr1 to tr3 are inserted into the spring contact terminals 19*i* to 19*k* of the control unit to electrically connect the resolver terminals tr1 to tr3 and the spring contact terminals 19*i* to 19*k*. Therefore, it is possible to reduce man-hours for connection of these components.

In this case, the motor terminals tm1 to tm3 and the screwing terminals tc1 to tc3 are combined by screwing. Therefore, it is possible to firmly and surely combine both the terminals and control fluctuation in contact resistance and it is possible to surely combine the resolver terminals tr1 to tr3 and the spring contact terminals 19*i* to 19*k* with a spring force. Moreover, since both the terminals are electrically connected directly without the intervention of a wire harness, it is possible to reduce a wiring loss and realize a reduction in cost.

Since the brushless motor is applied as the electric motor 5, there is no loss due to contact resistance of the brush. In conjunction with the omission of the wire harness for motor energization, it is possible to apply the electric power steering apparatus to a large car that needs a large steering assisting thrust that cannot be obtained only by a method of reducing one of the wiring loss and the loss due to contact resistance. When the electric power steering apparatus is not applied to a large car but applied to medium and small cars, since the loss is small, it is possible to further reduce sizes of the electric motor 5 and the control unit than those in the present situation.

Moreover, the control unit 19 is directly mounted on the reduction gear box 4 that has a large heat capacity and a large surface area and is less likely to be a heat generation source. Therefore, it is possible to efficiently transmit heat generated by the control unit 19 directly to the reduction gear box 4, form the heat radiation fins provided in the control unit 19 as small as possible or omit the heat radiation fins, and reduce a size and weight of the control unit 19.

Next, a seventh embodiment of the present invention is explained with reference to FIG. 40.

In this seventh embodiment, motor terminals are extended in a vertical direction with respect to an end face of a coupling section in the same manner as resolver terminals.

Figure 40:
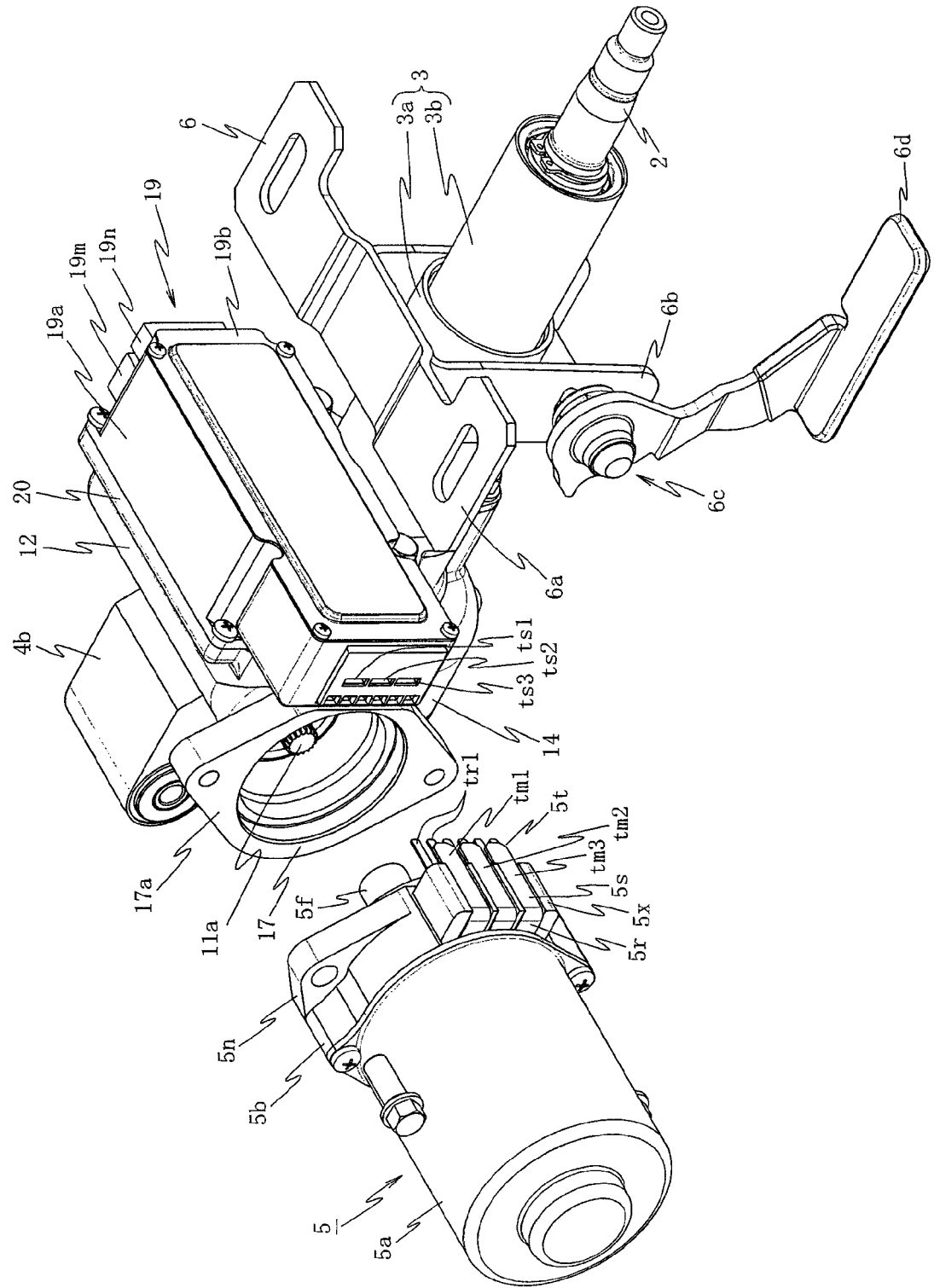
FIG. 40 is a disassembled perspective view showing a sixth embodiment of the present invention before an electric motor is assembled.

As shown in FIG. 40, the seventh embodiment has the structure same as that in the first embodiment except that the terminal sections 5*t* of the motor terminals tm1 to tm3 in the first embodiment are formed on extended lines of the extending sections 5*s*, the motor terminals tm1 to tm3 are extended in the vertical direction with respect to the end face of the coupling section 5*b* in the same manner as the resolver terminals tr1 to tr3, and, according to the extension of the motor terminals tm1 to tm3, the screwing terminals tc1 to tc3 of the control unit 19 are omitted and the spring contact terminals ts1 to ts3 are formed instead of the screwing terminals tc1 to tc3. Components corresponding to those shown in FIGS. 33 to 35 are denoted by the identical reference numerals and signs and detailed explanation of the components is omitted.

According to this seventh embodiment, when the electric motor 5 is mounted on the motor mounting section 17 of the reduction gear box 4 from the vertical direction with respect to the end face thereof, the motor terminals tm1 to tm3 are inserted and held in the spring contact terminals ts1 to ts3 in the same manner as the resolver terminals tr1 to tr3. Therefore, it is possible to omit the process of screwing the motor terminals tm1 to tm3 in the first embodiment. Further, since the structure for enduring reaction of tightening torque in the screwing process is unnecessary, it is possible to realize a further reduction in cost. Moreover, since motor terminals that are inevitably formed thick in order to cope with a large current are not mechanically fixed, it is possible to permit a stress caused by an assembly error, accuracy of respective components, motor heat generation, and the like to escape. Therefore, it is possible to improve reliability.

In the sixth and seventh embodiments, the case in which the present invention is applied to the column-assist-type electric power steering apparatus is explained. However, the present invention is not limited to this. An effect same as that described above is obtained even if the present invention is applied to pinion-assist type and rack-assist type electric power steering apparatuses. In this case, since the electric power steering apparatus is arranged in an engine room, it is advisable to provide a sealing mechanism for water proof and dust proof at a contact of the control unit 19 and the electric motor 5 and a contact of the control unit 19 and the torque sensor.

In the sixth and seventh embodiments, the case in which the screwing terminals and the spring contact terminals are applied as contacts of the motor terminals tm1 to tm3 and the control unit 19 is explained. However, the present invention is not limited to this. The motor terminals tm1 to tm3 and the control unit 19 may be electrically connected by at least one of welding or soldering.

Moreover, in the sixth and seventh embodiments, the case in which the screwing terminals and the spring contact terminals are applied to the motor terminals tm1 to tm3 and only the spring contact terminals are applied to the resolver terminals tr1 to tr3 is explained. However, the screwing terminals and the spring contact terminals may be mixed for each of the motor terminals tm1 to tm3 and the resolver terminals tr1 to tr3.

Furthermore, the screwing terminals and the spring contact terminals may be provided on the electric motor 5 side and the motor terminals tm1 to tm3 and the resolver terminals tr1 to tr3 may be provided on the control unit side.

Furthermore, in the sixth and seventh embodiments, the case in which the motor rotor 5*g* of the surface magnet type is applied as the electric motor 5 is explained. However, the present invention is not limited to this. Brushless motors of other types such as an interior permanent magnet (IPM) brushless motor and an induction motor can be applied.

In the sixth and seventh embodiments, the case in which the female spline is formed in the output shaft 5*f* of the electric motor 5 and the male spline is formed in the worm shaft 11*a* is explained. However, by inverting a relation between these splines, the male spline may be formed in the output shaft 5*f* of the electric motor 5 and the female spline may be formed in the worm shaft 11a. Moreover, serration fitting may be applied instead of the spline fitting.

Moreover, when the electric motor 5 is assembled to the reduction gear box 4, in a state in which the splines shallowly fit in each other, if a jig that can be pulled out in a radial direction of the coupling section 5b is put over the terminals, it is possible to prevent the terminals from being bent in the spline fitting or from being damaged.

Furthermore, in the first and second embodiments, the case in which the control unit 19 is mounted on the control-unit mounting section 20 via the heat transmission sheet 23 is explained. However, the heat transmission sheet 23 may be omitted.

Furthermore, in the sixth and seventh embodiments, the case in which the three-phase brushless motor is applied is explained. However, the present invention is not limited to this. Multi-phase brushless motors having four or more phases may be applied. In this case, the number of motor terminals only has to correspond to the number of phases. Similarly, the resolver 5h may output three-phase resolver signals with phases 120 degrees different from one another. In this case, four pairs of resolver terminals including those for an excitation signal only have to be provided.

In the sixth and seventh embodiments, the case in which the torque sensor 15 includes only the torque detection element and the signal processing circuit thereof is installed in the control unit 19 is explained. However, the present invention is not limited to this. The torque sensor 15 may include the torque detection elements 15a and 15b and the signal processing circuits thereof, the torque detection elements 15a and 15b may be installed in the reduction gear box 4, and a signal processing circuit electrically connected to the torque detection elements 15a and 15b may be disposed. In this case, it is possible to perform calibration of the signal processing circuit in a state of the single reduction gear box 4 and it is possible to perform calibration of the signal processing circuit without being affected by the electric motor. The electric motor 5 is assembled to the reduction gear box 4 in which the calibration of the signal processing circuit of the torque sensor 15 is finished. Thereafter, at a stage when the control unit 19 is assembled, the control unit 19 and the torque detection element can be electrically connected and the control unit 19 and the electric motor 5 can be electrically connected. Therefore, it is possible to easily perform assembly work and it is possible to simplify an assembly process without deteriorating accuracy of the torque sensor.

INDUSTRIAL APPLICABILITY

It is possible to provide an electric power steering apparatus in which, by providing the control unit in the reduction gear box, it is possible to electrically connect the connection terminal of the electric motor to the control unit directly, minimize electric connection length between the control unit and the electric motor to reduce mixing of electric noise, and minimize wiring resistance to reduce an electric loss, and, further, since it is unnecessary to provide a motor harness between the electric motor and the control unit, noise radiated from motor harnesses is reduced and it is possible to reduce the influence on radio noise.

The electric motor and the control unit are provided side by side in the reduction gear box, the motor-side connection section is formed to project in a position near and opposed to the control unit of the electric motor, and the unit-side connection section that is in surface contact with the motor-side connection section is formed in a position near and opposed to the electric motor of the control unit. Therefore, it is possible to provide an electric power steering apparatus in which, it is possible to connect the electric motor and the control unit using the motor side connection end section and the unit-side connection section that are near and in surface contact with each other, minimize electric connection length between the electric motor and the control unit, and minimize wiring resistance and surely prevent electric noise from mixing, it is unnecessary to provide connection terminals having large rigidity, and it is possible to further improve assemblability.

Moreover, the motor side connection terminal does not overlap the control unit side connection terminal before the output shaft of the electric motor fits in the worm shaft of the worm gear mechanism. Therefore, it is possible to provide an electric power steering apparatus in which it is possible to easily perform phasing of the output shaft of the electric motor and the worm shaft of the worm gear mechanism.

Furthermore, since at least one of the motor side connection terminal and the board side connection terminal is formed in the flexible structure, the other is formed in the rigid structure, and one of the connection terminals is elastically deformed to electrically connect both the connection terminals, it is unnecessary to arrange the motor side connection terminal and the board side connection terminal in highly accurate positions and it is also unnecessary to form both the motor side connection terminal and the board side connection terminal in the flexible structure. Therefore, it is possible to provide an electric power steering apparatus in which it is possible to realize a reduction in manufacturing cost.

Furthermore, it is possible to provide an electric power steering apparatus in which, when the brushless motor is applied as the electric motor, no loss is caused by contact resistance of a brush, it is possible to omit a wire harness for motor energization, generate a large steering assisting thrust, and apply the electric power steering apparatus to a large car.

The invention claimed is:

1. An electric power steering apparatus comprising: a steering column having inserted therein a steering shaft to which steering torque is transmitted; a reduction gear box coupled to the steering column; and an electric motor that transmits a steering assisting force to the steering shaft via a reduction mechanism in the reduction gear box, characterized in that
   the electric motor and a control unit including a control board mounted with a control circuit that controls to drive the electric motor are provided side by side in the reduction gear box, and a connection terminal of the electric motor is electrically connected to the control unit directly, and
   the reduction gear box includes at least a worm housing unit that houses a worm coupled to an output shaft of the electric motor, a worm-wheel housing unit that houses a worm wheel coupled to the steering shaft, and a torque-sensor housing unit that is coupled to the work-wheel housing unit to house the torque sensor and coupled to the steering column, and a control-unit mounting section for mounting the control unit is formed in outer peripheral portion of the worm housing unit, the worm-wheel housing unit, and the torque-sensor housing unit.

2. The electric power steering apparatus according to claim 1, wherein a connection terminal of a torque sensor installed in the reduction gear box is electrically connected to the control unit directly.

3. An electric power steering apparatus comprising:
   a steering column having inserted therein a steering shaft to which steering torque is transmitted;
   a reduction gear box coupled to the steering column; and an electric motor that transmits a steering assisting force to the steering column via a reduction mechanism in the reduction gear box, wherein:

the electric motor and a control unit including a control board mounted with a control circuit that controls to drive the electric motor are provided side by side in the reduction gear box, and a connection terminal of the electric motor is electrically connected to the control unit directly, the reduction gear box includes at least a worm housing unit that houses a worm coupled to an output shaft of the electric motor, a worm-wheel housing unit that houses a worm wheel coupled to the steering shaft, and a torque-sensor housing unit that is coupled to the worm-wheel housing unit to house the torque sensor and coupled to the steering column, and a control-unit mounting section for mounting the control unit is formed in an outer peripheral portion of the worm housing unit, the worm-wheel housing unit, and the torque-sensor housing unit, and a distal end of the torque-sensor housing unit is formed as a contraction stopper for the steering column at the time of collapse, and a contraction stopper side end surface position of the control unit mounted on the control-unit mounting section is set further on a worm-wheel housing unit side than the contraction stopper.

4. An electric power steering apparatus comprising:

a steering column having inserted therein a steering shaft to which steering torque is transmitted;

a reduction gear box coupled to the steering column; and an electric motor that transmits a steering assisting force to the steering column via a reduction mechanism in the reduction gear box, wherein:

the electric motor and a control unit including a control board mounted with a control circuit that controls to drive the electric motor are provided side by side in the reduction gear box, and a connection terminal of the electric motor is electrically connected to the control unit directly, and a motor-side connection section is formed in a position near and opposed to the control unit of the electric motor to project in a direction crossing at least an axial direction, and a unit-side connection section that is in surface contact with the motor-side connection section is formed in a position near and opposed to the electric motor of the control unit.

5. The electric power steering apparatus according to claim 4, wherein the motor-side connection section and the unit-side connection section is formed by one of a connection terminal and a terminal block.

6. The electric power steering apparatus according to claim 4, wherein the motor-side connection section is formed integrally with a bus bar that distributes power to a brush or a coil in the inside of the electric motor.

7. The electric power steering apparatus according to claim 4, wherein the motor-side connection section and the unit-side connection section are fixed by a locking tool such as a screw, a bolt, or a rivet in a state in which the connection sections are set in surface contact with each other.

8. The electric power steering apparatus according to claim 4, wherein the motor-side connection section and the unit-side connection section are fixed by welding means such as fusing, spot welding, or TIG welding.

9. The electric power steering according to claim 4, wherein the motor-side connection section and the unit-side connection section are formed by a male terminal and a female terminal that are detachably attachable from a circumferential direction of the electric motor.

10. The electric power steering apparatus according to claim 4, wherein a contact surface of the motor-side connection section and the unit-side connection section is arranged to be a plane identical with an attaching surface to the reduction gear box of the electric motor.

11. The electric power steering apparatus according to claim 4, wherein the motor-side connection section is formed in an L shape in a side view by a plate section along an axial direction of the electric motor and a projecting plate section extending in a radial direction from a distal end of the plate section.

12. The electric power steering apparatus according to claim 4, wherein one of the motor-side connection section and the unit-side connection section is formed by a terminal plate of a reverse L shape with a radial direction plate section extending in the radial direction from an outer peripheral surface of the electric motor and an axial direction plate section extending in parallel to the axial direction from a distal end of the radial direction plate section, and the other of the motor-side connection section and the unit-side connection section is formed by a terminal block having an axial direction contact surface that is in contact with a surface of the axial direction plate section opposed to the outer peripheral surface of the electric motor.

13. The electric power steering apparatus according to claim 12, wherein the electric power steering apparatus has a protective cover that covers the motor-side connection section and the unit-side connection section in a state in which the connection sections are connected, and a height position of the protective cover is selected to be equal to or lower than a height position of the control unit.

14. The electric power steering apparatus according to claim 4, wherein one of the motor-side connection section and the unit-side connection section is formed by plural flexible cables led out from an outer peripheral portion thereof and terminal plate sections attached to distal ends of the respective flexible cables, and the other of the motor-side connection section and the unit-side connection section is formed by a terminal block, a contact surface of which with the terminal plate sections is formed in the axial direction of the electric motor.

15. The electric power steering apparatus according to claim 14, wherein an insulating partition wall that insulates the terminal plate sections adjacent thereto is formed on a contact surface, with which the terminal plate sections are brought into contact, in the terminal block.

16. The electric power steering apparatus according to claim 4, wherein one of the motor-side connection section and the unit-side connection section is formed by a cable guide unit having installed therein plural radial direction plate sections extending in the radial direction of the electric motor, plural flexible cables fastened and fixed to the respective radial direction plate sections of the cable guide unit by a fastening tool, and terminal plate sections attached to distal ends of the flexible cables, and the other of the motor-side connection section and the unit-side connection section is formed by a terminal block, a contact surface of which with the terminal plate sections is formed in the axial direction of the electric motor.

17. The electric power steering apparatus according to claim 16, wherein an insulating partition wall that insulates the plural flexible cables is formed in the cable guide unit.

18. The electric power steering apparatus according to claim 4, wherein the control unit has a synthetic resin frame and, in a position of the synthetic resin frame opposed to one of the connection terminal and the terminal block of the electric motor, the other of the connection terminal and the terminal block is formed via an attaching plate section fixed to the reduction gear box.

19. An electric power steering apparatus comprising: a steering column having inserted therein a steering shaft to which steering torque is transmitted; a reduction gear box coupled to the steering column; and an electric motor that transmits a steering assisting force to the steering shaft via a reduction mechanism in the reduction gear box, characterized in that
the reduction gear box has installed therein a worm gear mechanism having a worm shaft coupled to an output shaft of the electric motor and a worm wheel meshing with a worm formed in the worm shaft and coupled to the steering shaft, a motor side connection terminal of the electric motor and a control unit side connection terminal of the control unit are formed to overlap in an axial direction near a motor attaching flange formed in the reduction gear box configured to come into surface contact with each other, and the motor side connection terminal and the control unit side connection terminal are brought into surface contact with each other to overlap in the axial direction after coupling of the output shaft of the electric motor and the worm shaft is started.

20. The electric power steering apparatus according to claim 19, wherein, when a distance from a housing-side end face of a motor flange formed in the electric motor to a distal end of the motor side connection terminal is represented as L4, a distance from a motor-side end face of the motor attaching flange formed in the reduction gear box to a motor-side end face of the worm shaft is represented as L5, a distance from the motor-side end face of the motor attaching flange to a distal end of the control unit side connection terminal is represented as L6, and a distance from the housing-side end face of the motor flange to a distal end surface of the output shaft of the electric motor is represented as L7, (L4+L5+L6) <L7.

21. The electric power steering apparatus according to claim 20, wherein the fitting length of the output shaft of the electric motor and the worm shaft of the worm gear mechanism is set smaller than the fitting length of a motor body of the electric motor and the reduction gear box.

22. An electric power steering apparatus comprising: a steering column having inserted therein a steering shaft to which steering torque is transmitted; a reduction gear box coupled to the steering column; and an electric motor that transmits a steering assisting force to the steering shaft via a reduction mechanism in the reduction gear box, characterized in that
the electric motor and a control unit including a control board mounted with a control circuit that controls to drive the electric motor are provided side by side in the reduction gear box, a motor side connection terminal is formed in a position near the control unit of the electric motor, and a control unit side connection terminal is formed in a position near the electric motor of the control unit,
at least one of the motor side connection terminal and the control unit side connection terminal is formed in at least one of the electric motor and the control unit with a predetermined dimensional tolerance, whereby the motor side connection terminal and the control unit side connection terminal are opposed to each other with a gap provided between the terminals,
one of the control unit side connection terminal and the motor side connection terminal is formed in a flexible structure in which the connection terminal is elastically deformed in a direction toward the other of the control unit side connection terminal and the motor side connection terminal to absorb the gap and come into contact with the other connection terminal, and
the other of the control unit side connection terminal and the motor side connection terminal is formed in a rigid structure in which the connection terminal cannot be deformed toward one of the control unit side connection terminal and the motor side connection terminal.

23. The electric power steering apparatus according to claim 22, wherein:
a long hole is formed at a distal end portion of one of the control unit side connection terminal and the motor side connection terminal formed in the flexible structure, and a screw hole is formed in the other of the control unit side connection terminal and the motor side connection terminal formed in the rigid structure, and
the screw hole and the long hole of one and the other of the control unit side connection terminal and the motor side connection terminal are associated with each other, and a fixing screw is screwed into the screw hole through the long hole to electrically connect both the control unit side connection terminal and the motor side connection terminal.

24. The electric power steering apparatus according to claim 22, wherein one of the control unit side connection terminal and the motor side connection terminal formed in the flexible structure is a member formed in an L shape in a side view including a first elastic section extending toward the other of the control unit side connection terminal and the motor side connection terminal and a second elastic section extending from a distal end of the first elastic section in a direction along a connection surface of the other of the control unit side connection terminal and the motor side connection terminal.

25. The electric power steering apparatus according to claim 24, wherein the motor side connection terminal is formed near a motor side flange of the electric motor coupled to a gear box side flange provided in the reduction gear box, and the control unit side connection terminal is formed in the control unit fixed to the reduction gear box and is arranged near the reduction gear box side flange, and
the first elastic section forming one of the control unit side connection terminal and the motor side connection terminal is set to length not projecting further forward than a flange surface of the reduction gear box side flange or a flange surface of the motor side flange.

26. An electric power steering apparatus comprising: a steering column having inserted therein a steering shaft to which steering torque is transmitted; a reduction gear box coupled to the steering column; and an electric motor that transmits a steering assisting force to the steering shaft via a reduction mechanism in the reduction gear box, characterized in that
the electric motor and the electric motor control unit are assembled to the reduction gear box, the electric motor includes a brushless motor having an electric contact for external connection connected to a motor coil, the control unit has an electric contact connected to the electric contact of the electric motor, the electric contact of the electric motor and the electric contact of the control unit are arranged in sections where the electric contacts are directly connected in a state in which the electric motor and the control unit are assembled to the reduction gear box, and the control unit is assembled to the reduction gear box to directly transmit heat, which is generated when the electric motor is controlled to be energized, to the reduction gear box.

27. The electric power steering apparatus according to claim 26, wherein the electric motor includes a rotor rotation angle detector that detects a rotation angle of a rotor disposed on an output shaft side and has an electric contact for external connection, the control unit includes an electric contact connected to the electric contact of the rotor rotation angle detector, and the electric contact of the rotor rotation angle detector and the electric contact of the control unit are arranged in sections where the electric contacts are directly connected in a state in which the electric motor and the control unit are assembled to the reduction gear box.

28. The electric power steering apparatus according to claim 27, wherein the electric motor includes a coupling section that fits in a motor mounting surface of the reduction gear box and is bolted, the rotor rotation angle detector is installed in the coupling section, the electric contact of the electric motor is formed to project in at least one of a vertical direction and a horizontal direction with respect to the reduction-gear-box-side end face, and the electric contact of the rotor rotation angle detector is formed to project in at least one of the vertical direction and the horizontal direction with respect to the reduction-gear-box-side end face.

29. The electric power steering apparatus according to claim 28, wherein the reduction mechanism includes a worm reduction gear, the worm gear shaft and the output shaft of the electric motor is spline-connected, and coupling length thereof is set larger than projection length of the electric contact of the electric motor and the electric contact of the rotor rotation angle detector from the attachment flange end face.

30. The electric power steering apparatus according to claim 27, wherein the electric contact to the rotor rotation angle detector of the control unit is formed by a spring contact terminal that comes into contact with the electric contact of the rotor angle detector with a spring pressure and is electrically connected.

31. The electric power steering apparatus according to claim 27, wherein the electric contact to the rotor rotation angle detector of the control unit is electrically connected to the electric contact of the rotor rotation angle detector by welding or soldering.

32. The electric power steering apparatus according to claim 26, wherein the torque sensor includes an electric contact for external connection connected to a torque detection element or a signal processing circuit thereof, the control unit has an electric contact connected to the electric contact of the torque sensor, and the electric contact of the torque sensor and the electric contact of the control unit are arranged in sections where the electric contacts are directly connected to each other in a state in which the torque sensor and the control unit are assembled to the reduction gear box.

33. The electric power steering apparatus according to claim 32, wherein the electric contact connected to the torque sensor is formed to project in the vertical direction with respect to a mounting surface of the control unit in a state in which the control unit is assembled to the reduction gear box.

34. The electric power steering apparatus according to claim 32, wherein the electric contact to the torque sensor of the control unit is formed by a spring contact terminal that comes into contact with the electric contact of the torque sensor with a spring pressure and is electrically connected.

35. The electric power steering apparatus according to claim 32, wherein the electric contact to the torque sensor of the control unit is electrically connected to the electric contact of the torque sensor by welding or soldering.

36. The electric power steering apparatus according to claim 26, wherein the reduction mechanism includes a worm reduction gear and the control unit mounting surface of the reduction gear box is formed as a plane in the vertical direction with respect to a worm wheel axial direction.

37. The electric power steering apparatus according to claim 26, wherein a width direction shape of the control unit is formed line symmetrical to an axis of the electric motor.

38. The electric power steering apparatus according to claim 26, wherein the electric contact to the electric motor of the control unit is formed by a screwing terminal that comes into contact with the electric contact of the electric motor with a screw axial force and is electrically connected.

39. The electric power steering apparatus according to claim 26, wherein the electric contact to the electric motor of the control unit is formed by a spring contact terminal that comes into contact with the electric contact of the electric motor with a spring pressure and is electrically connected, and an insertion opening of the spring contact terminal is opened toward the motor mounting surface of the reduction gear box in a state in which the control unit is assembled to the reduction gear box.

40. The electric power steering apparatus according to claim 26, wherein the electric contact to the electric motor of the control unit is electrically connected to the electric contact of the electric motor by welding or soldering.

41. The electric power steering apparatus according to claim 26, wherein a sealing mechanism for performing water proof and dust proof is provided in the electric contact to the electric motor of the control unit.

42. The electric power steering apparatus according to claim 26, wherein a sealing mechanism for performing water proof and dust proof is provided in the electric contact to the rotor rotation angle detector of the control unit.

43. The electric power steering apparatus according to claim 26, wherein a sealing mechanism for performing water proof and dust proof is provided in the electric contacts to the torque sensor of the control unit.

44. The electric power steering apparatus according to claim 26, wherein the reduction mechanism includes a worm reduction gear, and a control unit mounting surface on which the control unit is mounted is formed in a section where the worm shaft is installed in the reduction gear box.

45. An electric power steering apparatus assembling method for assembling a steering column having inserted therein a steering shaft to which steering torque is transmitted, a torque sensor that detects the steering torque, an electric motor that transmits a steering assisting force to the steering shaft via a reduction mechanism in a reduction gear box, and a control unit that controls to drive the electric motor on the basis of the steering torque detected by the torque sensor to the reduction gear box, the torque sensor including a torque detection element, the electric power steering apparatus assembling method comprising: installing a signal processing circuit that processes a steering torque detection signal detected by the torque detection element in the control unit; installing the torque sensor in the reduction gear box; subsequently assembling the control unit to the reduction gear box, in which the torque sensor is installed, to electrically connect the torque detection element and the control unit; and subsequently assembling the electric motor to the reduction gear box to electrically connect the control unit and the electric motor.

46. An electric power steering apparatus assembling method for assembling a steering column having inserted therein a steering shaft to which steering torque is transmitted, a torque sensor that detects the steering torque, an electric motor that transmits a steering assisting force to the steering shaft via a reduction mechanism in a reduction gear box, and a control unit that controls to drive the electric motor on the basis of the steering torque detected by the torque sensor to the reduction gear box, the torque sensor including a torque detection element and a signal processing circuit that processes a steering torque detection signal of the torque detection element, the electric power steering apparatus assembling method comprising: assembling the torque detection element and the signal processing circuit to the reduction gear box; subsequently assembling the electric motor to the reduction gear box; and subsequently assembling the control unit to the reduction gear box to electrically connect the control unit and the torque detection element and electrically connect the control unit and the electric motor.

\* \* \* \* \*